US009499707B2

United States Patent
Battig et al.

(10) Patent No.: US 9,499,707 B2
(45) Date of Patent: Nov. 22, 2016

(54) WATER SOLUBLE AND WATER FAST DYES FOR INK JET PRINTING

(71) Applicant: Rex-Tone Industries Ltd, Mumbai (IN)

(72) Inventors: Kurt Battig, LeMouret (CH); Damien Moigno, Marly (CH)

(73) Assignee: Rex-Tone Industries Ltd, Mumbai (IN)

( * ) Notice: Subject to any disclaimer, the term of this patent is extended or adjusted under 35 U.S.C. 154(b) by 0 days.

(21) Appl. No.: 14/387,208

(22) PCT Filed: Mar. 22, 2013

(86) PCT No.: PCT/EP2013/000878
§ 371 (c)(1),
(2) Date: Sep. 22, 2014

(87) PCT Pub. No.: WO2013/139485
PCT Pub. Date: Sep. 26, 2013

(65) Prior Publication Data
US 2015/0050466 A1 Feb. 19, 2015

Related U.S. Application Data

(60) Provisional application No. 61/614,566, filed on Mar. 23, 2012.

(30) Foreign Application Priority Data

Mar. 22, 2012 (EP) .................................... 12002048

(51) Int. Cl.
*C09D 11/328* (2014.01)
*C09B 29/30* (2006.01)
(Continued)

(52) U.S. Cl.
CPC ............... *C09D 11/328* (2013.01); *B05D 1/26* (2013.01); *B05D 1/28* (2013.01); *B05D 3/0406* (2013.01);
(Continued)

(58) Field of Classification Search
CPC . C09D 11/328; C09B 29/0803; C09B 29/30; C09B 31/08; C09B 33/10; C09B 33/22; C09B 33/28; C09B 35/025; C09B 35/039; C09B 35/215; C09B 35/24; C09B 35/28; B05D 1/26; B05D 1/28; B41J 2/01; Y10T 428/24802
USPC ................ 106/31.48, 31.5, 31.51, 31, 52; 534/579, 654, 655, 754, 761, 781, 814, 534/827, 842

See application file for complete search history.

(56) References Cited

U.S. PATENT DOCUMENTS 4,426,226 A * 1/1984 Ohta .................... C09D 11/328
106/31.51
5,043,257 A * 8/1991 Baettig ................. C09B 43/145
534/820

(Continued)

FOREIGN PATENT DOCUMENTS

JP 58174458 10/1983
JP 58174462 10/1983

(Continued)

OTHER PUBLICATIONS

Derwent Abstract of JP 63/056574A; Nov. 1988; 2 pages.*

(Continued)

*Primary Examiner* — Helene Klemanski
(74) *Attorney, Agent, or Firm* — Quarles & Brady LLP

(57) ABSTRACT

The invention relates to azo dyes of desulfo-K-acid [CA: 35400-55-6], their salts, a method for the preparation of these dyes, or salts thereof, a liquid phase comprising at least one of these dyes, a method for applying the liquid phase on a substrate, a printed matter and the use of these dyes in water-based inks for inkjet printing, in writing utensil or dyeing solutions for manufacturing color filters for optical and opto-electronic applications.

24 Claims, 5 Drawing Sheets

(51) Int. Cl.

| | | |
|---|---|---|
| C09B 31/08 | (2006.01) | |
| C09B 33/10 | (2006.01) | |
| C09B 33/22 | (2006.01) | |
| C09B 33/28 | (2006.01) | |
| C09B 35/025 | (2006.01) | |
| C09B 35/039 | (2006.01) | |
| C09B 35/215 | (2006.01) | |
| C09B 35/24 | (2006.01) | |
| C09B 35/28 | (2006.01) | |
| B05D 1/26 | (2006.01) | |
| B05D 1/28 | (2006.01) | |
| B05D 3/04 | (2006.01) | |
| C09B 29/08 | (2006.01) | |

(52) U.S. Cl.
CPC .......... *C09B 29/0803* (2013.01); *C09B 29/30* (2013.01); *C09B 31/08* (2013.01); *C09B 33/10* (2013.01); *C09B 33/22* (2013.01); *C09B 33/28* (2013.01); *C09B 35/025* (2013.01); *C09B 35/039* (2013.01); *C09B 35/215* (2013.01); *C09B 35/24* (2013.01); *C09B 35/28* (2013.01); *Y10T 428/24802* (2015.01)

(56) References Cited

U.S. PATENT DOCUMENTS

| | | | | |
|---|---|---|---|---|
| 6,451,989 B1* | 9/2002 | Beach | ............... | C09D 11/328 106/31.52 |
| 6,709,502 B2* | 3/2004 | Baettig | ............... | C09B 29/30 106/31.51 |
| 6,929,688 B2* | 8/2005 | Baettig | ............... | C09B 29/30 106/31.48 |
| 7,056,376 B2* | 6/2006 | Popat | ............... | C09B 33/22 106/31.48 |
| 7,951,235 B2* | 5/2011 | Monahan | ............... | C09B 33/22 106/31.48 |
| 8,361,168 B2* | 1/2013 | Baettig | ............... | C09B 33/22 106/31.48 |
| 8,834,620 B2* | 9/2014 | Baettig | ............... | C09D 11/328 106/31.52 |
| 2007/0062409 A1* | 3/2007 | Mistry | ............... | C09D 11/328 106/31.5 |

FOREIGN PATENT DOCUMENTS

| | | |
|---|---|---|
| JP | 58176256 | 10/1983 |
| JP | 58176277 | 10/1983 |
| JP | 63056574 | 3/1988 |
| JP | 01172907 | 7/1989 |
| JP | 01265205 | 10/1989 |
| WO | 2005052065 A1 | 6/2005 |

OTHER PUBLICATIONS

English translation of JP 63/056574A; Nov. 1988; 7 pages.*
Derwent Abstract of JP 58/174458A; Oct. 1983; 2 pages.*
English translation of JP 58/174458A; Oct. 1983; 6 pages.*
International Search Report, International Application No. PCT/EP2013/000878; Dated Apr. 15, 2013; 4 pages.
Photographic Science and Photochemistry; The Properties of Some Color-Shifted Dyes for Silver-Dye-Bleach Photography; Peng, Xiao-Jun; vol. 10, No. 3, Aug. 1992; 7 pages.

* cited by examiner media a  media b

WATER SOLUBLE AND WATER FAST DYES FOR INK JET PRINTING

The invention relates to azo dyes of 5-amino-4-hydroxynaphthalene-2-sulfonic acid (CAS: 35400-55-6), also referred to as: desulfo-K-acid), their salts, a method for the preparation of these dyes, or salts thereof, a liquid phase comprising at least one of these dyes, a method for applying the liquid phase on a substrate, a printed matter and the use of these dyes in water-based inks for inkjet printing, in writing utensil or in dyeing solutions for manufacturing color filters for optical and/or opto-electronic applications.

In ink jet printing, in particular in professional ink jet printing applications, there is an ongoing need for devices providing faster printing (higher throughput) and improved quality. Accordingly, the speed of modern ink jet printers is steadily increased. Today, digital images, captured with digital cameras or generated by scanning of silver halide camera films, can be printed with these modern printers at a quality level that makes these images nearly indistinguishable from classical copies on silver halide materials. These images produced by ink jet printing need to have excellent storage stability even under adverse conditions.

Along with the improvement of the printing devices, the inks used for these printing devices are subject to steady improvement, too. One of the requirements for these inks is fast adsorption on and/or by the substrate, e.g. a recording sheet. However, types of substrates vary as do the types of absorbing layers on the substrates. A first type of substrate comprises a base material and at least one absorbing layer, which absorbing layer is made from or more porous inorganic compounds, e.g. silicon dioxide. Other type of substrates are polymers or a base layer coated with one or more polymer layers, by which the ink is absorbed. Thereby the ink causes a swelling of the polymer. This is a rather slow process compared to absorption of ink by porous layers.

Further, dyes, which are used for ink jet printing, should exhibit some important features, amongst them very high brilliance, suitable hue, good saturation. Further, the dyes should exhibit a good light stability, a good resistance against degradation by ozone and an excellent diffusion fastness. Moreover, the dyes should be excellently soluble in aqueous media, e.g.: recording liquids, and should be able penetrate readily into the recording sheet.

As is described above, dyes for inkjet printing must match a large variety of very different features. This is, and remains, a challenging task for the development of novel, improved inks.

Accordingly, most of nowadays commercial dyes suffer from one or more of the following disadvantages:
The dye is not black;
The hue is not neutral;
The color of a dye differs on various media;
Longterm stability against air and/or ozone is little;
Water fastness is limited, the dye tends to bleeding;
Water solubility is limited;
Light fastness is poor;
Limited ozone stability;
Fading of the dye is not neutral.

As a result, preparation of an ink of a specific colour, e.g. black, requires mixing of two or more dyes, and/or adding of volatile organic solvents, and the like.

Thus, there is an ongoing, urgent need for novel dyes, which are highly water-soluble, which have a neutral hue, an excellent stability against light and/or ozone, an excellent water fastness. Further, aforementioned dyes should not be subject to bleeding in the presence of humidity or water. Besides, a neutral hue is preferred even after degradation by light or ozone.

Accordingly, a first object of the invention is to provide dyes, with which liquid preparations such as inks can be prepared, which inks are usable for producing high quality prints of images, preferably on any kind of substrate. Further, these dyes should show high brilliance and high optical density. Further, these dyes should not show bronzing, when printed on photographic media.

It is another object of the invention to provide dyes, which show a good water fastness.

It is a further object of the invention to provide dyes, which show a good light fastness.

It is another object of the invention to provide dyes, which show an excellent wearing resistance.

It is another object of the invention to provide dyes, which show excellent ozone stability.

It is another object of the invention to provide dyes and inks, which can be stocked over a long time, preferably even at elevated temperatures and/or elevated humidity.

It is another object of the invention to provide inks, which have no or only little tendency of clogging inkjet nozzles.

It is another object of the invention to provide dyes and inks, which are non-toxic, not inflammable, not sensitizing and not irritating to the skin of human beings and do not contain carcinogenic agents.

It is another object to provide inks containing no or only very little amounts of volatile organic solvent.

It is further object of the invention to provide a method of manufacturing dyes and/or dying compositions, such as inks, recording liquids, textile colorants and dyeing solutions for manufacturing color filters for optical and/or opto-electronic applications, which all have at least some, preferably all of the aforementioned advantageous properties. Further, it is an object of the invention to provide a method of applying a dyeing composition, such as an ink, a recording liquid, or a textile colorant with at least one of the dyes to a substrate, preferably without using volatile organic solvents.

Surprisingly, it has been found that dyeing liquids comprising dyes of the present invention can be used to provide dyed substrates, which exhibit a darker color impression than one would expect from the color of the dye itself. For example, it has been found that a dye provides a bluish or brownish color impression. However, a substrate, e.g. an ink jet recording sheet, which has been dyed with a dyeing liquid, which comprises only aforementioned dye, renders a black color impression.

A contribution to the solution of at least one of the above objects is provided by the subject matters of the category-forming claims, whereby the dependent sub-claims of the category-forming independent claims represent preferred aspects of the invention, the subject matter of which likewise makes a contribution to solving at least one of the objects mentioned above.

A first aspect of the invention is a dye D1 of formula I,

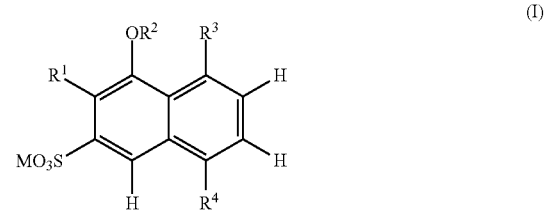

wherein
M is selected from the group consisting of H, Li, Na, K, $N(H_kR^6{}_m)$,
wherein
each $R^6$ is selected from the group consisting of —H, a substituted or unsubstituted, saturated or unsaturated aliphatic group having 1 to 10 carbon atoms, and
k is an integer selected from 0, 1, 2, 3, 4 and m=4−k;
If $R^6$ is an aliphatic group, the aliphatic group can be substituted, unsubstituted, saturated, unsaturated, saturated substituted, saturated unsubstituted, unsaturated unsubstituted or unsaturated substituted. Moreover, each of the aforementioned aliphatic groups can be linear or branched.
Aforementioned aliphatic groups may comprise more than one, e.g. two, three or more C—C double or triple bonds in the unsaturated aliphatic group, provided the length of the aliphatic group is 4 or more, e.g. 5, 6, 7, 8 or 9 C-atoms. It is known to those skilled in the art, how many unsaturated bonds may be arranged in a specific unsaturated aliphatic group.
Aforementioned substituted saturated or unsaturated aliphatic group may have one or more substituents. Each saturated carbon atom may have 1 or 2 substituents. Each unsaturated carbon atom may have one substituent. Numerous of the known substituents enter into consideration of those skilled in the art. Preferred substituents are —F, —Cl, —Br, —I, —NH$_2$, —NHCH$_3$ and —NHC$_2$H$_5$. The substituents at each carbon atom are selected independently from other substituents at the same carbon atom and at adjacent carbon atoms. Preferably, aforementioned aliphatic group can have from 1 to 10 carbon atoms, for example 1, 2, 3, 4, 5, 6, 7, 8, 9 or 10 carbon atoms.
Preferably, $R^6$ is a linear or branched saturated aliphatic group having 1 to 6 carbon atoms, or —H.
$R^1$ is —H or —N=N—Ar$^2$,
wherein Ar$^2$ is a substituted or unsubstituted monocyclic, polycyclic or condensed, at least one aromatic group containing fragment, which at least one aromatic group comprises at least one five- or one six-membered homo- or heterocyclic structure,
wherein the heterocyclic structure comprises at least one hetero-atom, which heteroatom is N, O or S;
preferably, Ar$^2$ is a six-membered monocyclic and homo- or heterocyclic structure, further preferred substituted with one to five groups X, wherein X is selected from the group consisting of —SO$_3$M, —SO$_2$NH$_2$, —SO$_2$NHR$^6$, —NHSO$_2$R$^6$, —NO$_2$, —COOM, —COOR, —CH$_3$, —R$^6$, —NH$_2$, —NHR$^6$, —OR$^6$, —OM, —Cl, —Br, —I, —F, —CN, —CO$_2$NHR$^6$, —Ar$^2$, —N=N—Ar$^2$, —SO$_2$R$^6$ and —NHC(=O)—R$^6$, wherein X is preferably —Cl, —Br—, —I, —CN, —SO$_3$M, —NH$_2$, —NHR$^6$ or —R$^6$; wherein R$^6$ and M are defined as above; if Ar$^2$ comprises at least one heteroatom, N is preferred;

further preferred, Ar$^2$ is selected from substituted or unsubstituted phenylsulphonic acids and naphthalene sulphonates, their M-salts (salts with counter ion M$^+$, wherein M is defined as above) and derivatives of the aforementioned.
$R^2$ is selected from the group consisting of —H, —C(=O)R$^6$, —C(=O)—(CH$_2$)$_v$—Ar$^2$, —R$^6$, —(CH$_2$)$_q$—X, —C(=O)—(CH$_2$)$_v$Ar$^2$, —SO$_2$R$^6$, —SO$_2$Ar$^2$
wherein
X is selected from the group consisting of —SO$_3$M, —SO$_2$NH$_2$, —SO$_2$NHR$^6$, —NHSO$_2$R$^6$, —NO$_2$, —COOM, —CH$_3$, —R$^6$, —NH$_2$, —NHR$^6$, —OR$^6$, —OM, —Cl, —Br, —I, —F, —CN, —CO$_2$NHR$^6$, —Ar$^2$, —SO$_2$R$^6$ and —NHC(=O)—R$^6$,
M, R$^6$ and Ar$^2$ are defined as above,
q is an integer in the range of from 1 to 10, and
v is an integer in the range of from 0 to 10;
$R^3$ is —NHR$^2$ or —N=N—Ar$^2$, wherein
R$^2$ has the meaning as defined above, and
Ar$^2$ has the meaning as defined above;
$R^4$ is —N=N—Ar$^2$, wherein Ar$^2$ has the meaning defined above.
In the context of the present invention M defines a cation, e.g. H$^+$, Li$^+$, Na$^+$, K$^+$, N(H$_k$R$^6{}_m$)$^+$. Accordingly, functional groups comprising M represent a salt of cation M and an anion of the functional group. Accordingly, —SO$_3$M can be described as —SO$_3{}^−$M$^+$, —CO$_2$M as —CO$_2{}^−$M$^+$, —COOM as —COO$^−$M$^+$, —OM as —O$^−$M$^+$ and the like.
According to another aspect of the invention, each Ar$^2$ in dye D1 is selected independently from the group consisting of:
a) formula III:

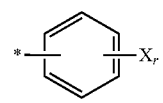

(III)

wherein
r represents the number of X substituents in formula III and is an integer in the range of from 1 to 5, and X has the meaning as defined above, wherein X is preferably —NO$_2$, —SO$_3$M, —SO$_2$NHR$^6$, —C(=O)NHR$^6$, —NHC(=O)R$^6$, —CO$_2$M, —CO$_2$R$^6$ and —OR$^6$,
M is as defined above,
R$^6$ has the meaning as defined above; or
b) formula IV:

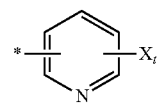

(IV)

wherein
X has the meaning as defined in claim 1, wherein X is preferably —CN, —CH$_3$, —OH, —OR$^6$ and —NHR$^6$, and
t represents the number of X substituents in formula IV and is an integer in the range of from 1 to 4, and
R$^6$ has the meaning as defined above; or c) formula V:

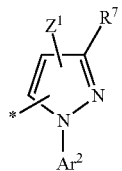
(V)

wherein
R[7] is selected from the group consisting of —R[6], —SR[6], —Ar[2] and —NHR[6],
Z[1] is —OH, —CN, —CO$_2$M, —CO$_2$R[6], —NHR[6], wherein Z[1] is preferably —CN, —CH$_3$ and —CO$_2$M,
Ar[2], R[6] and M have the meaning as defined above; or d) formula VI:

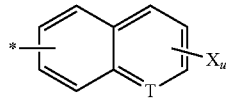
(VI)

wherein
each X has the meaning as defined in claim 1, wherein X is preferably —H, —OH, —NHR[6] or —SO$_3$M,
T is selected from the group consisting of C, N or P,
M has the meaning as defined above,
u represents the number of X substituents in formula VI and is an integer between 0 and 6;

e) formula VII:

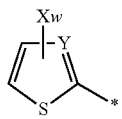
(VII)

wherein
X has the meaning as defined in claim 1, wherein X is preferably —NO$_2$, —CO$_2$M, —SO$_2$NHR[6], —R[6], —NHR[6], —NHC(=O)R[6] and
w represents the number of X substituents in formula VII and
w is 1 or 2
Y is C or N; and
R[6] and M have the meaning defined above;

f) formula VIII:

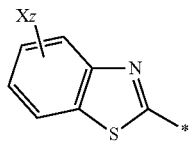
(VIII)

wherein X has the meaning as defined above, wherein X is preferably —H, —NO$_2$, —CH$_3$, —Cl, —F, —Br, —SO$_3$M, —SO$_2$R[6], —SO$_2$NHR[6], —OH, —OR[6], —NHR[6], —COOM and —COOR[6], z represents the number of X substituents in formula VIII and z is an integer in the range of from 1 to 4,
Y is C, N, O or S, and
R[6] and M have the meaning as defined above.

According to a further aspect of the invention, Ar[2] in dye D1 is selected from the group consisting of:

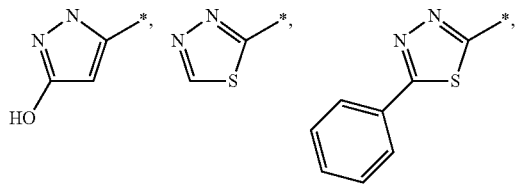

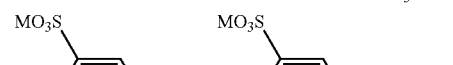

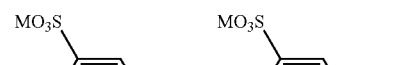

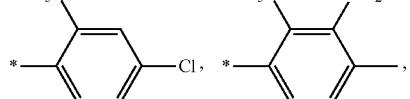

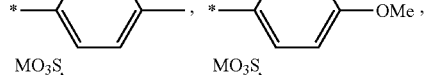

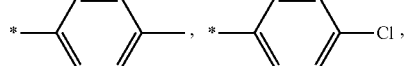

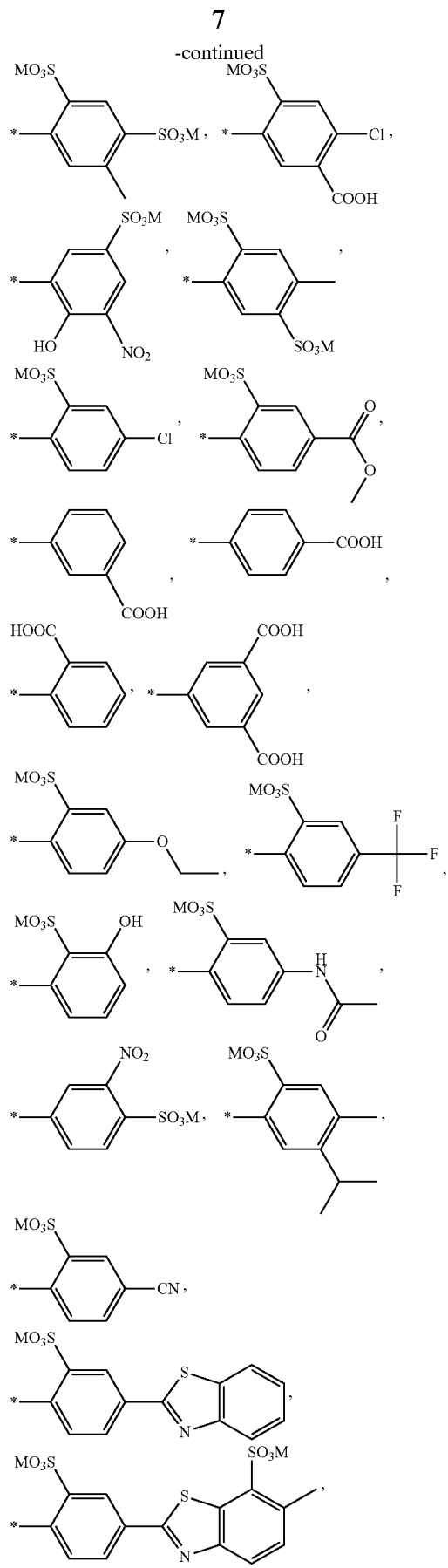
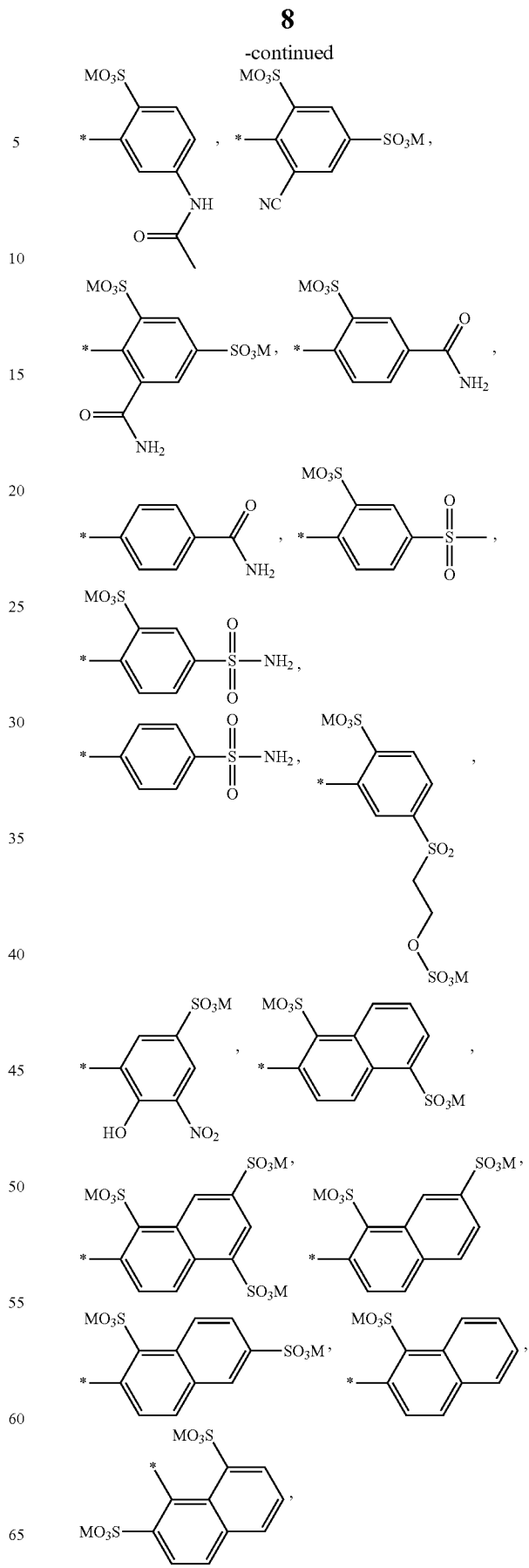

-continued
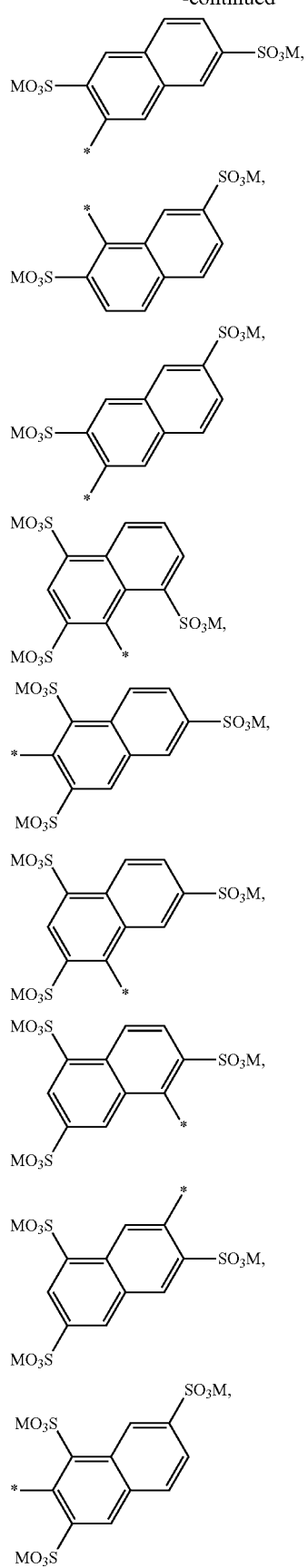
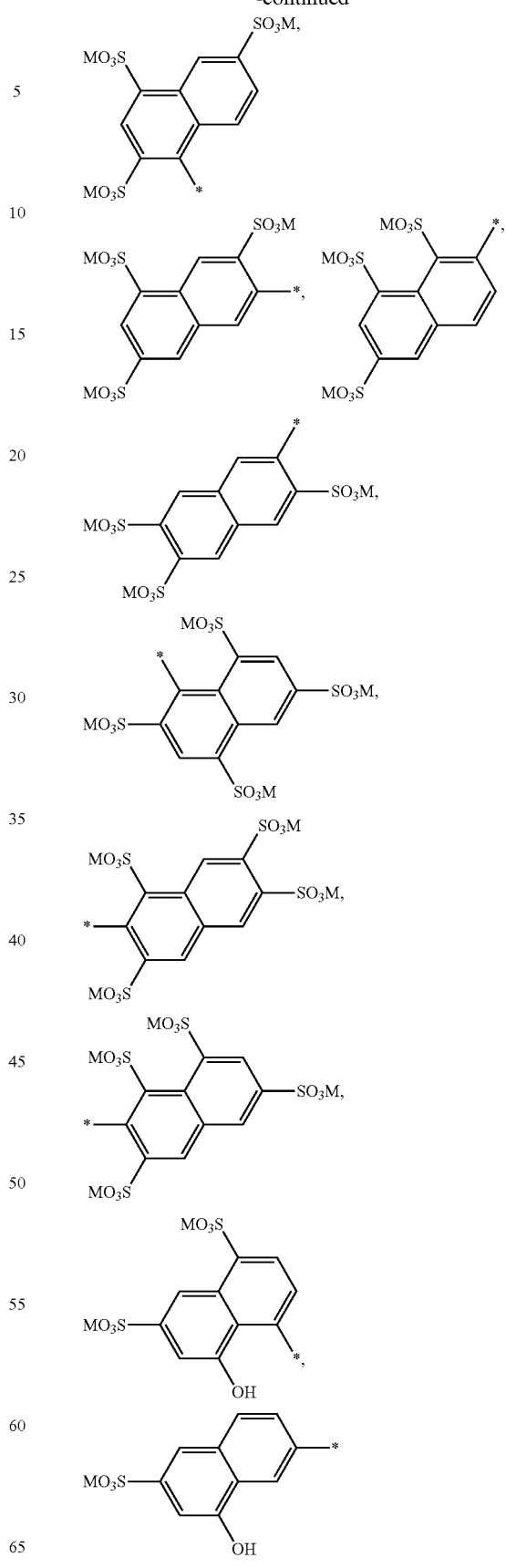

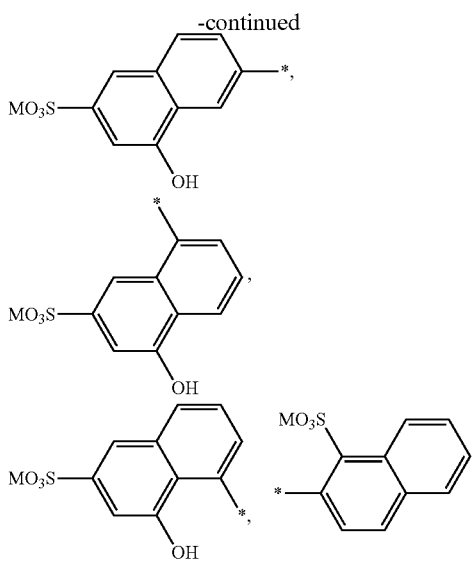

or a combination of two or more thereof, wherein each M has the meaning defined above and is selected independently from any other M.

According to a further aspect of the invention, of dye D1 are two of the groups selected from $R^1$, $R^3$ and $R^4$ are —N=N—$Ar^2$, wherein each $Ar^2$ is selected independently from any other $Ar^2$.

According to a further aspect of the invention, of dye D1 both groups, $R^1$ and $R^4$ are —N=N—$Ar^2$, wherein each $Ar^2$ is selected independently from any other $Ar^2$.

A further aspect of the invention is a dye D2 comprising at least two fragments of formula I as defined for dye D1 above and at least one fragment $R^5$ of formula II,

wherein $Ar^1$ is a substituted or unsubstituted, monocyclic, polycyclic or condensed, at least one aromatic group containing linker, which at least one aromatic group comprises at least one five- or one six-membered homo- or heterocyclic structure,
wherein the heterocyclic structure comprises at least one hetero-atom, which heteroatom is N, O or S;
preferably, $Ar^1$ comprises two or more aromatic groups; preferably, each of the azo groups is connected to an aromatic group of the linker $Ar^1$, wherein all azo groups are connected either to the same aromatic group of linker $Ar^1$, or to different aromatic groups of $Ar^1$, or some of the azo groups are connected to a first aromatic group of $Ar^1$ and some other azo groups are connected to another aromatic group of $Ar^1$; further, two or more of the aromatic groups of $Ar^1$ can be interconnected by further azo groups;
preferably, $Ar^1$ comprises at least one six-membered monocyclic and homo- or heterocyclic structure, further preferred substituted with one to five groups X, wherein X is preferably —Cl, —Br—, —I, —CN, —$SO_3M$, —$NH_2$, —$NHR^6$ or —$R^6$, —$CO_2M$, —$CO_2R$, —$SO_2NHR^6$, —$NO_2$, —C(=O)$NHR^6$ wherein $R^6$ and M are defined as above; if $Ar^1$ comprises at least one heteroatom, N is preferred; further preferred, $Ar^1$ comprises at least one substituted or unsubstituted phenylsulphonic acids and naphthalene sulphonates, their M-salts (salts of fragments $Ar^1$, wherein M is defined as above) and derivatives of the aforementioned.

wherein, independently for each fragment of formula I, $R^2$, $R^3$ and M have the meaning as defined for dye D1 above,
wherein $R^1$ and $R^4$ of each fragment of formula I are selected from
a. —H,
b. —N=N—$Ar^2$ with $Ar^2$ as defined for dye D1 above, or
c. —$R^5$,
wherein, in each of the two fragments of formula I, at least one of the groups $R^1$ and $R^4$ equals $R^5$ as defined for formula II, and wherein $R^5$ is linked at the positions marked with * to these two fragments of formula I.

A linker in the context of the present invention is a chemical structure, which is connected to at least two azo groups (—N=N—).

Another aspect of the invention is aforementioned dye D2, wherein in each fragment of formula I, if $R^1$ equals $R^5$, then $R^4$ is the structure of formula III or the structure of formula VI as defined above.

Another aspect of the invention is aforementioned dye D2, wherein $R^5$ is selected from the group consisting of formula IIa and formula IIb:

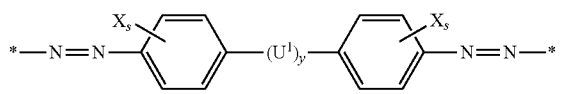

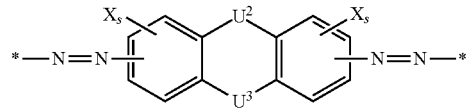

wherein
each X independently has the meaning as defined for dye D1 above, preferably selected from the group consisting of —$SO_3H$, —$CO_2H$, —OH, —$CO_2M$, —$CO_2R$, —$CO_2Ar$, —$CH_3$, —CN, —$SO_2NHR^6$, —$NO_2$, —$NHR^6$ and —Cl,
s independently for each aromatic ring represents the number of X substituents and is an integer selected from 0, 1, 2 and 3,
$U^1$ is selected from the group consisting of —$CZ_2$—, —$CZ_2$—$CZ_2$—, —($SO_2$)—, —O—, —(C=O)—, —CH=CH—, —NH(C=O)—,

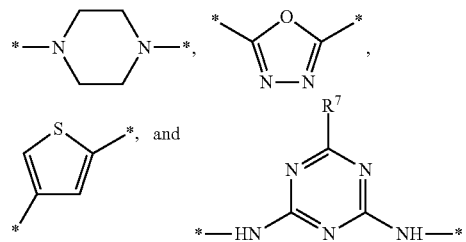

—$NR^6$—, preferably, —NH—, —$SO_2$, —O—, —(C=O)—, —NHC(=O)—, —CH=CH—, —$CH_2$—$CH_2$— or —CHZCHZ— wherein
each Z is selected independently from —H, —OH, —CH$_3$,
y is 0 or 1,
U$^2$, U$^3$ are, each individually, selected from —(C=O)— and —(SO$_2$)—, preferably —(C=O)—,
R$^7$ is selected from the group consisting of —R$^6$, —Cl, —Br, —I, —F, —OH, and
R$^6$ has the meaning as defined in claim 1;

Another aspect of the invention is aforementioned dye D2, wherein R$^5$ is selected from formula IX:

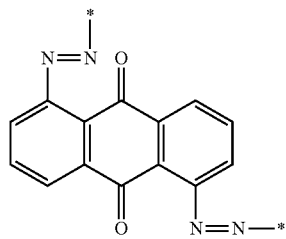
(IX)

or formula X:

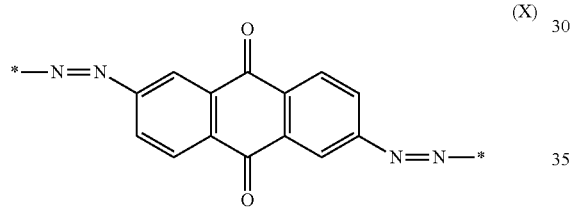
(X)

Another aspect of the invention is aforementioned dye D2, wherein M, R$^1$, R$^2$, R$^3$ are identical for both fragments of formula I. Preferably both fragments of formula I are linked to each other in R$^4$ via one fragment R$^5$ of formula II.

Another aspect of the invention is aforementioned dye D2, wherein M, R$^2$, R$^3$, R$^4$ are identical for both fragments of formula I. Preferably, both fragments of formula I are linked to each other in R$^1$ via one fragment R$^5$ of formula II.

According to a further aspect of the invention, Ar$^1$ is selected from the group consisting of

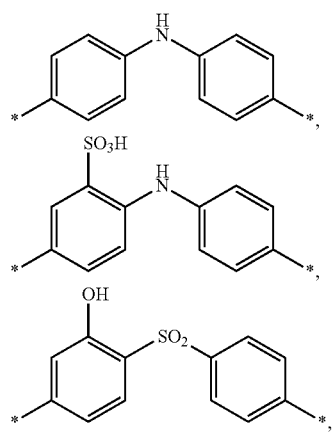

-continued

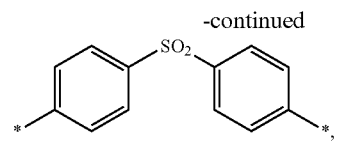

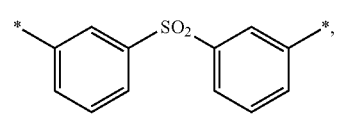

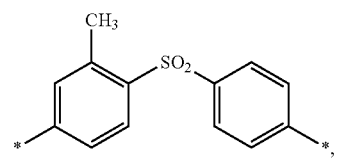

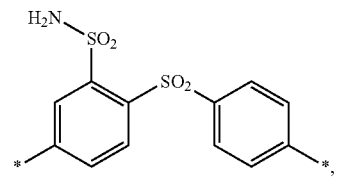

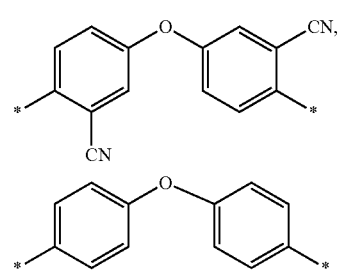

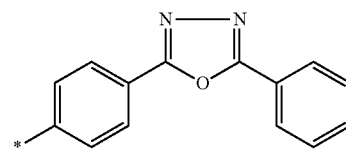

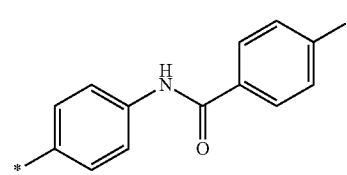

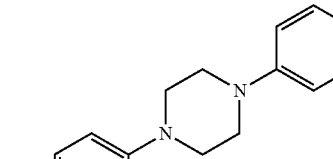

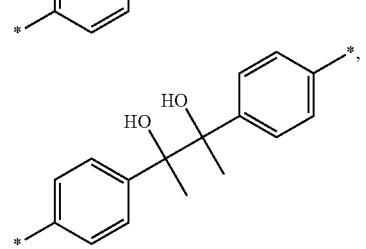

-continued
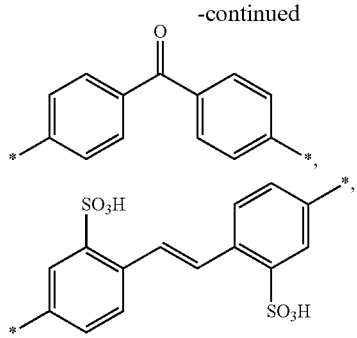
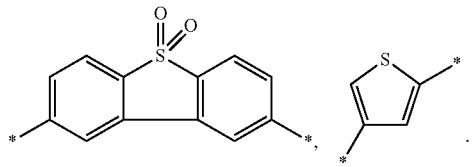
A further aspect of the invention is aforementioned dye D2, wherein dye D2 is selected from the group consisting of:
(XI)
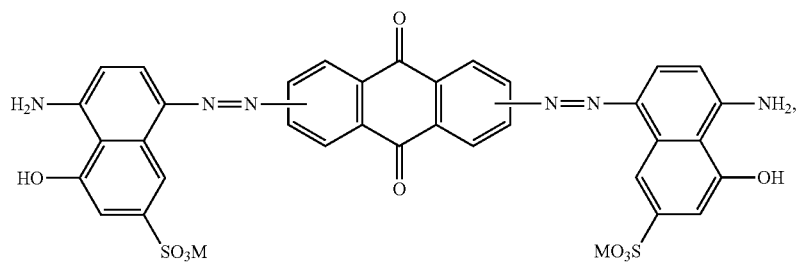
(XII)
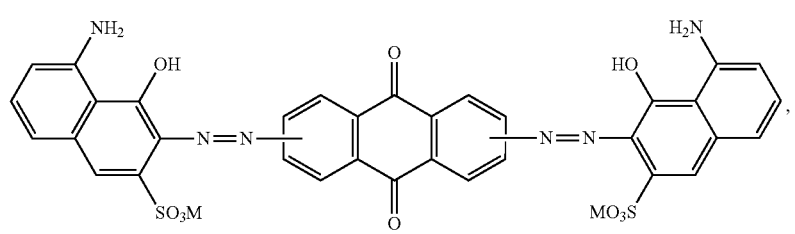
(XIIIa)
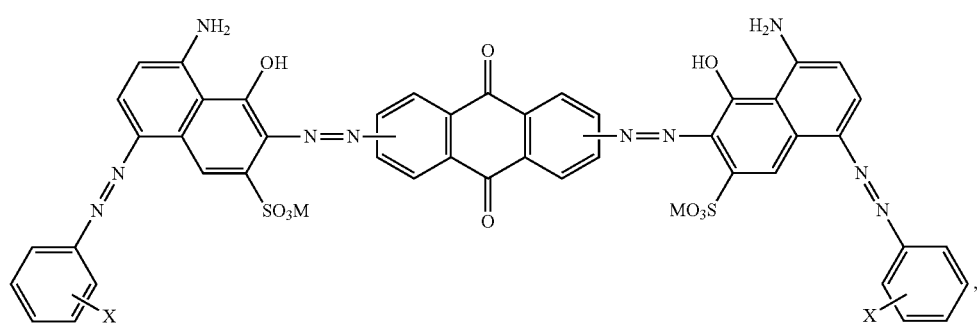
(XIIIb)
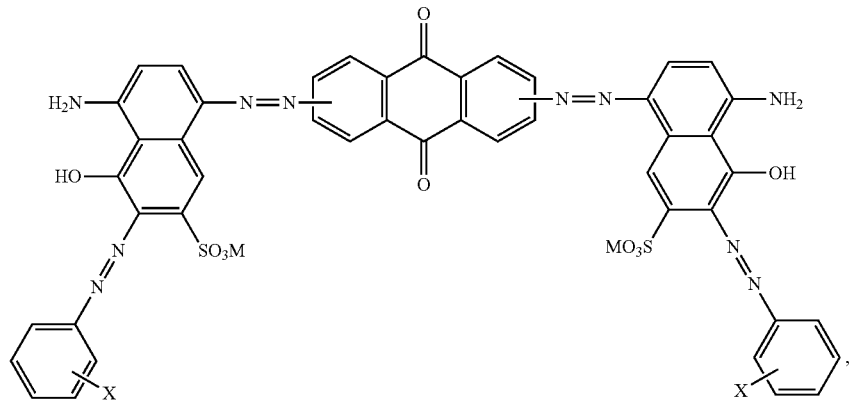

-continued
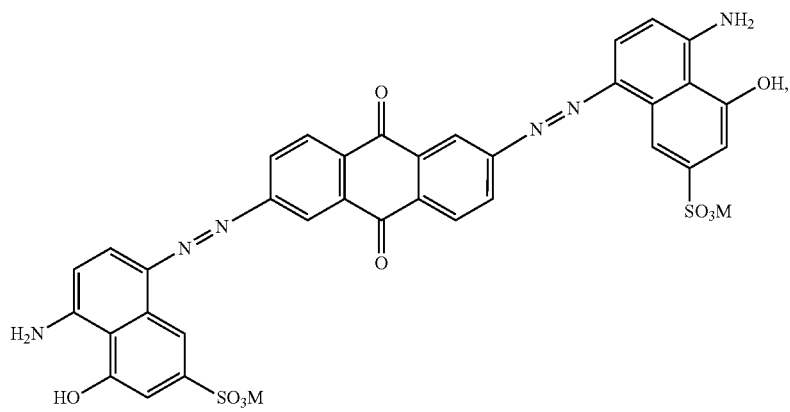
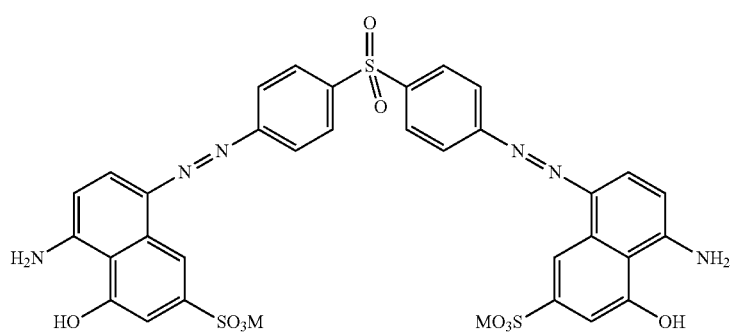
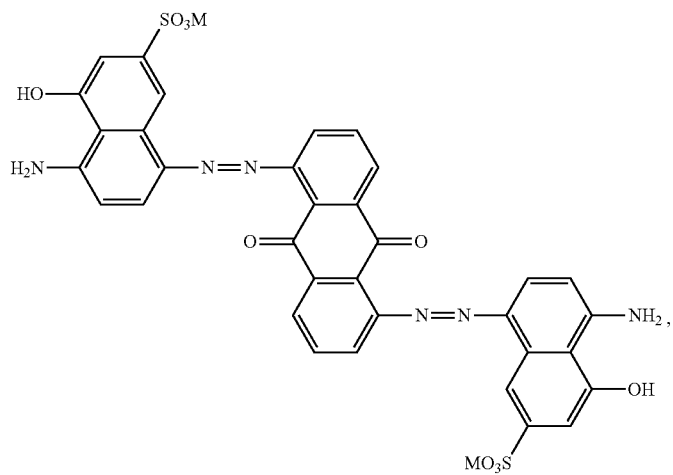
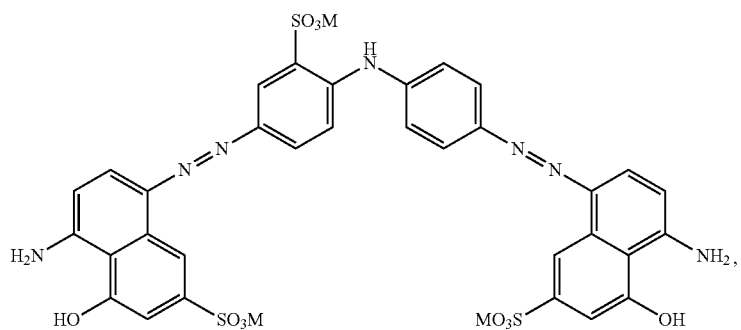

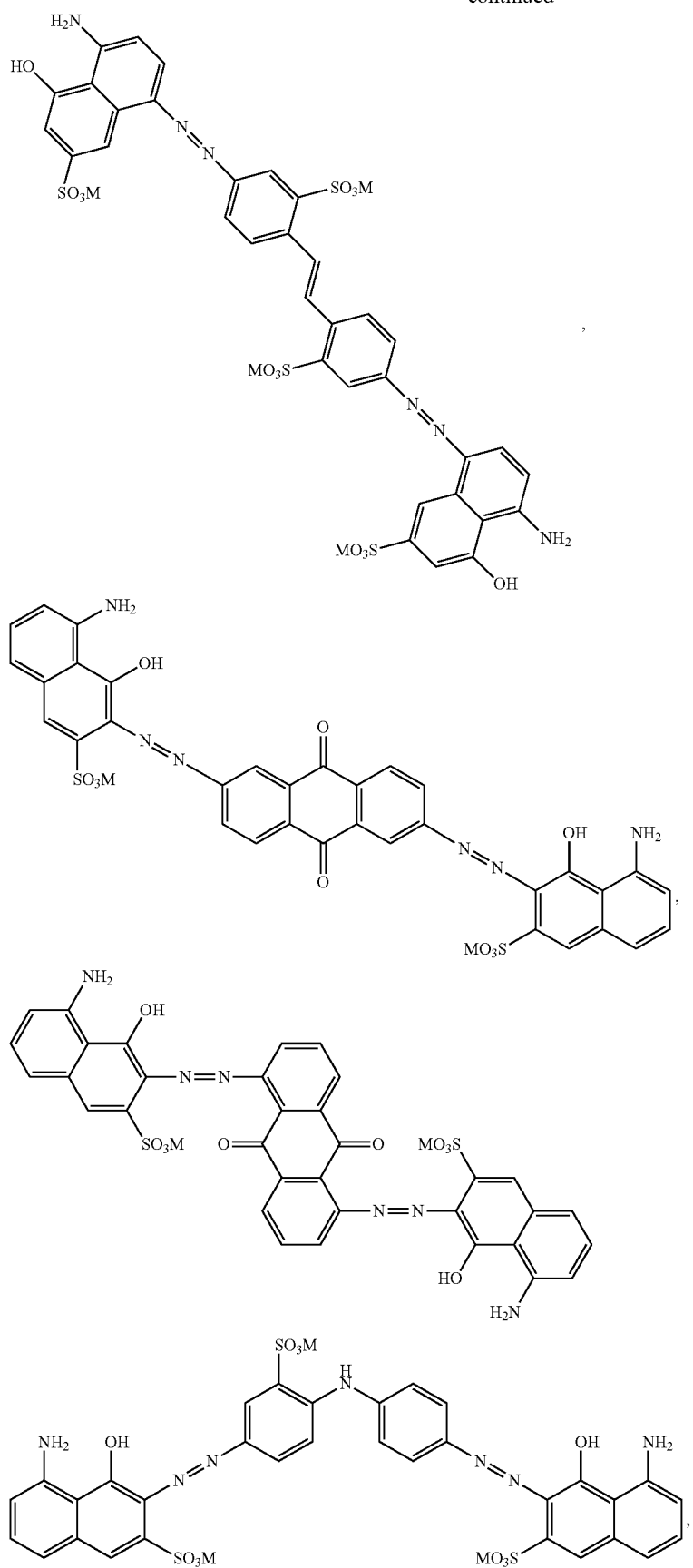

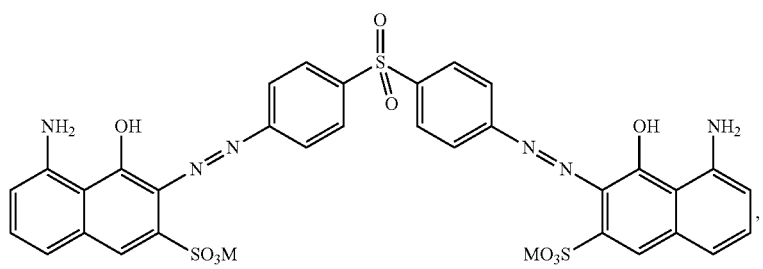
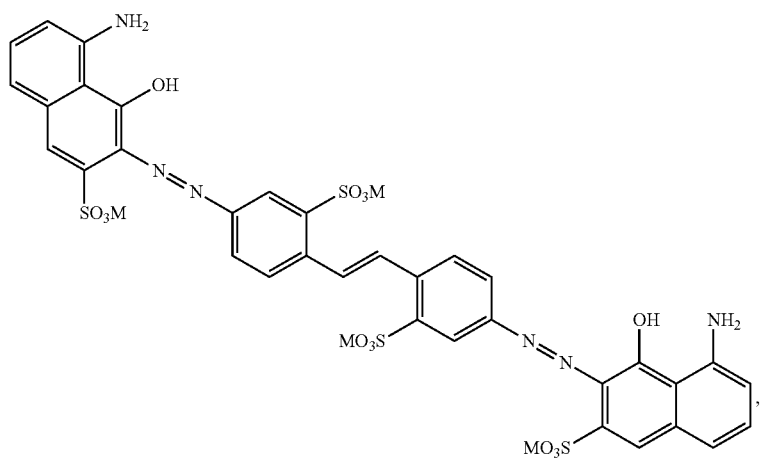
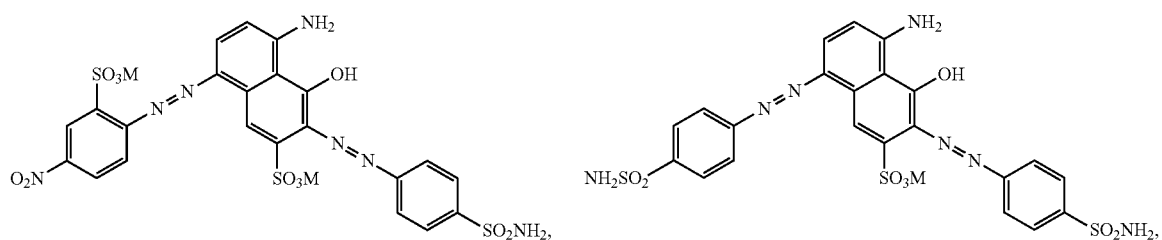
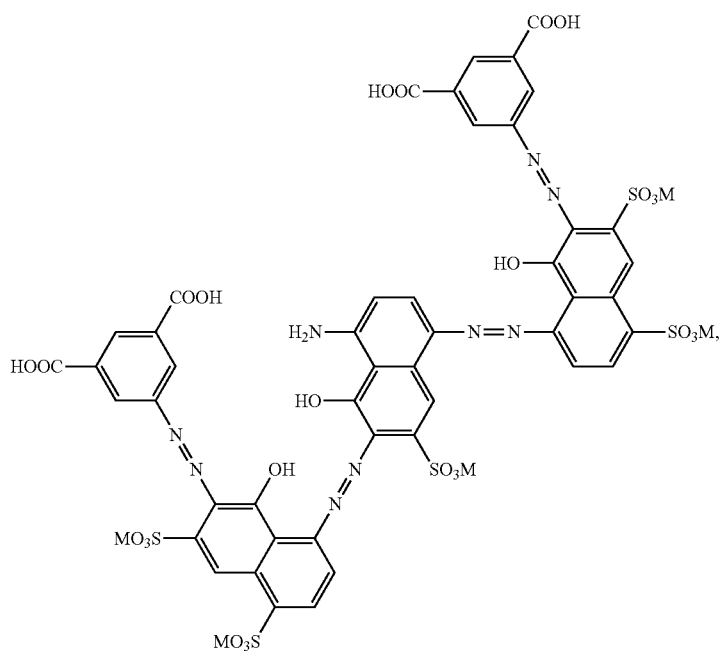

-continued
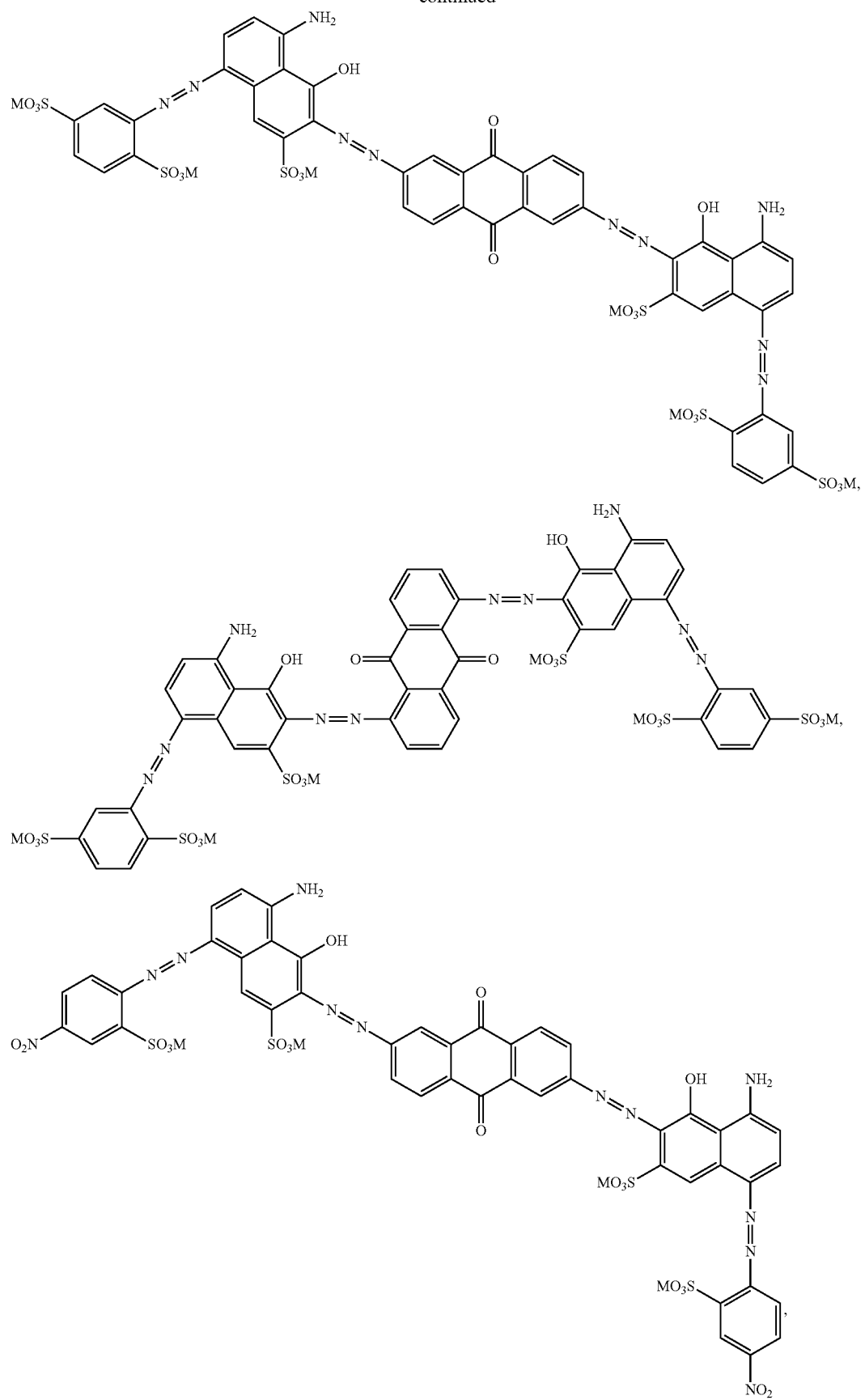

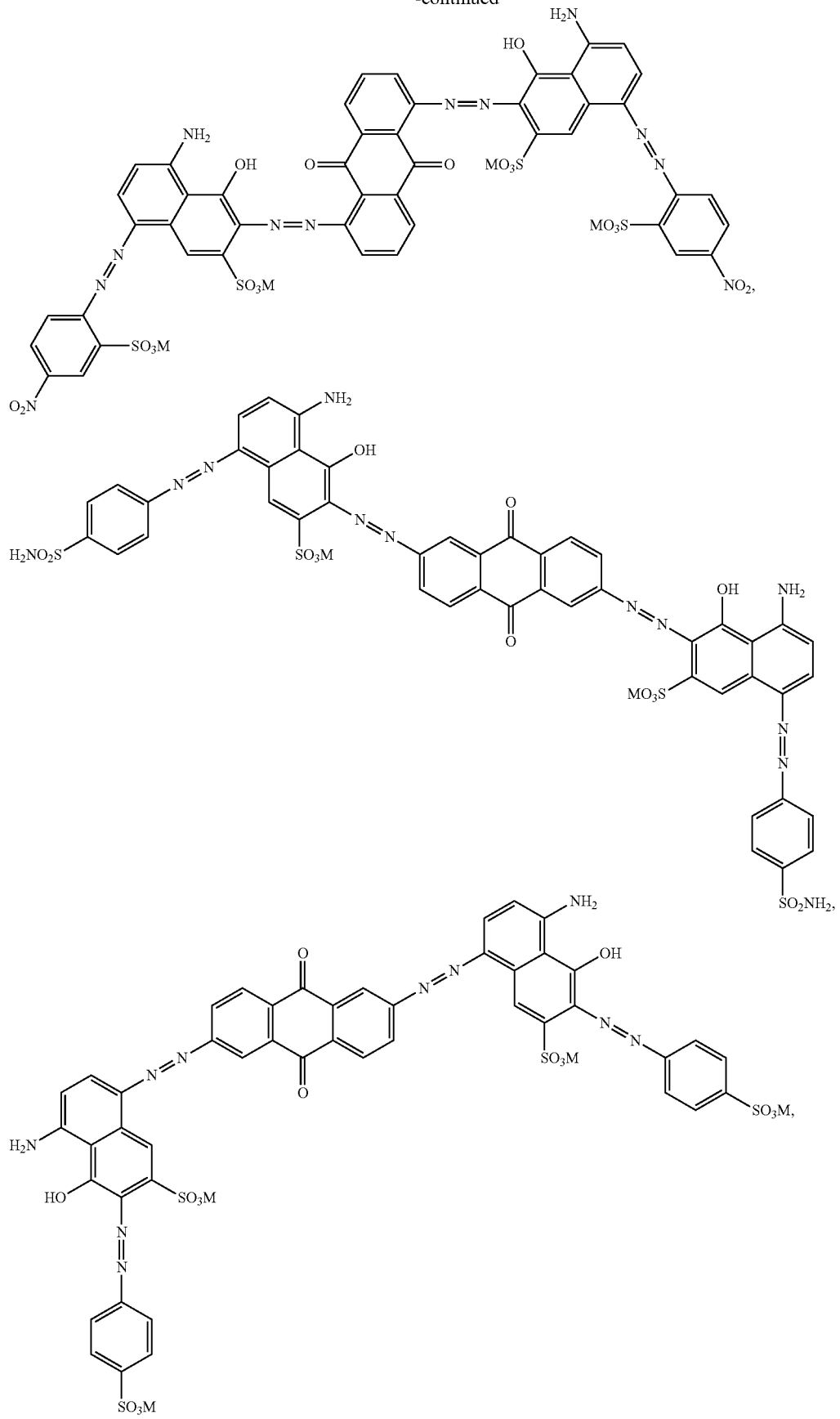

-continued
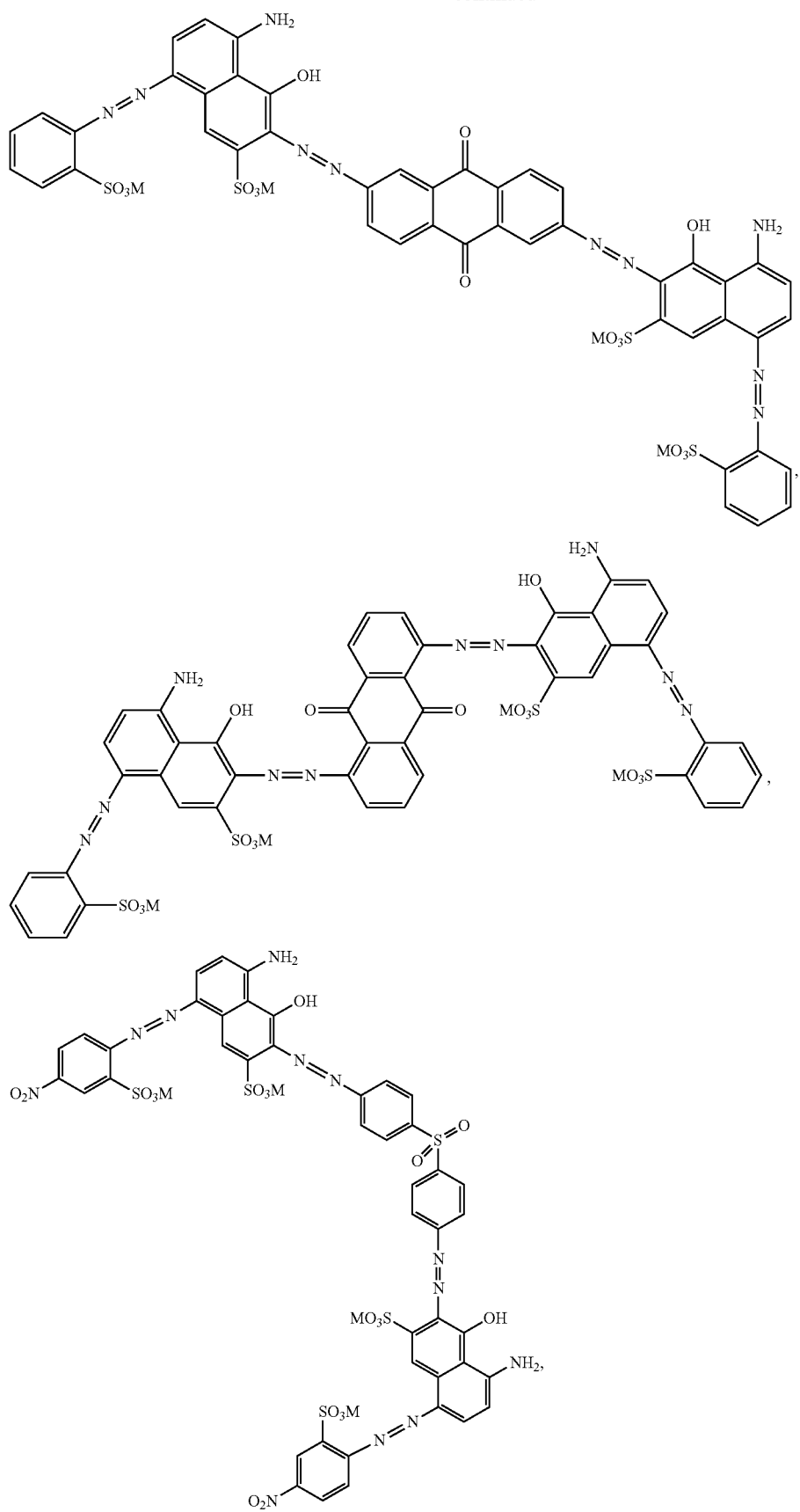

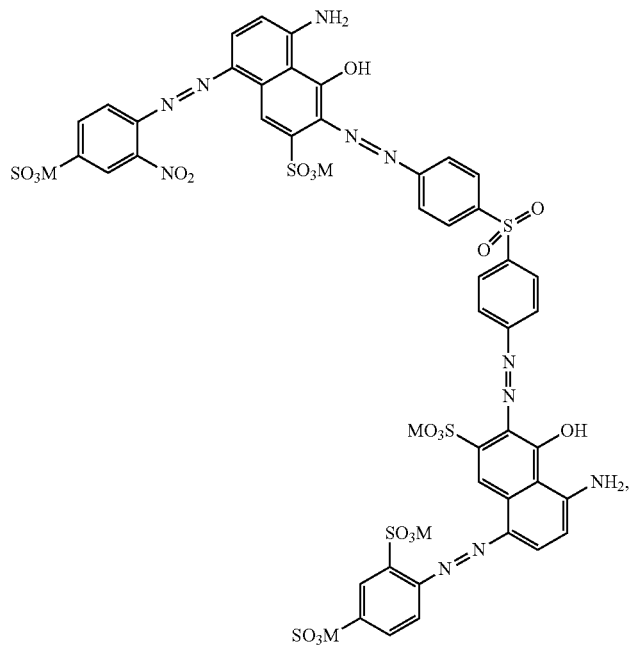
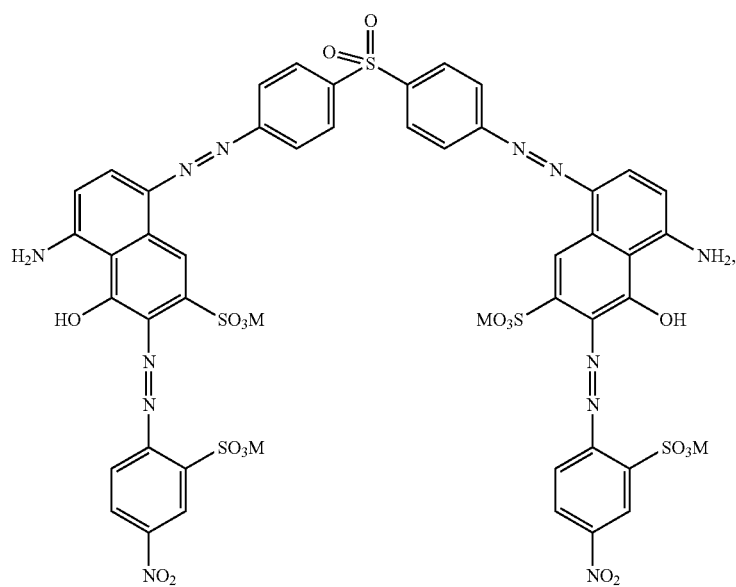

-continued
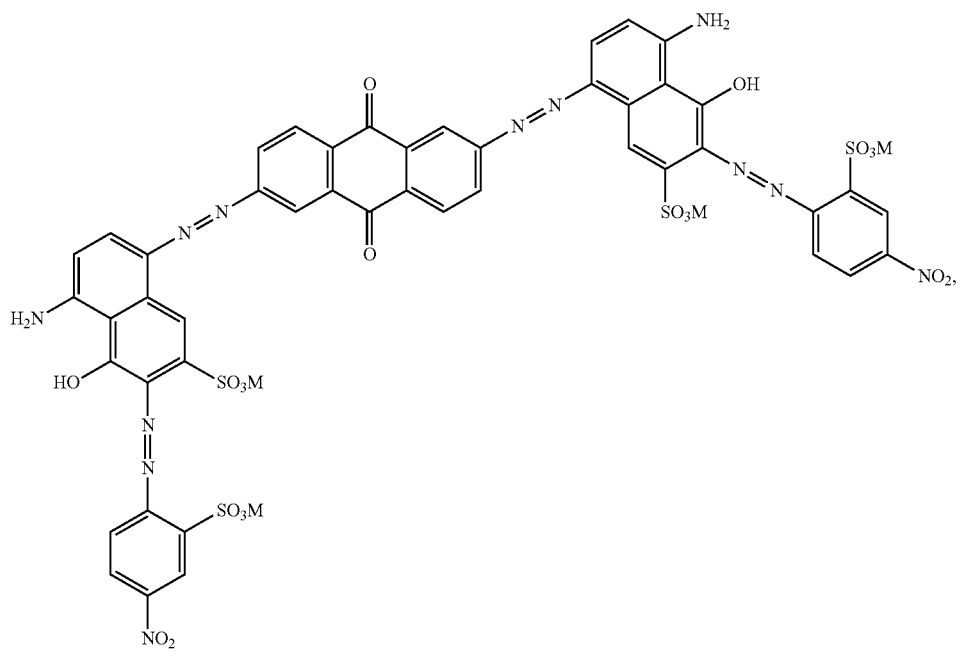
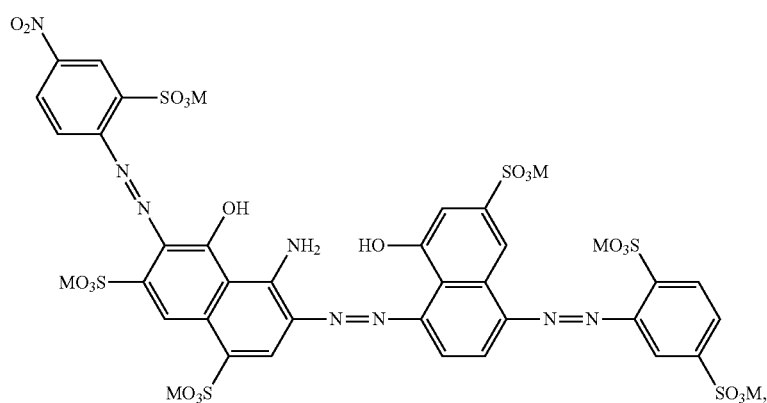
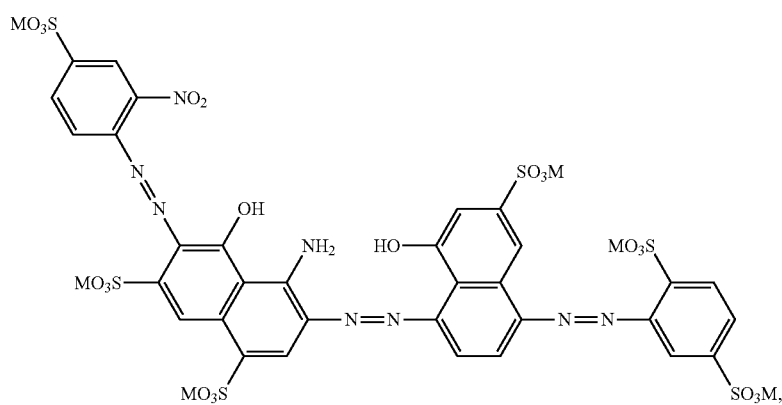

-continued
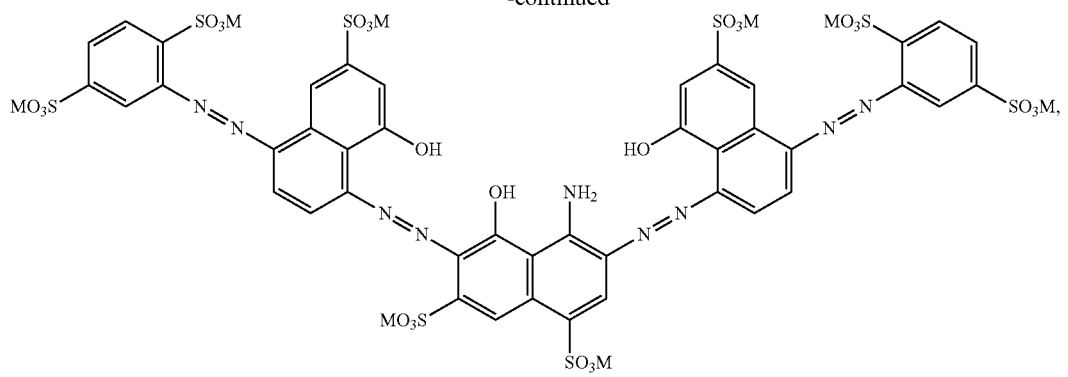
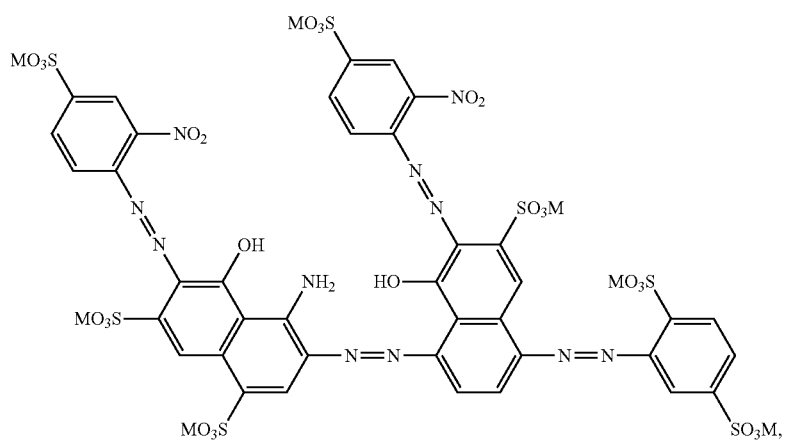
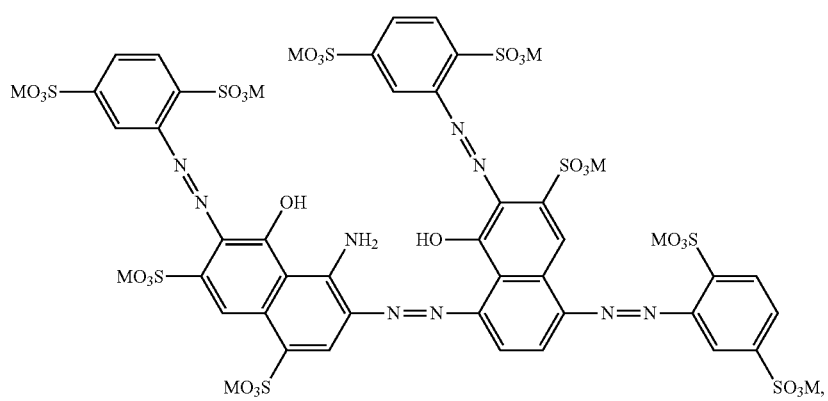
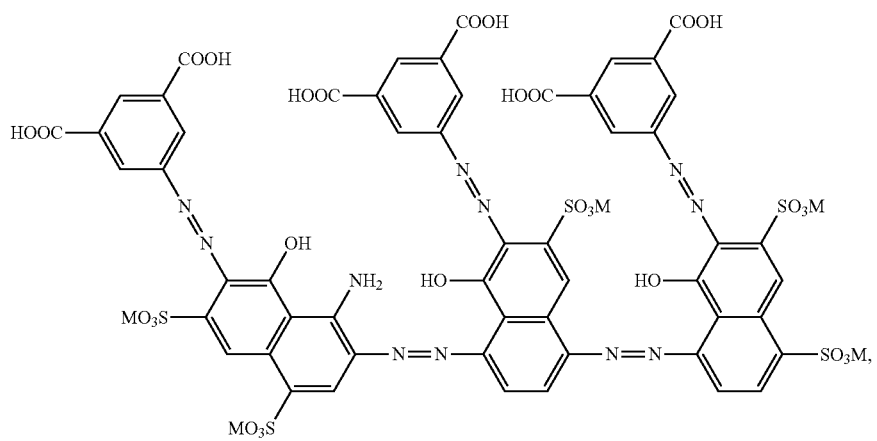

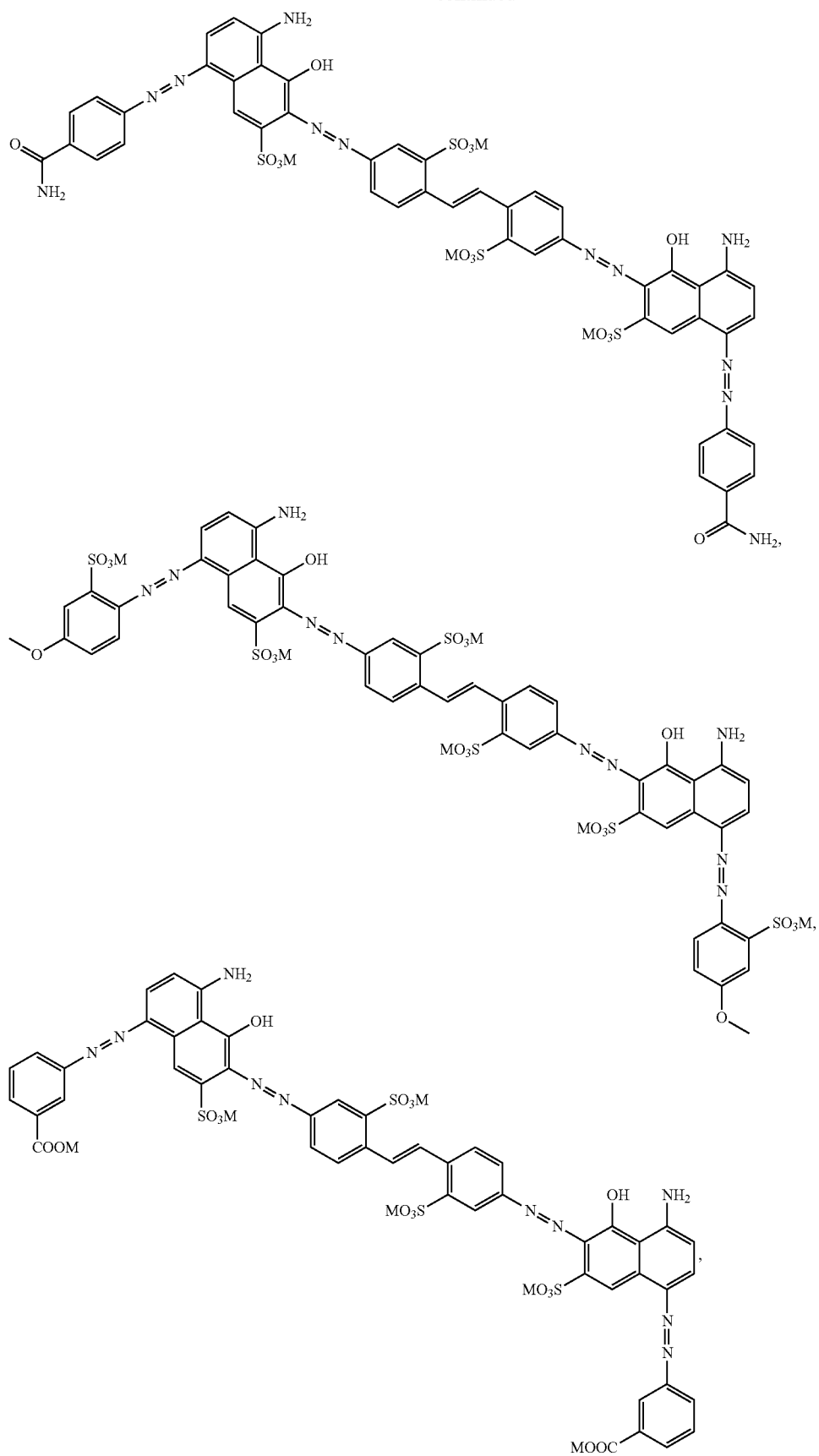

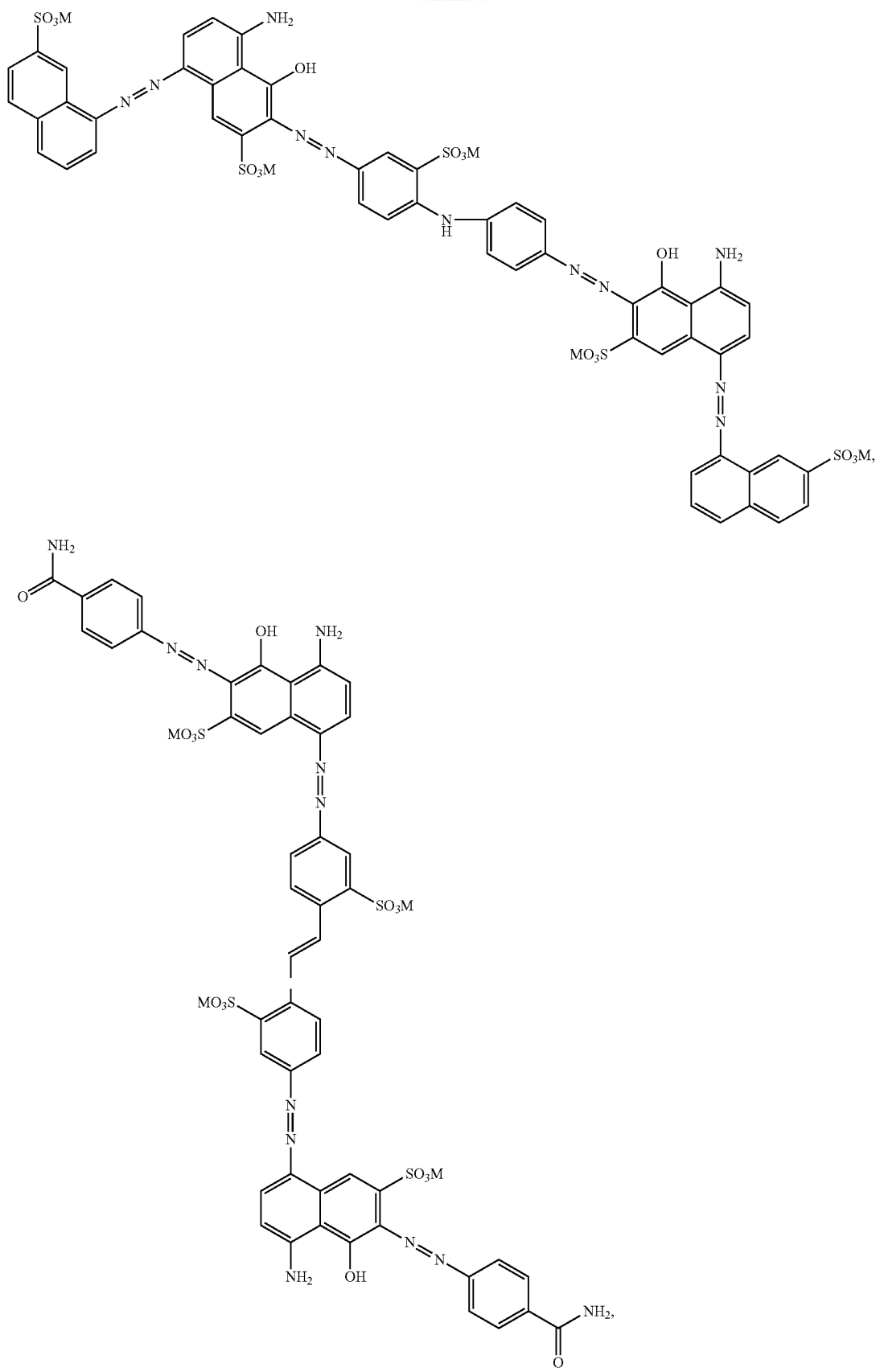

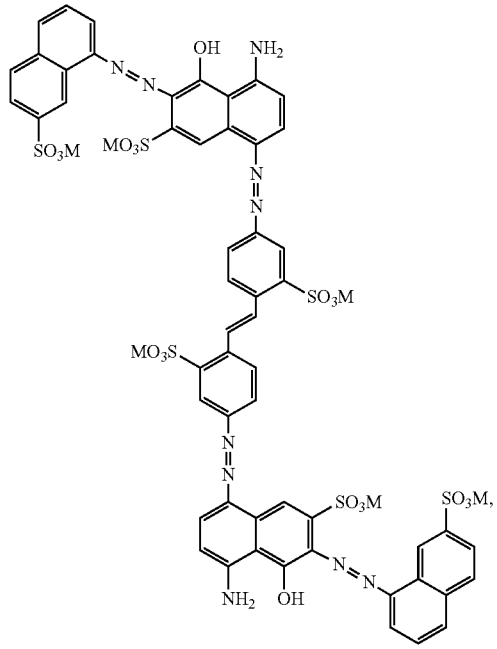
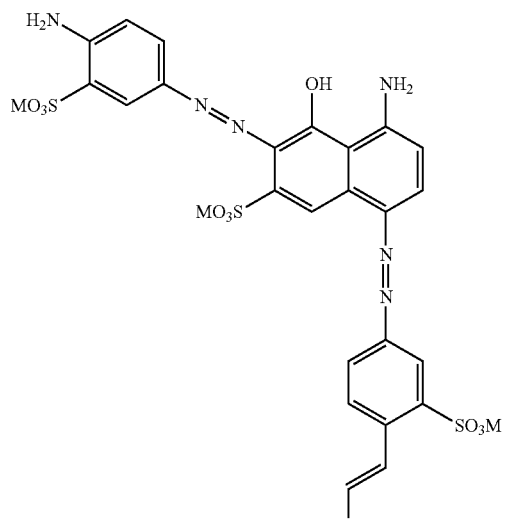
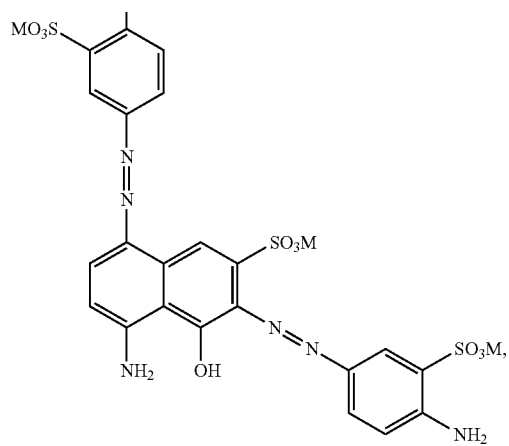

-continued
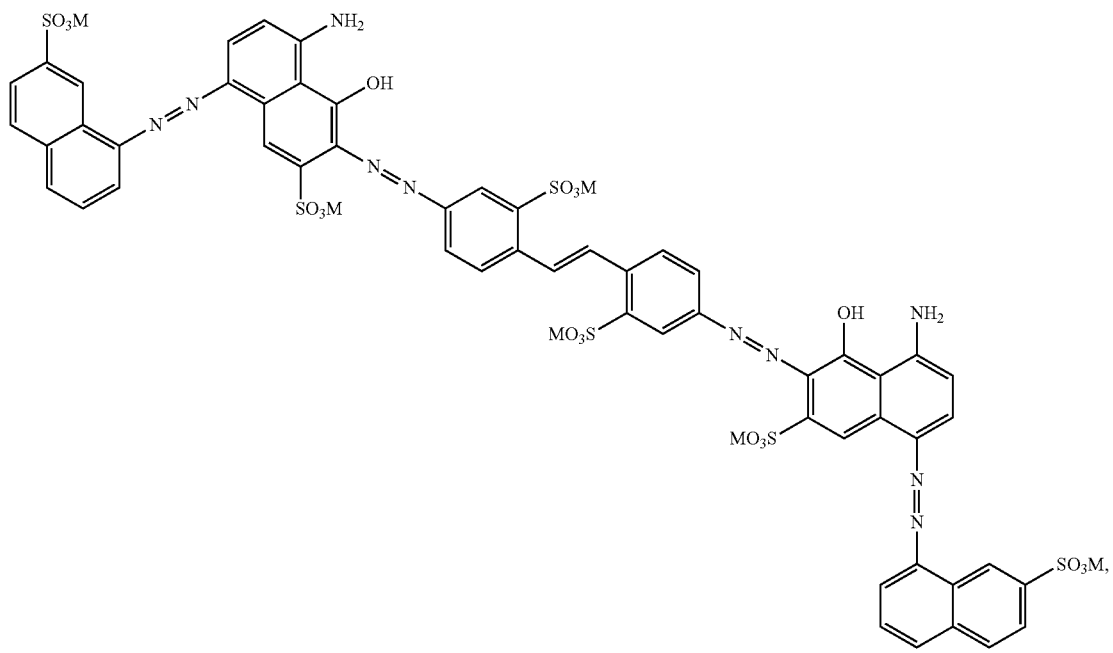
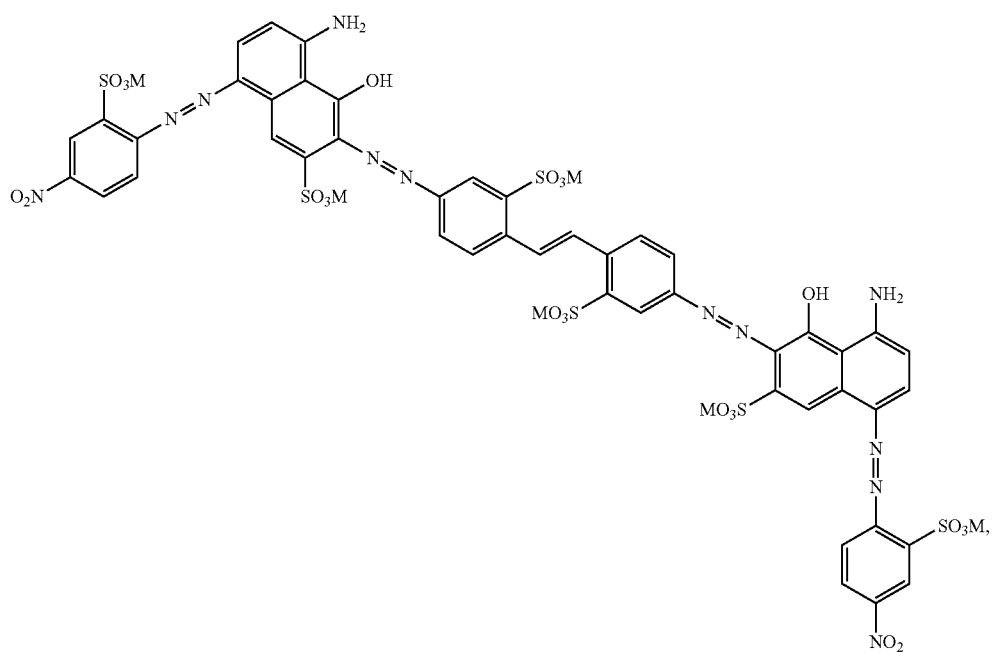

-continued
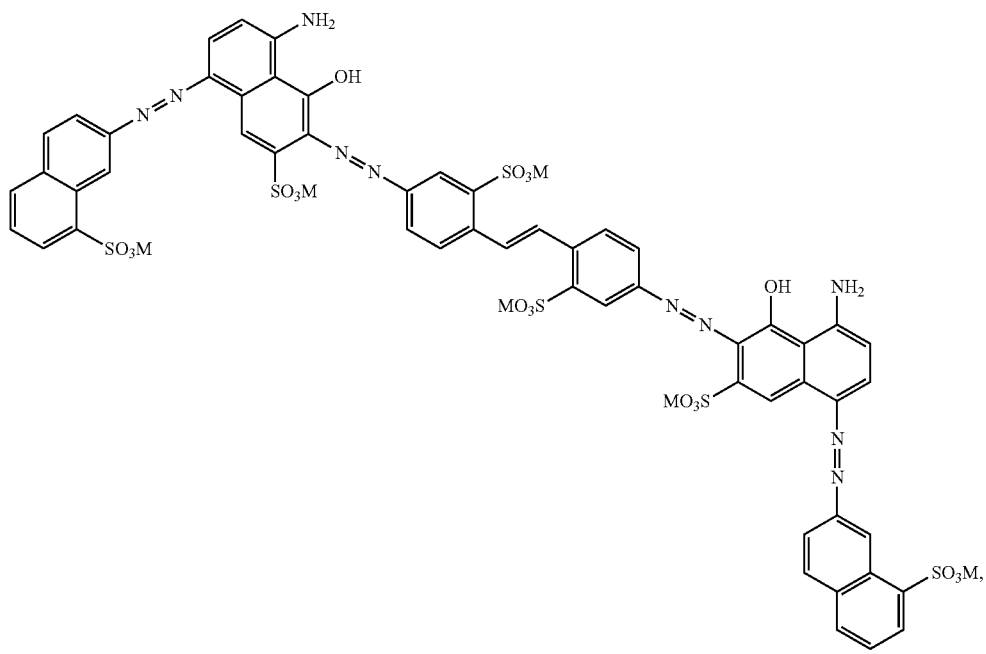
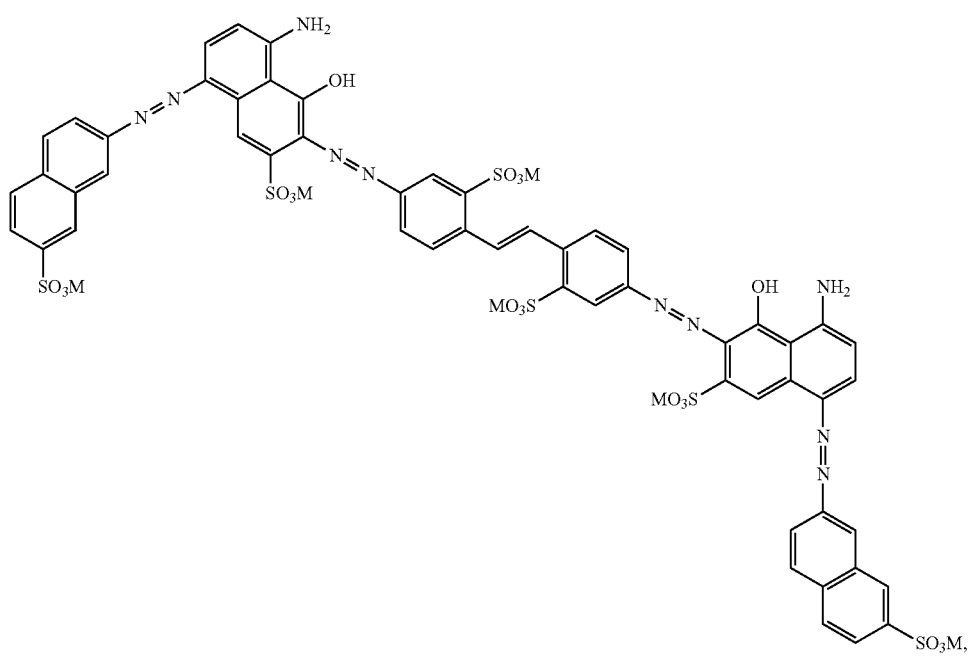

-continued
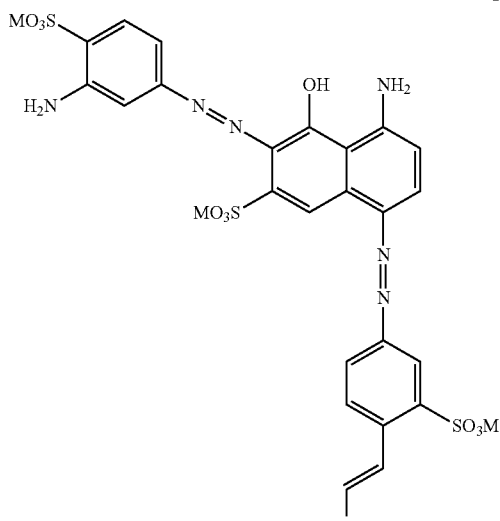
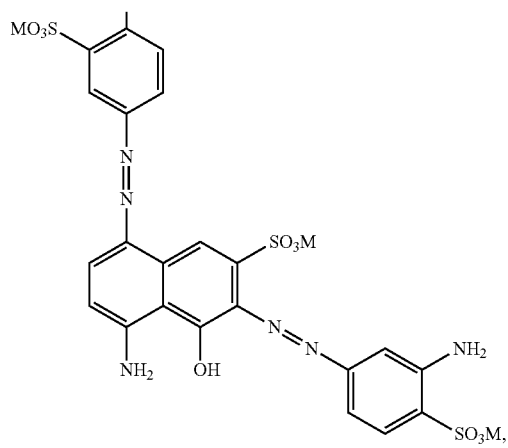
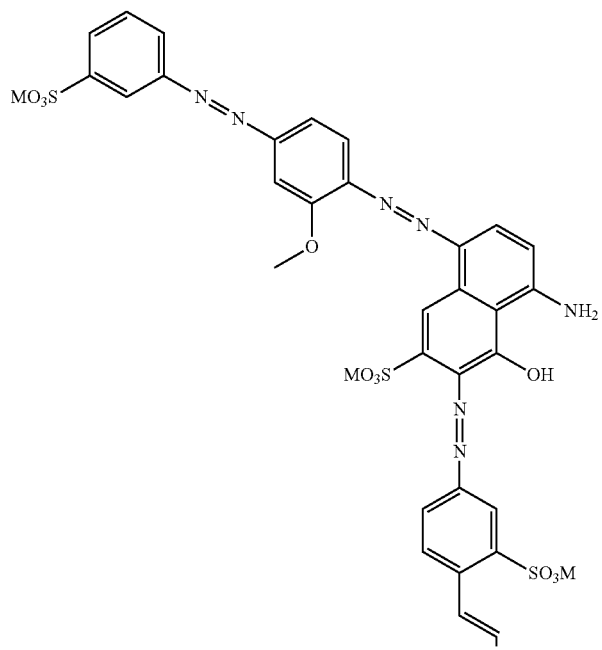

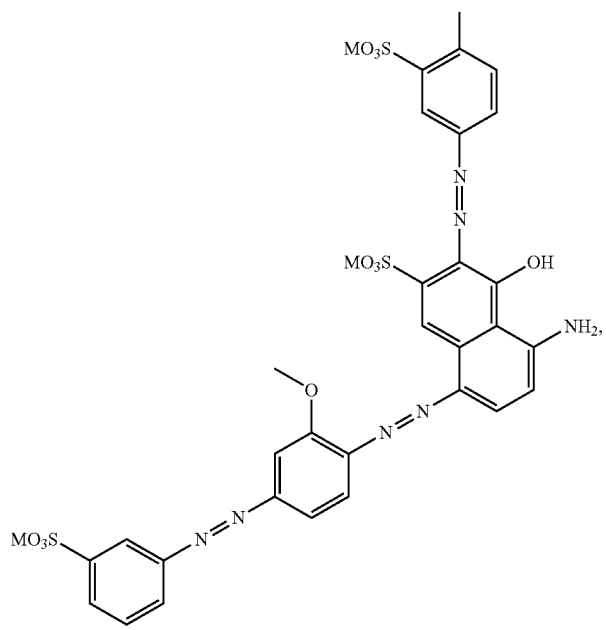
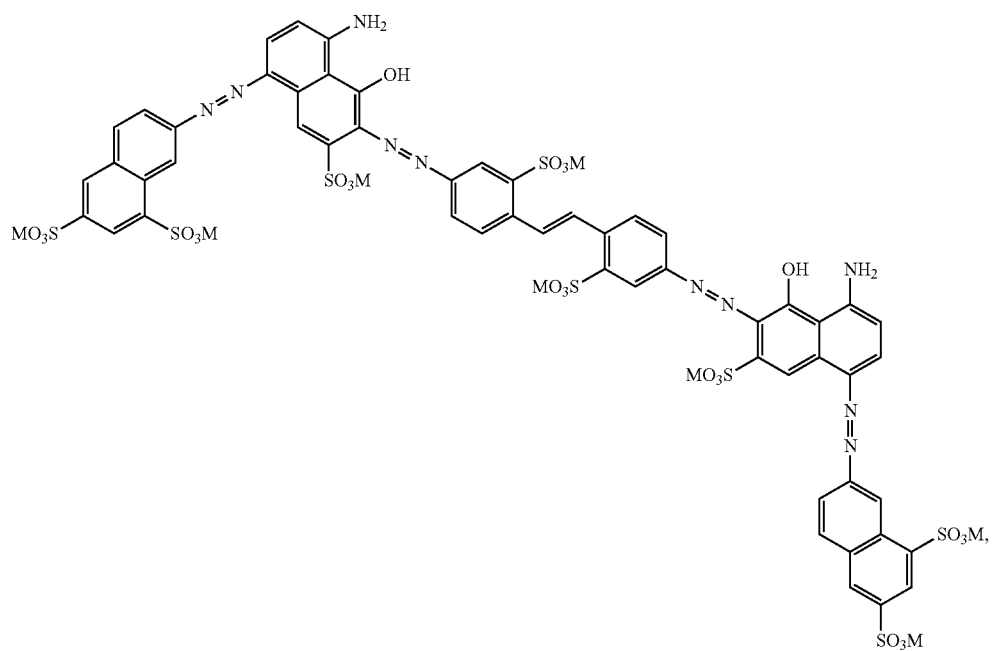

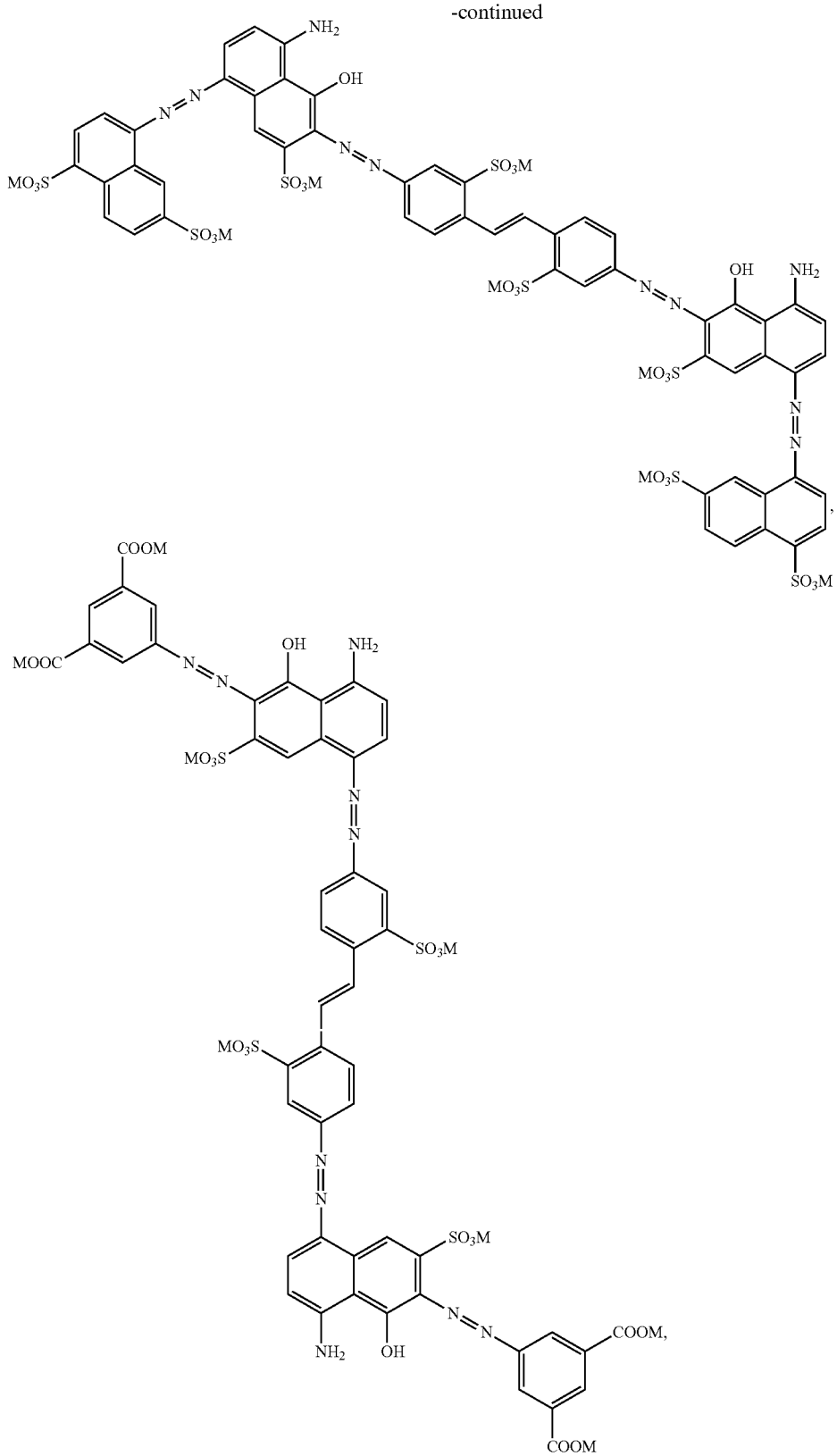
wherein X and M are defined as above.
Further preferred are fully or partially protonated forms of these dyes D2. Also preferred are fully or partially protonated forms of aforementioned dyes D2, in which Na is replaced by another atom selected from the choice described for M above, or a combination of two or more of any of the aforementioned dyes D2.

According to another aspect of the invention, the color of dye D1, or dye D2, is black.

The term "black dye" in the context of the present invention refers to a dye, which dye's L*a*b* values preferably are in the range of: L<=40; −15<=a<=+15; −15<=b+15.

A further aspect of the invention is a method for the preparation of aforementioned dye D1, comprising at least the following steps:

α. providing an at least one aromatic group containing compound of formula XIV,

wherein $Ar^2$ has the meaning as defined for $Ar^2$ of dye D1 above;

β. diazotising the at least one aromatic group containing compound of formula XIV;

γ. coupling the diazotized at least one aromatic group containing compound to a coupling component of formula XV,

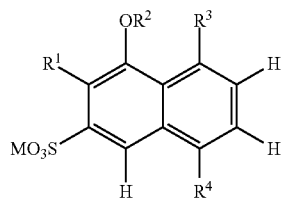

wherein M, $R^1$, $R^2$, $R^3$ are defined for dye D1 above, wherein $R^4$ is —H or —N=N—$Ar^2$, wherein $Ar^2$ is defined as for dye D1 above, wherein a raw product is obtained, γ. purifying the raw product to obtain the dye D1.

Preferably, at least one of $R^1$ and $R^4$ is —H.

Diazotising in the context of the present invention is defined as performing a diazotisation reaction at a compound I, which has at least one amino group. A general method of performing a diazotisation is described in Organikum, 16. Auflage, 1986, D.8.2.1, in particular on page 539, methods A and B. After performing a diazotising reaction, compound I is diazotised, i.e., the at least one amino group of compound I converted into a diazonium cation.

Performing a coupling of a diazotized compound I with a coupling component II results in an azo compound comprising aforementioned compounds I and II, which compounds I and II are interconnected by an azo group, which azo group comes from converting the diazonium cation of compound I during the coupling with coupling compound II. A general method of performing the coupling reaction is described in Organikum, 16. Auflage, 1986, D.8.3.3 (p. 549-551), in particular on page 549, comprising variants A through D. The table on page 550 in section D.8.3.3 can be taken into consideration for choosing the best variant for a specific pair of components I and II out of available variants A through D.

According to a further aspect of the invention, it is preferred to perform the diazotisation and coupling without isolating of any intermediate diazotised compound I. In this event, the coupling component II is added to the dispersion of diazotised compound I.

According to a further aspect of the invention, if —$R^2$ in formulae I, XV and XVII is —H, then —$R^2$ may be replaced by a protecting group. After having obtained the azo dye carrying the protecting group, the protecting group is cleaved. That way, $R^2$ is converted back into —H and the azo dye having a —OH group is obtained. Of the numerous protecting groups known for —OH, one skilled in the art will consider the suitable ones, preferably selected from the group of silyl ethers, ethers, esters and sulfonates.

A further aspect of the invention is a method for the preparation of aforementioned dye D2, comprising at least the following steps:

α. providing an at least one aromatic group containing linker of formula XVI,

wherein $Ar^1$ has the meaning as defined for $Ar^1$ of dye D2 above;

β. diazotising the at least one aromatic group containing linker of formula XVI;

γ. coupling the diazotized at least one aromatic group containing linker to at least one coupling component of formula XVII,

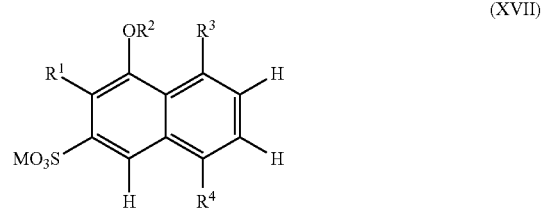

wherein M, $R^1$, $R^2$, $R^3$, $R^4$ are defined for dye D2, wherein at least one of $R^1$ and $R^4$ is —H, wherein a raw product is obtained, δ. purifying the raw product to obtain the dye D2.

Another aspect of the invention is aforementioned method for preparing dye D1, wherein the process is performed in a one-pot synthesis, preferably in one step.

Another aspect of the invention is aforementioned method for preparing dye D2, wherein the process is performed in a one-pot synthesis, preferably in one step.

The term "in one step" refers to a chemical reaction, wherein all reactants are provided before or at the beginning of the reaction. The product obtained in the one step reaction is not subjected to a further reaction. However, the product obtained in the one step reaction can be subjected to one or more purification treatments.

The term "one-pot synthesis", also referred to as "one pot reaction", refers to a multi-step chemical reaction carried out in a single reaction vessel. Typically, a reaction intermediate may be generated in an initial step of reaction, the reaction intermediate is then reacted with other component(s) present in or introduced to the same reaction vessel. The reaction intermediate generated is not isolated but serves directly as a reactant in a next step of reaction. A one-pot synthesis may consist of 1, 2, 3, 4 or more reaction steps. Purification of the raw product finally obtained by the one-pot synthesis may be performed in a separate step, but optionally be conducted within the one reaction vessel, too.

According to another aspect of the invention, the diazotising may be repeated. In this case a first component A is diazotised as described above, then coupled to a coupling component B, by which coupling an azo intermediate is obtained. Another component A', which may be same or different to component A, is diazotised. The aforementioned azo intermediate is now employed as coupling component B', by which coupling another azo intermediate, or the desired dye is obtained. Optionally, this method can be repeated even more often. In a further option, one or more steps may be performed with one or more of the azo intermediates between two diazotising steps, in which protecting groups are removed. This procedure can be followed in order to prepare complex azo dyes having three or more azo groups. The azo intermediates themselves can be dyes, too.

Another aspect of the invention is a dye obtainable by any of the aforementioned methods.

Another aspect of the invention is a liquid phase comprising
1) at least a dye D1, or at least a dye D2, or a dye obtainable by any of the aforementioned methods, or two or more dyes selected from the aforementioned dyes either of the same type of dye or of different types of the aforementioned dyes, and
2) water.

According to a further aspect of the invention, the liquid phase comprises one or more dyes of the invention, e.g. selected from dye D1, dye D2 or a dye obtainable by a method as mentioned above, or a combination of two or more of said dyes, wherein the amount of said dyes of the invention in the liquid phase is in the range of from 0.5 to 20 wt-%., preferably in the range of from 1 to 15 wt.-%, or in the range of from 2 to 10 wt.-%, each based on the total weight of the liquid phase.

According to another aspect of the invention, the liquid phase comprises water in the range of from 20 to 95%-wt., preferably 50 to 80 wt.-%, each based on the total weight of the liquid phase.

Another aspect of the invention is a liquid phase, which contains 30%-wt. or less, preferably 20%-wt. or less, or 10%-wt. or less, or no volatile organic compounds. Volatile organic compounds in the context of the present invention have a boiling point of less than 250° C., determined at p=101.3 kPa, or a vapour pressure of more than 0.27 kPa (2 mm Hg) at 25° C., or both.

According to another aspect of the invention, the liquid phase further comprises N-methyl-2-pyrrolidone or 2-pyrrolidone or both, in a range of from 1 to 30 wt.-%, preferably 2 to 25 wt.-%, each based on the total weight of the liquid phase.

According to another aspect of the invention, the liquid phase comprises one or more of the following additives: biocides, antioxidants, UV stabilisers, rheology modifiers such as thinners or thickeners, pigments, emulsifiers, wetting agents, preservatives, organic solvents, pH-regulating agents such as buffers, or a combination of at least two thereof.

According to another aspect of the invention, the liquid phase is an ink.

Another aspect of the invention is a method for applying a liquid phase on a substrate comprising at least the following steps:
α) Providing a substrate, preferably an inkjet recording sheet as mentioned above,
β) Providing a reservoir comprising the aforementioned liquid phase,
γ) Transferring of at least a part of the liquid phase from the reservoir to the substrate,
δ) Removing of water, and optionally solvents, from the substrate.

By performing aforementioned method, a dyed substrate is obtained, which dyed substrate is at least partially covered by a layer of dye, or which dyed substrate has at least partially absorbed the dye, or a combination of both.

According to a further aspect of the invention, steps β) and γ), or steps β) to δ) of aforementioned method are repeated one or more times on the same substrate, wherein in each step of repetition a liquid phase is provided, which liquid phase comprises another composition of dyes than any liquid phase provided onto the sample prior to said repetition step.

Numerous of the known substrates are considered suitable for the aforementioned method. Preferred substrates are natural or synthetic fibre materials, porous materials, leather and aluminium, or a combination of two or more thereof. Preferably, aforementioned method of applying a liquid phase comprising one or more of the dyes of the invention is used to print text or images onto any one or more of the aforementioned substrates, or to substantively dye said substrates.

Another aspect of the invention is a printed article, comprising
A. a substrate, and
B. a layer comprising at least one of aforementioned dye D1, dye D2 or a dye obtainable by the method for the preparation of a dye D1 or a dye D2 described above, or a combination of two or more of said dyes.

The layer comprising at least one of the aforementioned dyes can be arranged on the surface of the substrate. In particular with substrates that are able to absorb aforementioned liquid phases comprising aforementioned dye or aforementioned dyes at least partially, then the part of the substrate, which absorbed the liquid phase, and thus the dye, is the layer comprising said dye or dyes.

Another aspect of the invention is a use of a dye according to the invention in water-based inks for inkjet printing, for writing utensils or in dyeing solutions for manufacturing color filters for optical and/or opto-electronic applications.

A further aspect of the invention is a use of a dye according to the invention for dyeing materials, which comprise cellulose and/or cellulose derivatives, preferably selected from the group consisting of paper, cotton, viscose, celluloid, leather and wool. If said materials are dyed with a dye of the invention, good water fastness is observed. Any method known in the textile and paper industries for dyeing said materials with substantive dyes, in particular for bulk or surface treatment of sized and unsized papers, is appropriate to dye said material with one or more dyes of the invention. According to a further aspect of the invention, preferred articles of the aforementioned materials are yarns and piece goods of cotton, viscose and linen. These materials may be dyed from a long liquor or in a continuous process.

The following Examples serve for exemplary elucidation of the invention and are not to interpreted as a restriction.

DESCRIPTION OF THE FIGURES

The subject matter of the invention is exemplified in the figures. The figures, however, are not intended to limit the scope of the invention or the claims in any way.

Figure 1:
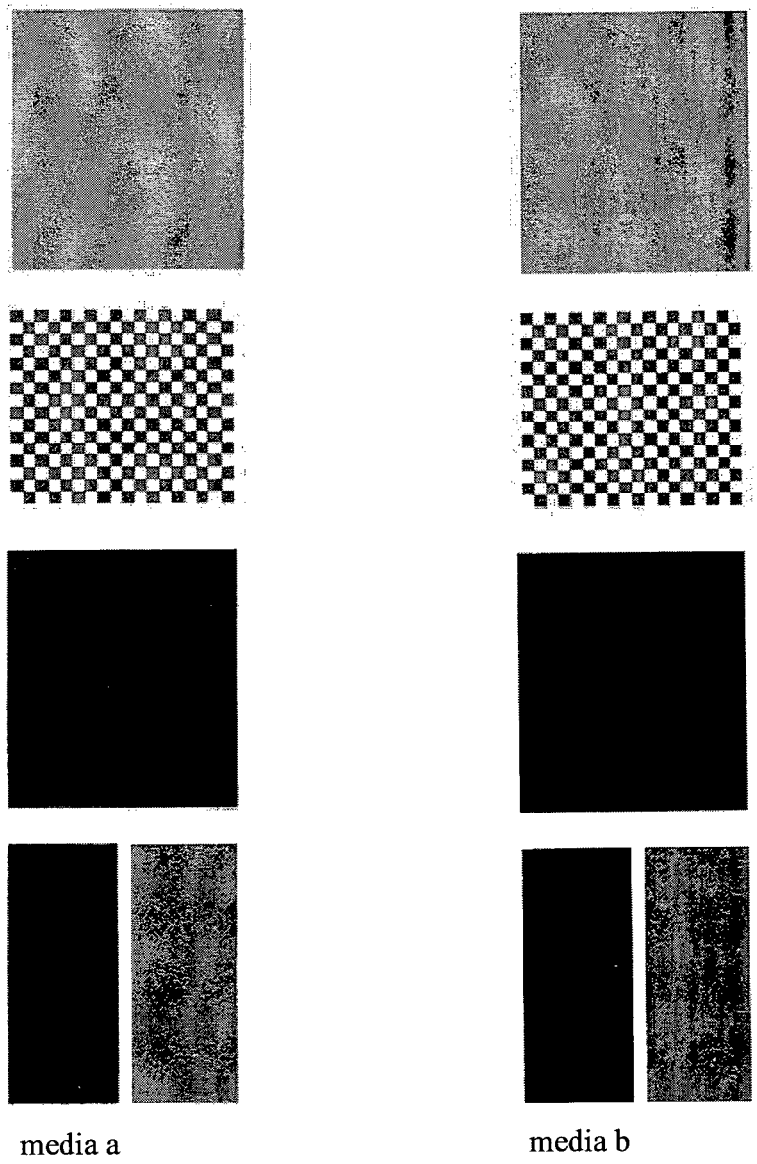
In FIG. 1, a test pattern on test specimen media a (left column) and media b (right column) is shown. Media a and media b are described below. Each test pattern consists of 4 patches. The upmost three patches are used for the water fastness test. The upmost patch is printed at 40% printing density. Patches two and three are printed at 100% printing density. The bottom patch is divided into two segments, both serving as reference (not subjected to the water fastness test). The left segment of the bottom patch is printed at 100% printing density, the right segment of the bottom patch is printed at 40% printing density.
Figure 2A:
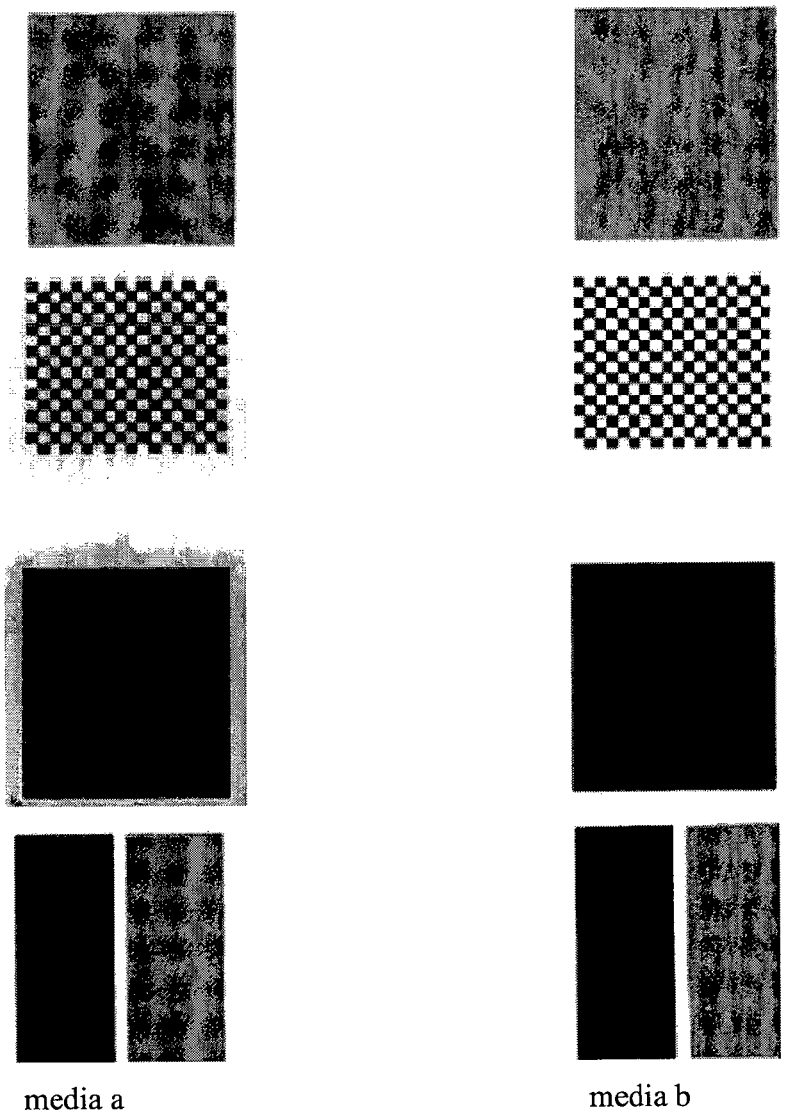

In FIG. 2a, test patterns printed with an ink of the present invention, in which dye 13 was used, are shown after having performed the water fastness test as described below. The composition of the ink was for preparing 10 g of ink: 0.57 g Dye 13, 1.25 g 2-Pyrrolidone, 0.015 g of an aqueous solution (50 wt.-%) Olin® 10G (available from Arch Chemicals Inc., Norwalk, USA), 0.0225 g Surfinol® 465 (available from Air Products and Chemicals Inc., Allentown, USA) and 3 g distilled water. pH=9. The color of the ink/pattern is black. The substrate were media a (left pattern) and media b (right side).

Figure 2B:
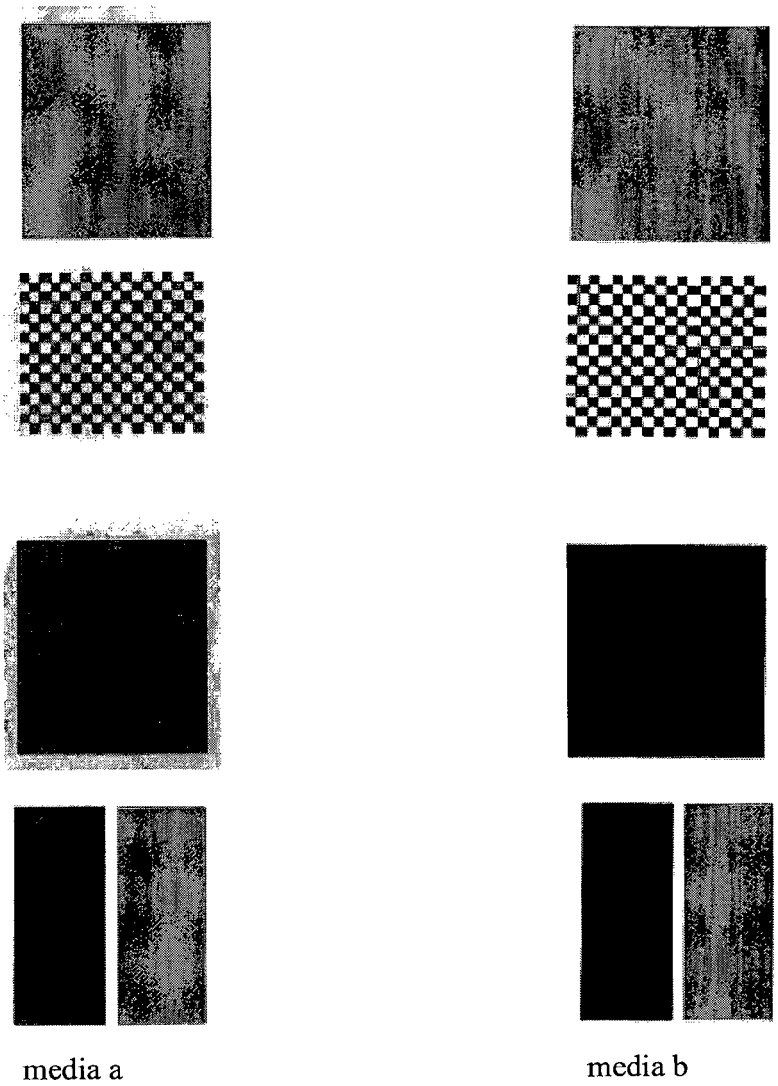

In FIG. 2b, test patterns printed with an ink of the present invention, in which dye 19a was used, are shown after having performed the water fastness test as described below. The composition of the ink was for preparing 10 g of ink: 0.58 g Dye 19a, 1.25 g 2-Pyrrolidone, 0.015 g of an aqueous solution (50 wt.-%) Olin® 10G (available from Arch Chemicals Inc., Norwalk, USA), 0.0225 g Surfinol® 465 (available from Air Products and Chemicals Inc., Allentown, USA) and 3 g distilled water. pH=9. The color of the ink/pattern is neutral black. The substrate were media a (left pattern) and media b (right side).

Figure 3:
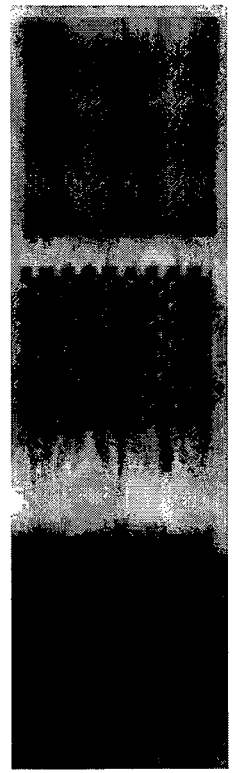
Figure 3:
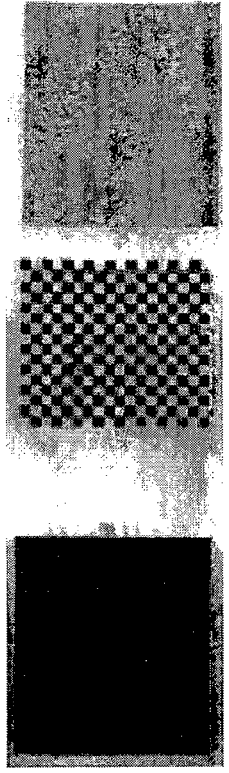
Figure 3:
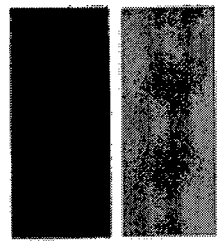
Figure 3:
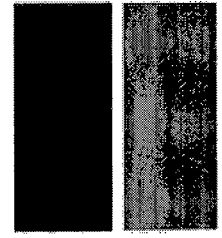

In FIG. 3, test patterns printed with a comparative ink (HP364XL of Hewlett Packard GmbH, Germany) are shown after having performed the water fastness test as described below. The color of the ink/pattern is neutral black. The substrates were media a (left pattern) and media b (right side).

Figure 4:
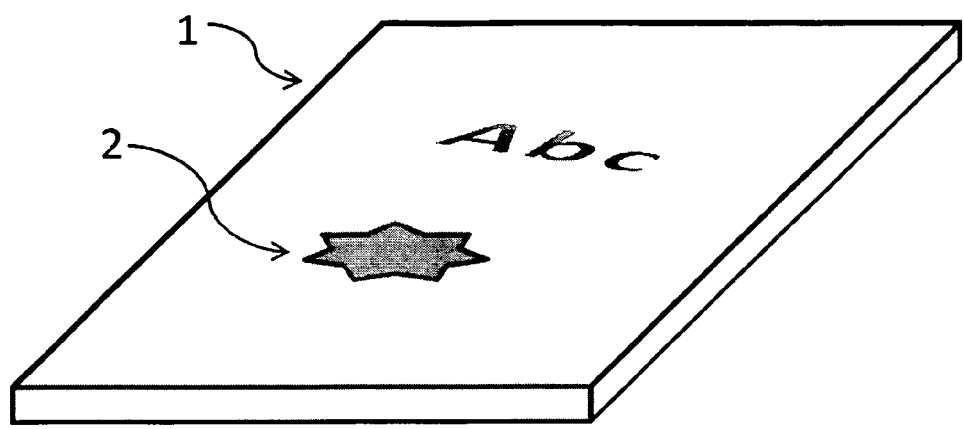

In FIG. 4, a printed substrate is shown.

EXAMPLES

Example 1

Preparation of Intermediate (1)

The intermediate monoazo compound of formula (1)

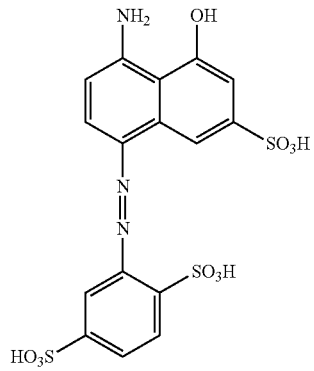

(1)

was prepared in the following way:
Diazotizing aniline-2,5-disulphonic acid 0.07 mol (20.3 g) of aniline-2,5-disulphonic acid were dissolved in 80 g of water and 17.5 g of hydrochloric acid (concentration: 37 wt.-%). Then, 0.075 mol (5.17 g) of sodium nitrite in 15 g of water were added at a temperature of 5° C. to yield a diazotised solution. Excess of sodium nitrite was removed with 5.8 g of a 10 wt.-% solution of sulfamic acid.

Coupling of the diazotised compound with 5-Amino-4-hydroxynaphthalene-2-sulfonic acid (desulfoK-acid)

Then, the solution of diazotised aniline-2,5-disulphonic acid was coupled with 0.075 mol (19.0 g) of 5-Amino-4-hydroxynaphthalene-2-sulfonic acid (95 wt.-%, CAS35400-55-6) at a value of pH in the range of from 0.8 to 1.1 while maintaining this value of pH by the addition of sodium hydroxide. The reaction was stirred for 1.5 hours at a temperature between 0° C. and 5° C. and was then warmed up to room temperature. The mixture was then stirred for further 2 hours at room temperature (=20° C.) while maintaining the pH value. The reaction mixture was finally cooled down to a temperature of 8° C. and then precipitated with EtOH and filtered. The precipitate in the filter was washed with an ethanol/water mixture (2:1 Vol./Vol.) and dried in vacuum for 5 hours at 40° C.

The monoazo dye of formula (1) was obtained in a yield of 70%, based on the number of moles of aniline-2,5-disulphonic acid.

Example 1a

Preparation of Dye (1a)

The intermediate monoazo compound of formula (1a) was prepared in the following way:

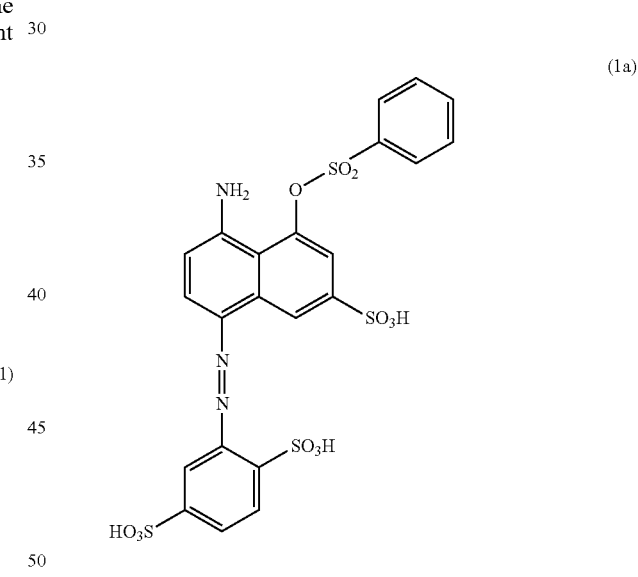

(1a)

Compound (1) was prepared in the same way as described for example 1 but the product was not precipitated but directly used for a further reaction step. In this further step, the pH was adjusted to a value of 12 with 24.90 g of a 30 wt.-% solution of NaOH and then, the reaction mixture was cooled down to 20° C. 0.09 mol (15.90 g) of Benzenesulfonylchloride were slowly added to the reaction mixture by keeping the pH at a value between 11 and 12. After 2 hours the pH was adjusted to a value of 0.8 with a 37 wt.-% solution of HCl and 15 wt.-% of EtOH, the wt.-% based on the total reaction volume, were added to the suspension. The resulting product was filtered off and the precipitate in the filter was washed with EtOH.

The monoazo dye of formula (1a) was obtained in a yield of 85%, based on the number of moles of aniline-2,5-disulphonic acid.

Example 2a

Preparation of Dye (2a)

The intermediate monoazo compound of formula (2a)

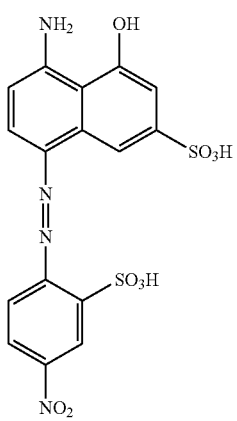

(2a)

was prepared as in example 1 but by using 4-Nitroaniline-2-sulphonic acid in place of aniline-2,5-disulphonic acid of example 1.

Example 2b

Preparation of Dye (2b)

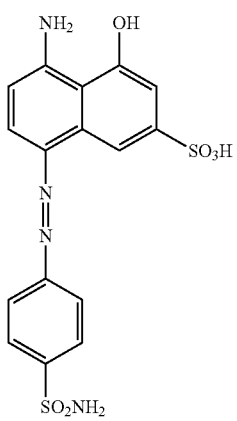

(2b)

This example was prepared as example 2a. However, sulfanilamide was used in place of 4-Nitroaniline-2-sulphonic acid of example 2a.

Example 2c

Preparation of Dye (2c)

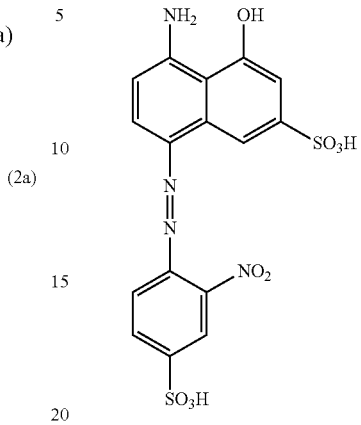

(2c)

This example was prepared as example 2a. However, 4-Amino-3-nitro benzenesulfonic acid was used in place of 4-Nitroaniline-2-sulphonic acid of example 2a.

Example 2d

Preparation of Dye (2d)

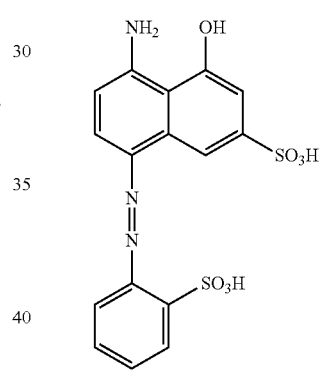

(2d)

This example was prepared as example 2a. However, 2-Aminobenzenesulfonic acid was used in place of 4-Nitroaniline-2-sulphonic acid of example 2a.

Example 2e

Preparation of Dye (2e)

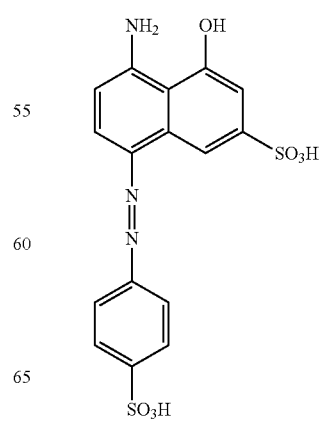

(2e)

This example was prepared as example 2a. However, 4-Aminobenzenesulfonic acid was used in place of 4-Nitroaniline-2-sulphonic acid of example 2a.

Example 2f

Preparation of Dye (2f)

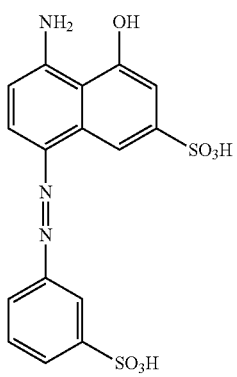
(2f)

This example was prepared as example 2a. However, 3-Aminobenzenesulfonic acid was used in place of 4-Nitroaniline-2-sulphonic acid of example 2a.

Example 2g

Preparation of Dye (2g)

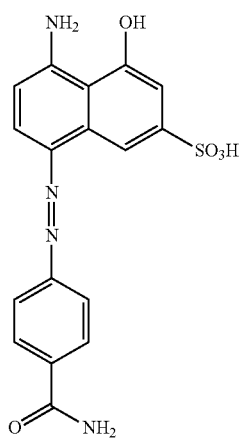
(2g)

This example was prepared as example 2a. However, 4-Aminobenzamide was used in place of 4-Nitroaniline-2-sulphonic acid of example 2a.

Example 2h

Preparation of Dye (2h)

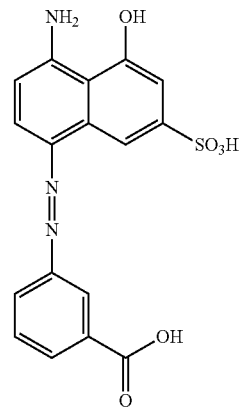
(2h)

This example was prepared as example 2a. However, 3-Aminobenzoic acid was used in place of 4-Nitroaniline-2-sulphonic acid of example 2a.

Example 2i

Preparation of Dye (2i)

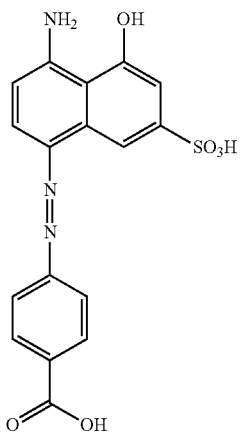
(2i)

This example was prepared as example 2a. However, 4-Aminobenzoic acid was used in place of 4-Nitroaniline-2-sulphonic acid of example 2a.

Example 3

Preparation of Dye 3

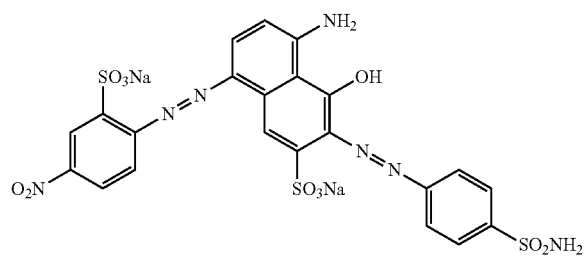

(3)

0.012 mol (2.0 g) of Sulfanilamide were dissolved in 16 g ice water with 6 g hydrochloric acid (concentration: 37 wt.-%). 0.012 mol (0.85 g) NaNO$_2$ in 10 ml of water were slowly added at a temperature of 0° C. to the Sulfanilamide yielding diazotised sulfonamide. The solution of diazotised sulphonamide was then added to 0.011 mol (5.30 g) of the intermediate 2 (of example 2), which was dissolved 50 g ice water. The coupling was performed at a pH value between 9 and 11 and at a temperature between 0 and 5° C. while maintaining this value of pH by the addition of sodium hydroxide. After 1 h the reaction mixture was warmed to room temperature and the pH was adjusted to a value of 5.0 with hydrochloric acid (37 wt.-% solution). The raw product was filtered off and the precipitate was redissolved in water with sodium hydroxide (30 wt.-% solution), then clarified over celite and dialysed by reverse osmosis using a Thomapor® membrane (art. 50436, Reichelt Chemietechnik Heidelberg). After evaporation of residual water, dye 3 was precipitated with EtOH, filtered and the precipitate was dried in vacuum for 5 hours at 40° C.

Dye 3 was obtained in a yield of 80%, based on the number of moles of sulfanilamide.

Example 4

Preparation of Dye (4)

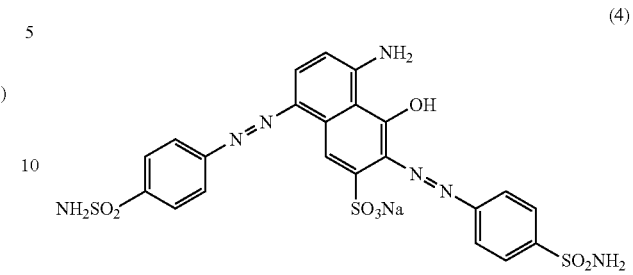

(4)

This example was prepared as example 3. However, dye 4 was prepared using Sulfanilamide for both coupling reactions of example 3.

Example 5a

Preparation of Dye 5a

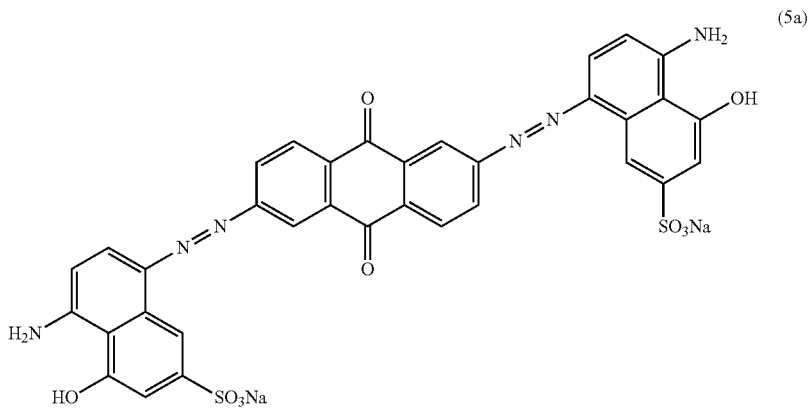

(5a)

(0.06 mol) 14.4 g of 2,6-diaminoanthraquinone are introduced into 75 ml of concentrated sulfuric acid in the course of 10 min. so that the temperature of the mixture does not exceed 40° C. After stirring for 30 min. at room temperature, 21.6 ml of 40 wt.-% nitrosylsulfuric acid are slowly added dropwise in such a manner that the temperature is kept between 22 and 25° C. (approx. 20 min.). The mixture is then stirred for 4 hours at room temperature. A brown suspension of tetrazotised 2,6-diaminoanthraquinone was obtained.

The suspension of the tetrazotised 2,6-diaminoanthraquinone was coupled with 0.12 mol (30.2 g, 95 wt. %) of 5-Amino-4-hydroxynaphthalene-2-sulfonic acid at a value of pH between 0.5 and 1.0 and at a temperature of 5-10° C. The raw product was filtered off, the precipitate was washed with an ethanol/water mixture (2:1), redissolved at pH 12, and filtered over a mixture of celite and charcoal carbon, and then dialysed by reverse osmosis using a Thomapor® membrane (art. 50436, Reichelt Chemietechnik Heidelberg). Residual water was removed by evaporation and obtained dye 5a was dried.

Dye 5a was obtained in a yield of 90%, based on the number of moles of 2,6-diaminoanthraquinone.

Example 5b

Preparation of Dye 5b

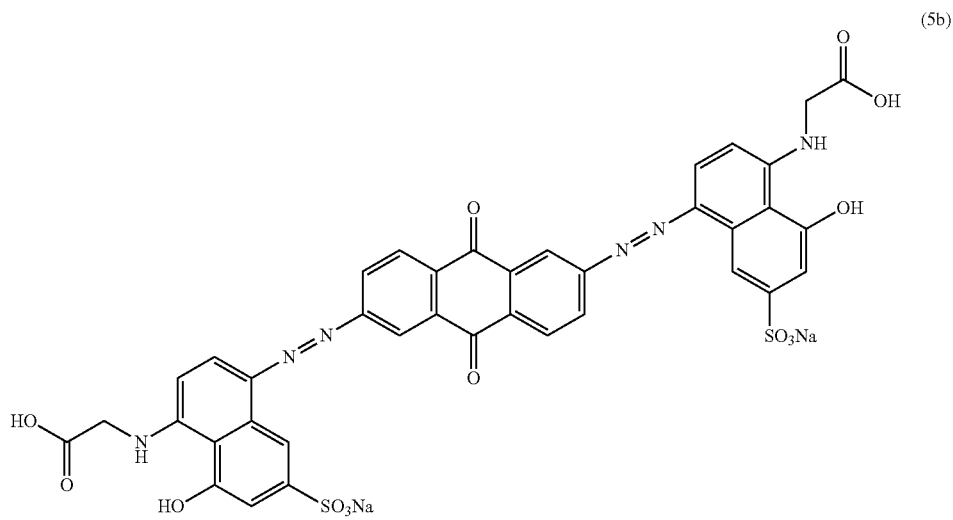

This example was prepared as example 5a. However, dye 5b was prepared using [(8-hydroxy-6-sulfo-1-naphthyl)amino]acetic acid in place of 5-amino-4-hydroxynaphthalene-2-sulfonic acid of example 5a.

Example 6

Preparation of Dye 6

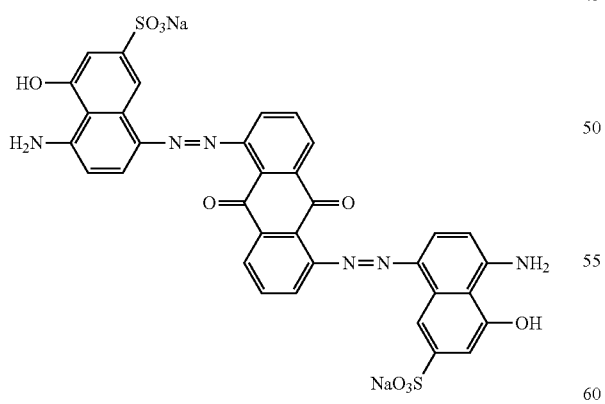

This example was prepared as example 5a. However, 1,5-diaminoanthraquinone was used in place of 2.6-diaminoanthraquinone of example 5a.

Example 7

Preparation of Dye 7

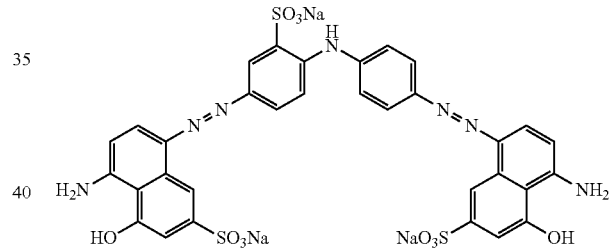

This example was prepared as example 5a. However, 5-Amino-2-[(4-aminophenyl)amino]benzenesulfonic acid was used in place of 2,6-diaminoanthraquinone of example 5a.

Example 8

Preparation of Dye 8

(8)

This example was prepared as example 5a. However, 4,4'-Diaminodiphenyl Sulfone was used in place of 2,6-diaminoanthraquinone of example 5a.

Example 9

Preparation of Dye 9

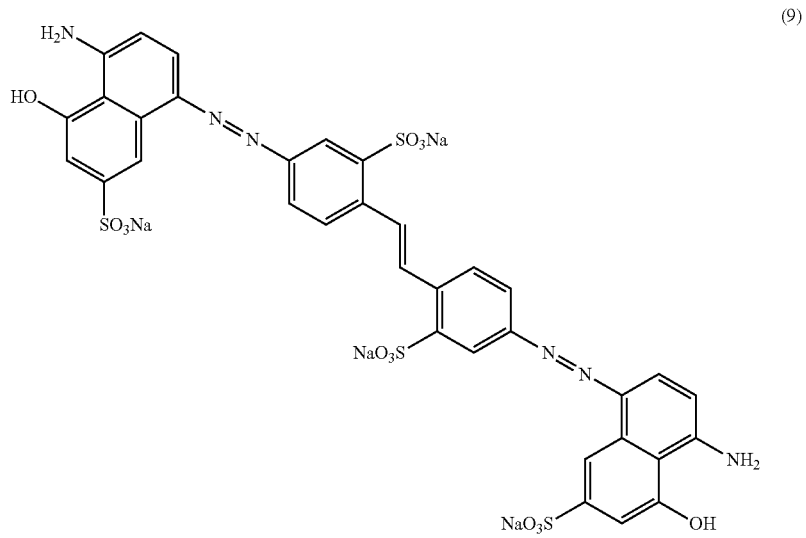
(9)

This example was prepared as example 5a. However, 4,4'-Diamino-2,2'-stilbenedisulfonic acid was used in place of 2,6-diaminoanthraquinone of example 5a.

Example 10

Preparation of Dye 10

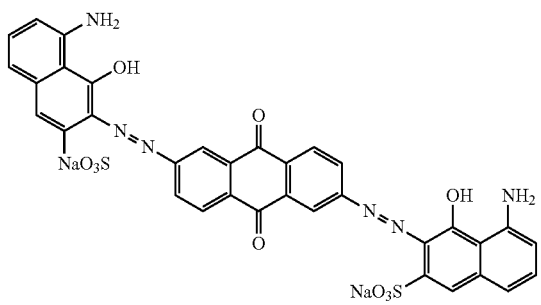
(10)

A suspension of tetrazotised 2,6-diaminoanthraquinone was prepared as described for Example 5a. This suspension was then coupled with 0.12 mol (30.2 g, 95 wt.-%) of 5-Amino-4-hydroxynaphthalene-2-sulfonic acid at a value of pH between 8.0 and 9.0 and at a temperature of 0-5° C. The raw product was filtered off, the precipitate was washed with an ethanol/water mixture (2:1), redissolved at pH 12, and filtered over a mixture of celite and charcoal carbon, and then dialysed by reverse osmosis using a Thomapor® membrane (art. 50436, Reichelt Chemietechnik Heidelberg). Residual water was removed by evaporation and obtained dye 10 was dried.

Dye 10 was obtained in a yield of 80%, based on the number of moles of 2,6-diaminoanthraquinone.

Example 11

Preparation of Dye 11

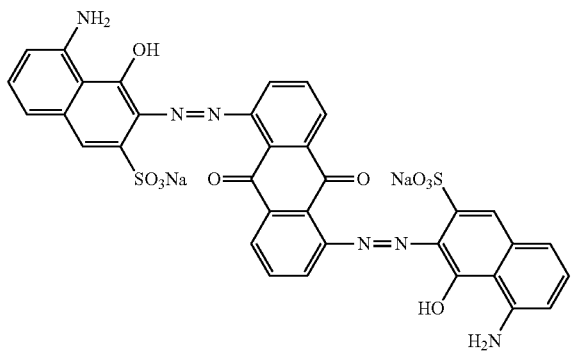
(11)

This example was prepared as example 10. However, 1,5-diaminoanthraquinone was used in place of 2,6-diaminoanthraquinone of example 10.

Example 12

Preparation of Dye 12

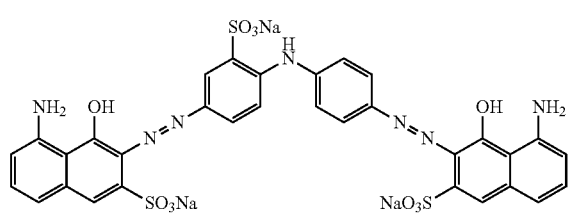
(12)

This example was prepared as example 10. However, 5-Amino-2-[(4-aminophenyl)amino]benzenesulfonic acid was used in place of 2,6-diaminoanthraquinone of example 10.

Example 13
Preparation of Dye 13
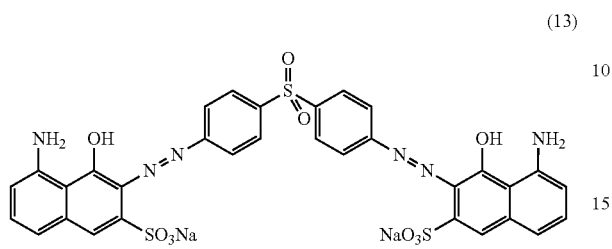
(13)
This example was prepared as example 10. However, 4,4'-Diaminodiphenyl Sulfone was used in place of 2,6-diaminoanthraquinone of example 10.
Example 14
Preparation of Dye 14
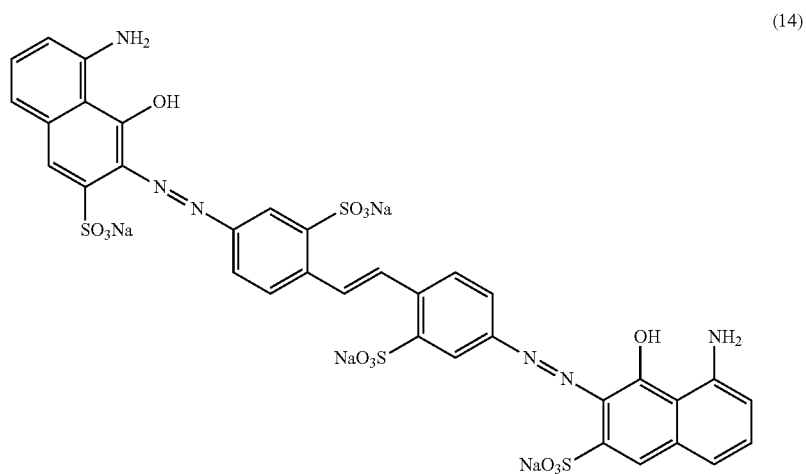
(14)
This example was prepared as example 10. However, 4,4'-Diamino-2,2'-stilbenedisulfonic acid was used in place of 2,6-diaminoanthraquinone of example 10.

Example 15

Preparation of Dye 15

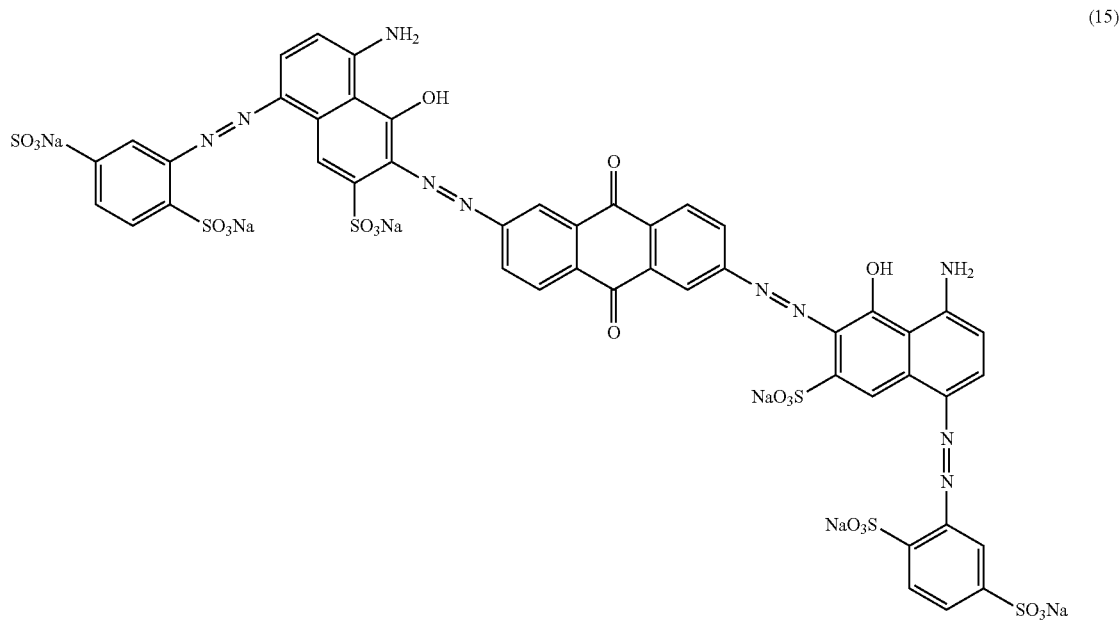

A suspension of tetrazotised 2,6-diaminoanthraquinone, prepared as described for Example 5a, was coupled with 0.125 mol (59.1 g) of the azo dye intermediate (1) at a value of pH between 8.0 and 9.0 and at a temperature of 0-5° C. The pH of the mixture was adjusted to 6.5 and the product was filtered off. The precipitate was washed with an ethanol/water mixture (2:1), redissolved at pH 12, and filtered over a mixture of celite and charcoal carbon, and then dialysed by reverse osmosis using a Thomapor® membrane (art. 50436, Reichelt Chemietechnik Heidelberg). Residual water was removed by evaporation and resulting dye (15) was dried.

Dye (15) was obtained in a yield of 60%, based on the number of moles of 2,6-diaminoanthraquinone.

Example 16

Preparation of Dye 16

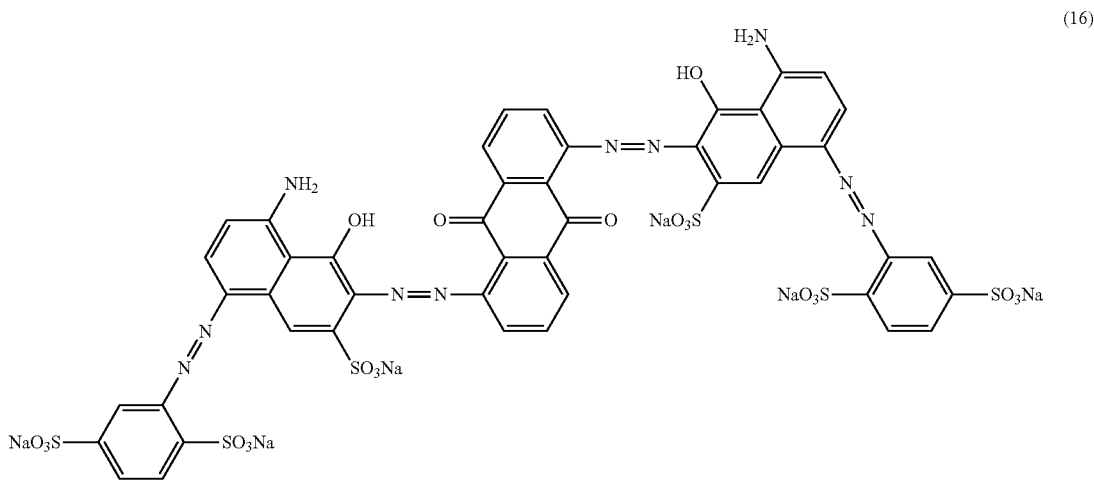

This example was prepared as example 15. However, 1,5-diaminoanthraquinone was used in place of 2.6-diaminoanthraquinone of example 16.

Example 17a

Preparation of Dye (17a)

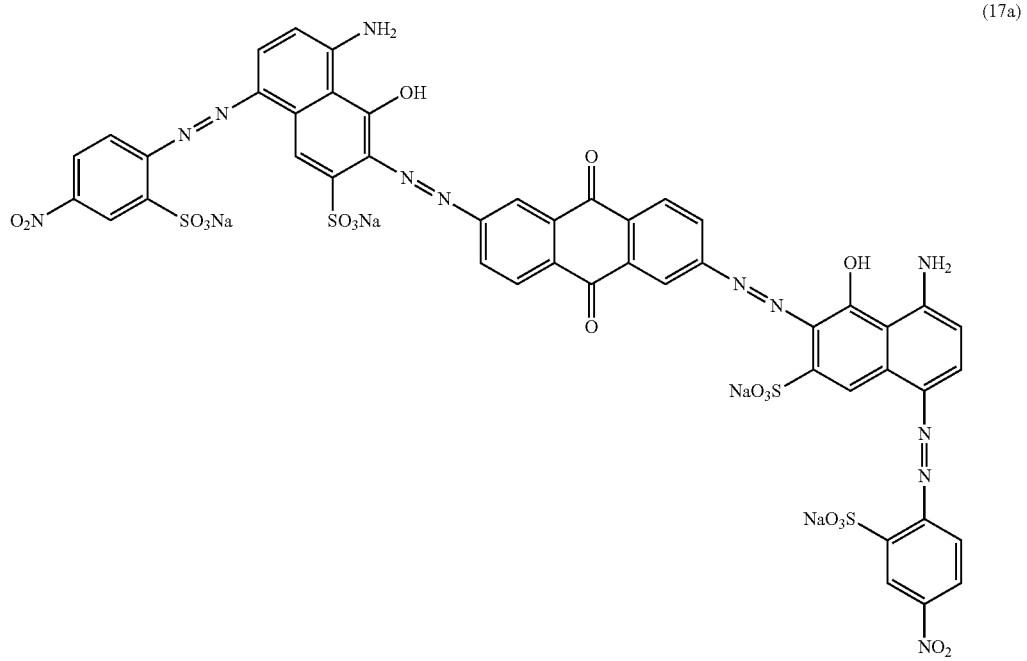

(17a)

This example was prepared as example 15. However, the intermediate prepared in example 2a was used in place of intermediate prepared in example 1 of example 15.

Example 17b

Preparation of Dye (17b)

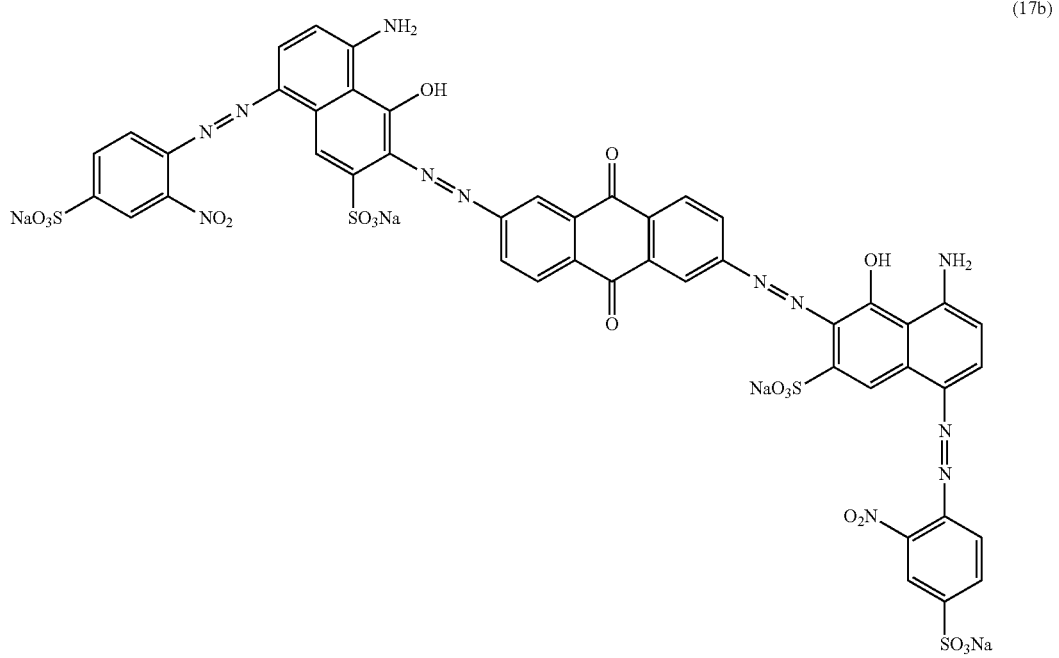

(17b)

This example was prepared as example 17a. However, the intermediate of example 2c was used in place of the intermediate prepared in example 2a of example 17a.

Example 18a

Preparation of Dye (18a)

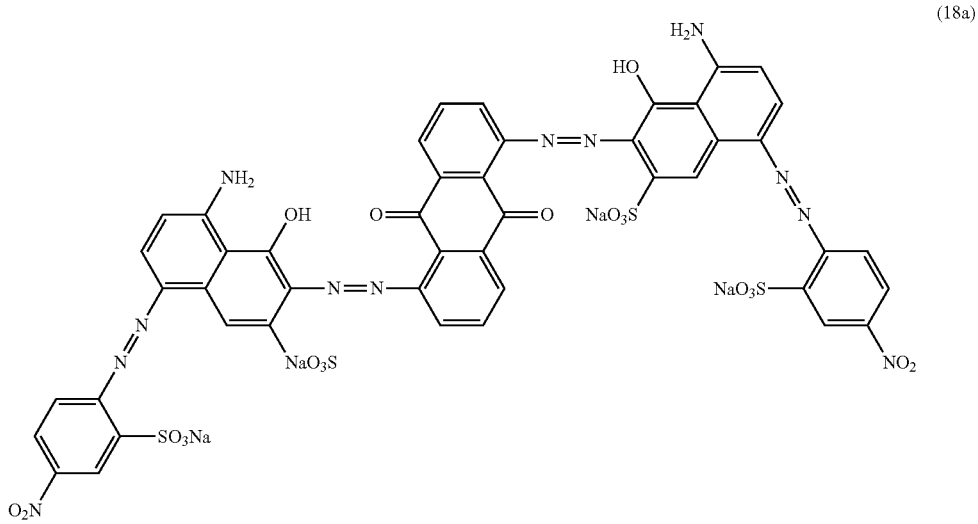

This example was prepared as example 17a. However, the 1,5-diaminoanthraquinone was used in place of 2.6-di-aminoanthraquinone of example 17a.

Example 18b

Preparation of Dye (18b)

This example was prepared as example 18a. However, the intermediate of example 2c was used in place of the intermediate prepared in example 2a of example 18a.

Example 19a

Preparation of Dye (19a)

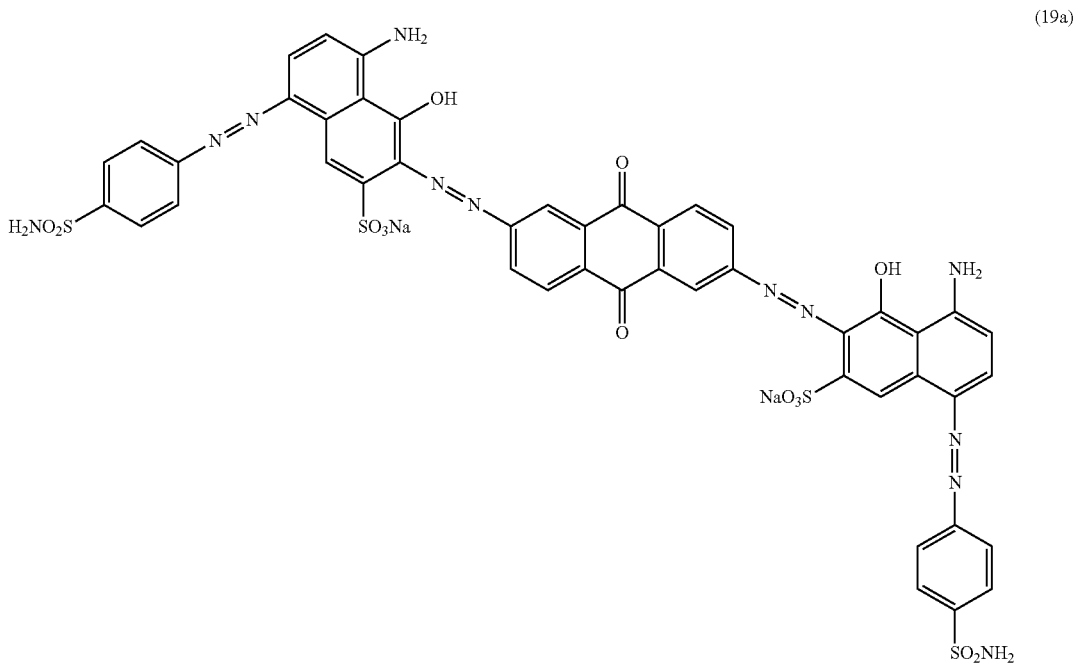

This example was prepared as example 15. However, the intermediate of example 2b was used in place of intermediate prepared in example 1 of example 15.
Example 19b
Preparation of Dye (19b)
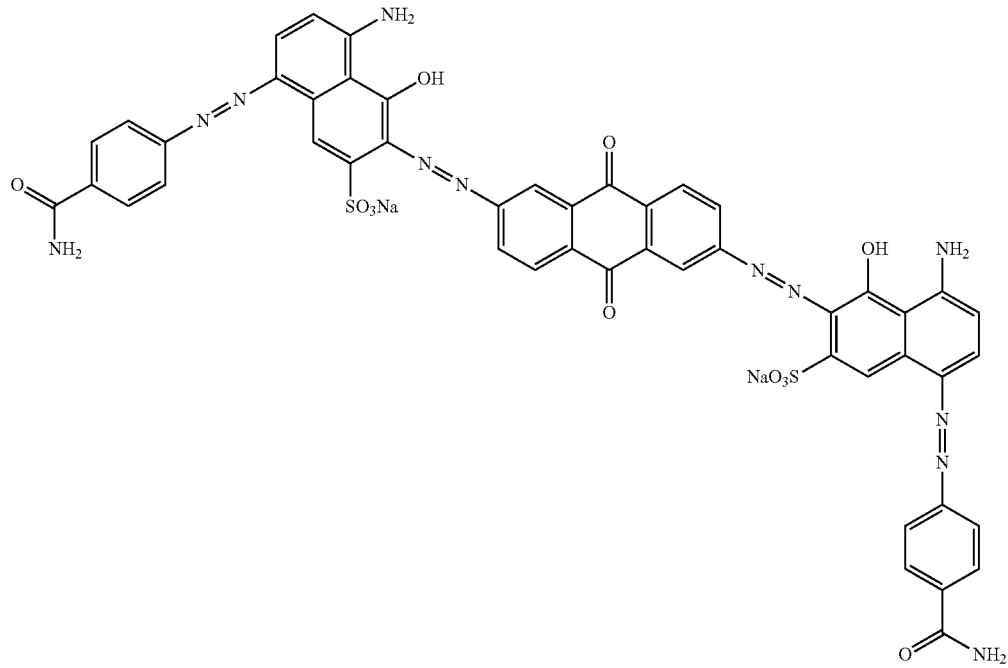
(19b)
This example was prepared as example 15. However, the intermediate of example 2g was used in place of intermediate prepared in example 1 of example 15.
Example 20a
Preparation of Dye (20a)
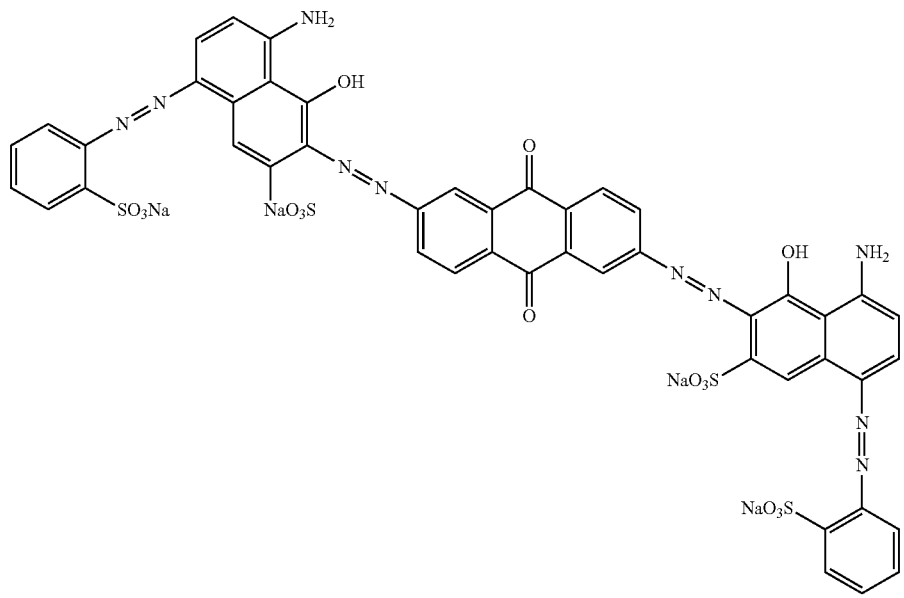
(20a)

This example was prepared as example 15. However, the intermediate of example 2d was used in place of diazotised 2,6-diaminoanthraquinone of example 15.

Example 20b

Preparation of Dye (20b)

This example was prepared as example 20a. However, the intermediate prepared in example 2f was used in place of intermediate 2d of example 20a.

Example 20c

Preparation of Dye (20c)

This example was prepared as example 20a. However, the intermediate prepared in example 2e was used in place of intermediate 2d of example 20a.

Example 21

Preparation of Dye (21)

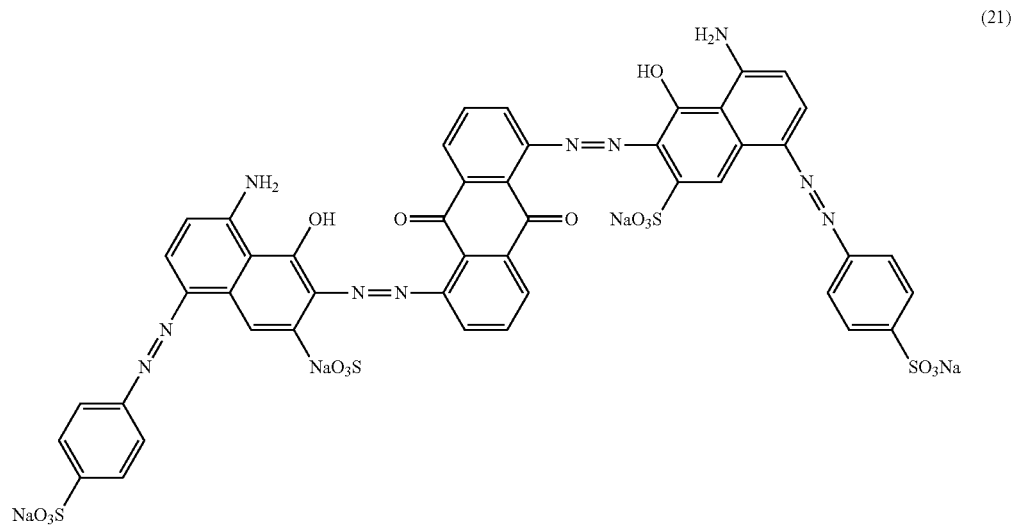

This example was prepared as example 20c. However, 1,5-diaminoanthraquinone was used in place of 2.6-diaminoanthraquinone of example 20c.

Example 22a

Preparation of Dye (22a)

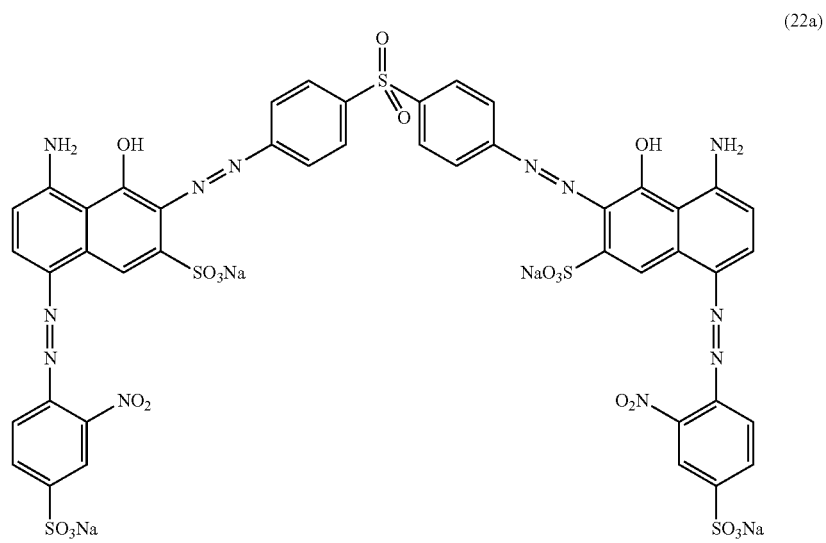

This example was prepared as example 17b. However, 4,4'-Diaminodiphenyl Sulfone was used in place of 2,6-diaminoanthraquinone of example 17b.

Example 22b

Preparation of Dye (22b)

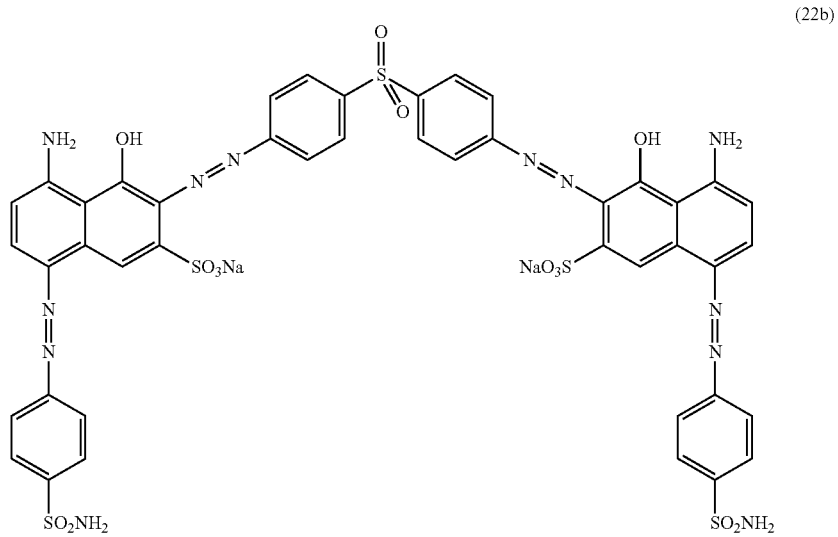

(22b)

This example was prepared as example 22a. However, intermediate 2b was used in place of intermediate 2c of example 22a.

Example 22c

Preparation of Dye (22c)

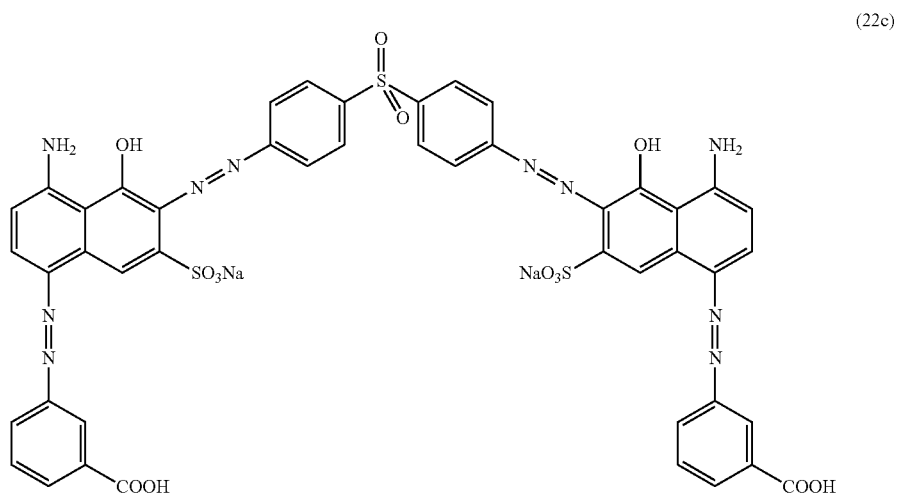

(22c)

This example was prepared as example 22a. However, intermediate 2h was used in place of intermediate 2c of example 22a.

Example 22d
Preparation of Dye (22d)
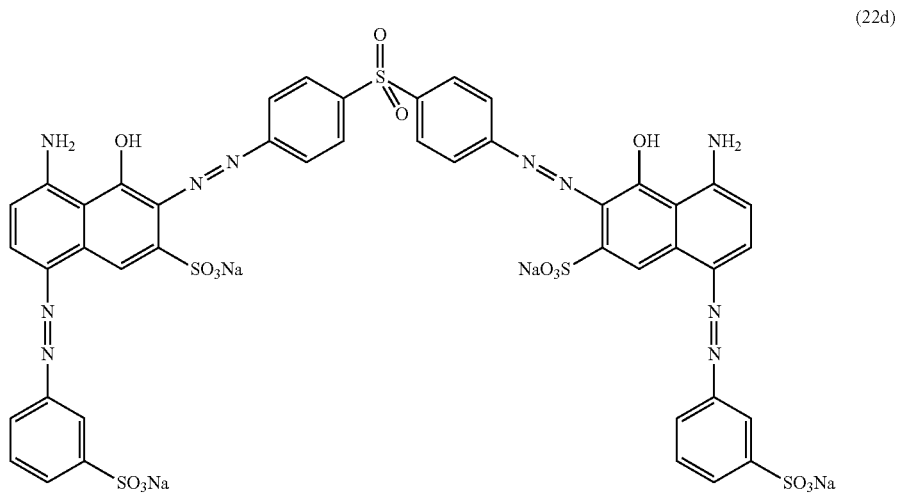
(22d)
This example was prepared as example 22a. However, intermediate 2f was used in place of intermediate 2c of example 22a.
Example 23a
Preparation of Dye (23a)
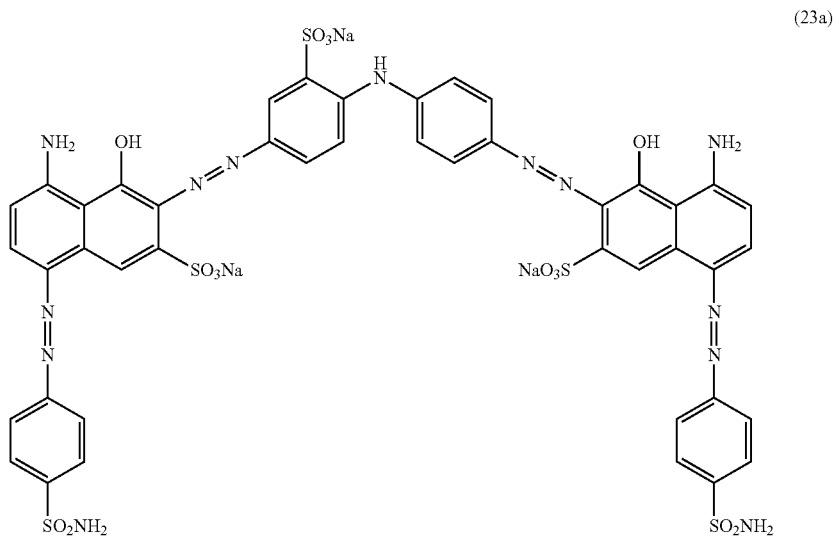
(23a)
This example was prepared as example 22b. However, 5-Amino-2-[(4-aminophenyl)amino]benzenesulfonic acid was used in place of 4,4'-Diaminodiphenyl sulfone of example 22b.

Example 23b
Preparation of Dye (23b)
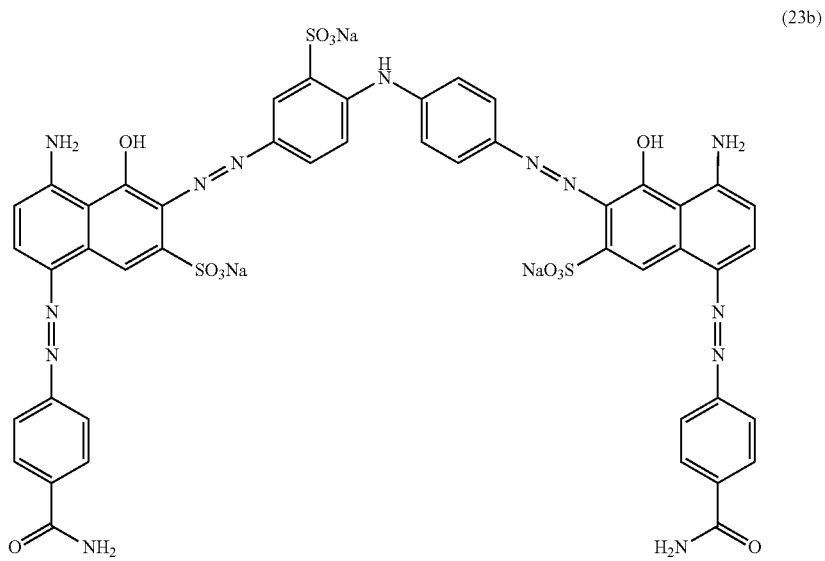
(23b)
This example was prepared as example 23a. However, intermediate 2g was used in place of 2b of example 23a.
Example 24a
Preparation of Dye (24a)
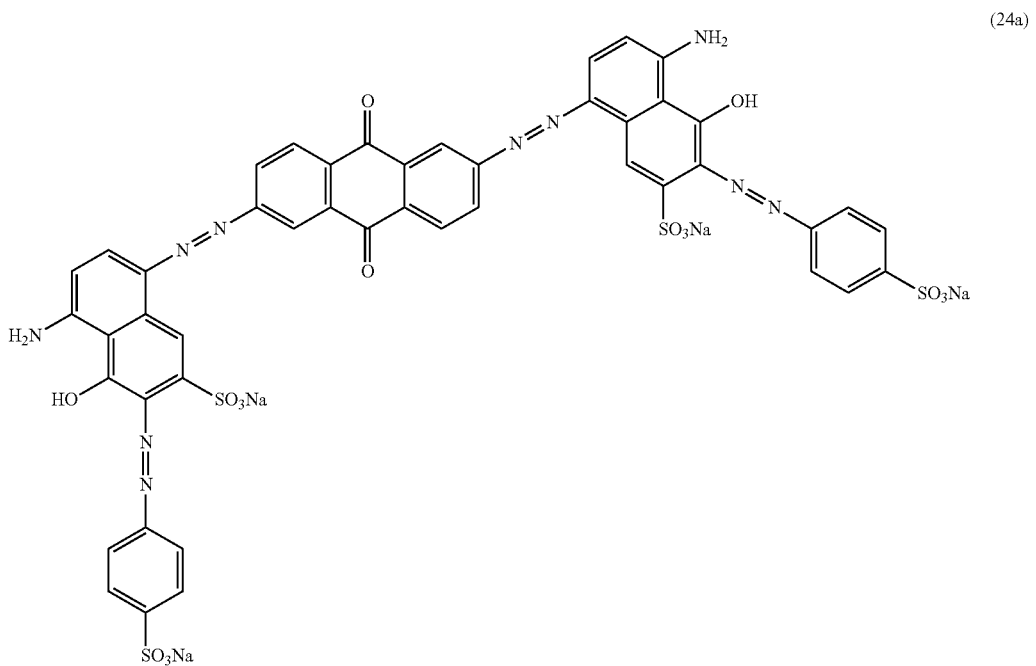
(24a)

This example was prepared as example 20c. However, 4-aminobenzenesulfonic acid was used in place of intermediate 2e and dye 5a was used in place of 2,6-diaminoanthraquinone of example 20c.

Example 24b

Preparation of Dye (24b)

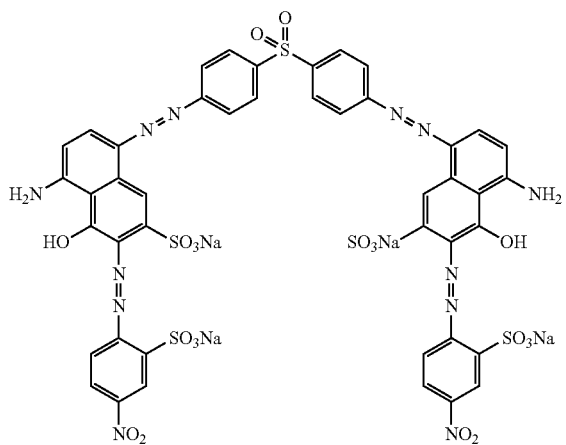

(24b)

This example was prepared as example 24a. However, dye 8 was used in place dye 5a and 4-nitro-2-aminobenzenesulfonic acid was used in place of 4-aminobenzenesulfonic acid of example 24a.

Example 25

Preparation of Dye (25)

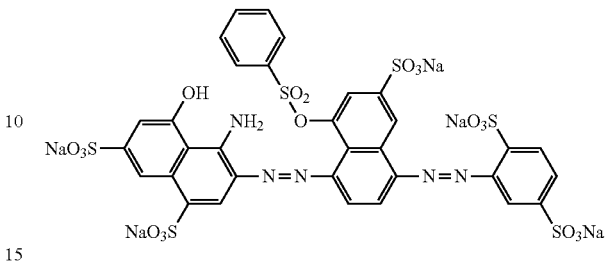

(I25)

0.03 mol (19.31 g) of compound 1a were suspended in 130 g $H_2O$ and 7.39 g of a 37 wt-% solution of hydrocarbon chloride. The suspension was then cooled down to 0° C. and 0.035 mol (2.42 g) of $NaNO_2$ in 5 g water were slowly added. The suspension was stirred for 2 hours at 0° C. Then, 8.0 g of a 10 wt.-% solution of sulfamic acid were added to remove the excess of $NaNO_2$ yielding a suspension of diazotised compound 1a.

The diazotised compound 1a was coupled with 0.035 mol (13.27 g, 90 wt. %) of the monosodium salt of 4-amino-5-hydroxynaphthalene-1,7-disulphonic acid (K acid) at a value of pH of 1.5 while maintaining this value of pH by addition of sodium hydroxide. The reaction was stirred for 5 hours at a temperature between 0° C. and 5° C. and then warmed up to room temperature. The reaction mixture was then filtered to removed the excess of K-acid, thus resulting in intermediate I25. The pH of the filtrate was then adjusted to a value of 5.0-6.0 with a 30 wt.-% solution of NaOH.

Then, a solution of diazotised 4-Nitroaniline-2-sulphonic acid prepared in the same way as in Example 1 was added in order to couple the diazotised 4-Nitroaniline-2-sulphonic acid to the intermediate I25. During addition, the pH was maintained at a value of 5.0 to 6.0 by adding of a 30 wt.-% solution of NaOH.

The pH of the resulting reaction mixture was then adjusted to a value of 12 with a 30 wt.-% solution of NaOH, warmed to 40° C. and stirred 1 hour at that temperature. The mixture was then cooled down to room temperature, the product was precipitated with EtOH and filtered off. The precipitated dye 25 was dried.

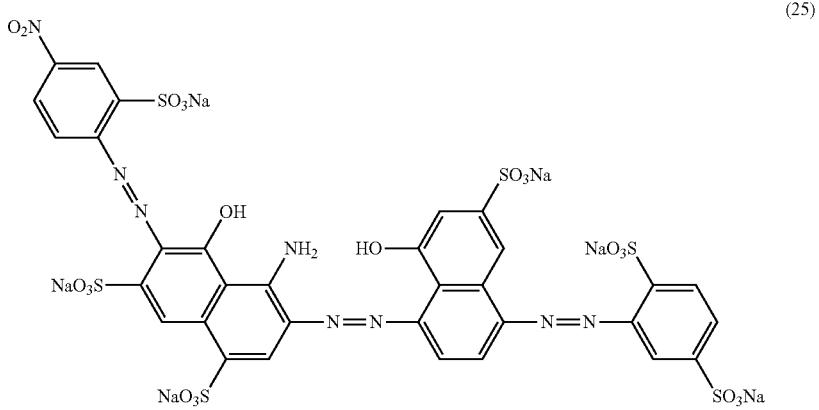

(25)

Dye 25 was obtained in a 70% overall yield.

Example 26
Preparation of Dye 26
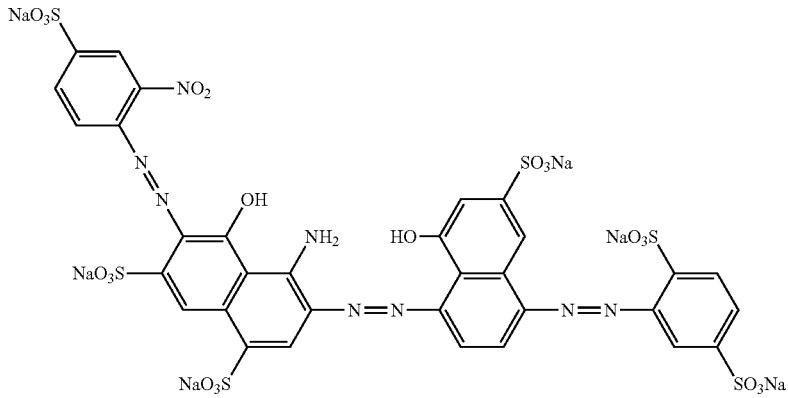
(26)
This example was prepared as example 25. However, 4-amino-3-nitrobenzene-1-sulfonic acid was used in place of 4-Nitroaniline sulfonic acid of example 25.
Example 27
Preparation of Dye 27
Dye 27:
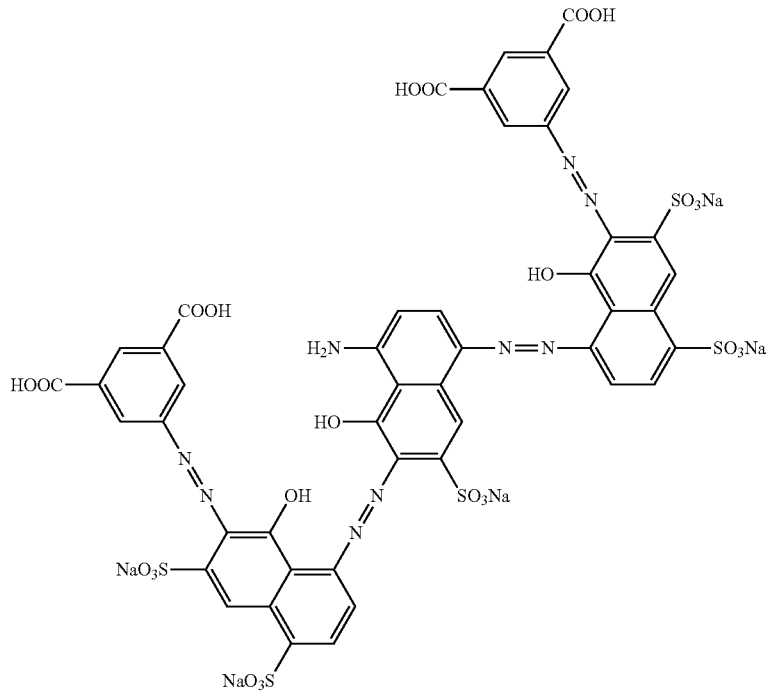
(27)

89

Preparation of Amino Component (27p)

The following compound 27p

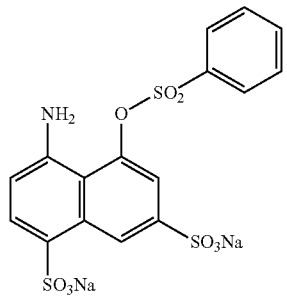

(27p)

was prepared from 0.05 moles of 1-amino-8-naphthol-4,6-disulphonic acid and 0.06 moles of benzenesulphonylchloride according to the following procedure:

After 0.1 mol (38 g, 90 wt. %) of 1-amino-8-naphthol-4,6-disulphonic monosodium salt and 0.12 mol (20.7 g) of benzenesulfonylchloride were subjected to reaction at pH 10.0 to 12.0, at 20° C. for 2 hours. The reaction mixture was acidified to a pH value of 4.0 with a 37 wt-% solution of hydrocarbon chloride and the product was filtered and dried. Intermediate 27p was obtained in a quantitative yield.

Diazonium Suspension A 0.04 mol (15 g) of the compound of formula (27p) were suspended at room temperature in 70 ml of water and 30 ml of acetic acid (80 wt-%), cooled down to a temperature between 0° C. and 5° C. Then, 10 ml of an aqueous solution of hydrochloric acid (37 wt.-%) were added drop-wise under stirring. Then, 0.042 mol (2.90 g) of sodium nitrite in 10 ml water were added drop-wise at a temperature between 0° C. and 5° C. The diazonium suspension A was obtained after removing excess of nitrite through adding sulfamic acid.

The same suspension (suspension B) was prepared for the second coupling reaction.

Preparation of the Intermediate Dye of Formula (27p2)

The diazonium suspension A from the above was added over a period of 30 minutes at a temperature between 0° C. and 5° C. to a suspension of 0.04 mol (10.07 g, 95% w.-%) of 5-Amino-4-hydroxynaphthalene-2-sulfonic acid in 100 ml of water under stirring while keeping the value of pH between 0.8 and 1.0 by simultaneous addition of 4.7 g of a saturated solution of sodium acetate. After the addition of the diazonium suspension A, stirring was continued for 4 hours at a temperature between 0° C. and 5° C.

A 30 wt.-% solution of NaOH was used to adjust the pH to 8.5. The diazonium suspension B was then added over a period of 30 minutes at a temperature between 0° C. and 5° C. to the reaction mixture while keeping the value of pH between 8 and 10 by a simultaneous addition of a 30 wt.-% solution of sodium hydroxide. After the addition of the diazonium suspension B, stirring was continued for 2 hours at a temperature between 0° C. and 5° C.

The pH was then adjusted to 13.5 with a solution of NaOH (30 wt.-%) and the mixture was heated to 50° C. which let to cleavage of the ether bond. The resulting intermediate (27p2) was precipitated with ethanol and dried.

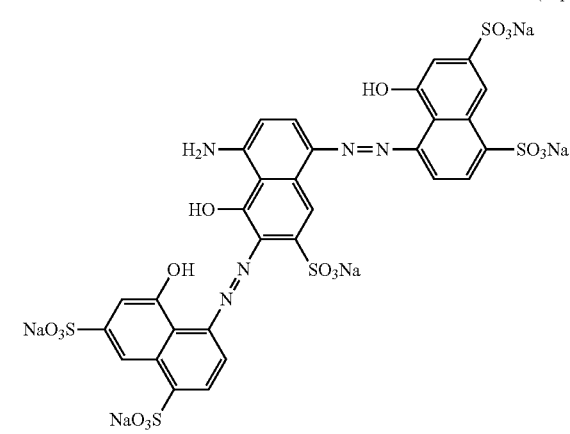

(27p2)

Preparation of Dye 27

5-Aminoisophthalic acid was diazotized in the same manner as described for aniline-2,5-disulphonic acid in example 1 and then coupled to intermediate 27p2 at a pH value of between 8.0 and 9.0 at a temperature in the range of 0 to 5° C. The raw product was purified by reverse osmosis using a Thomapor® membrane (art. 50436, Reichelt Chemietechnik Heidelberg) yielding Dye 27 with a 70% overall yield.

Example 28

Preparation of Dye 28

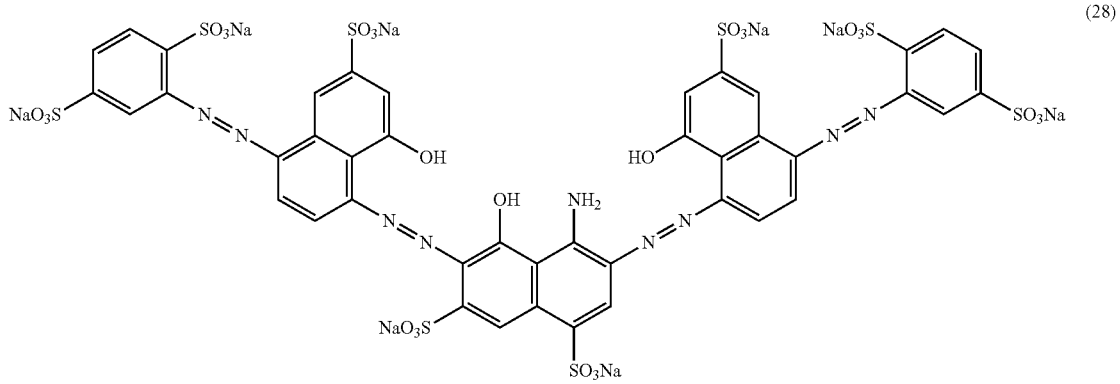

(28)

0.016 mol (8.0 g) of compound 1a were suspended in 23 g of acetic acid and 50 g of ice water. 4.1 g of $H_2SO_4$ (97 wt.-%) were slowly added to the suspension and the mixture was cooled down to 0° C. 0.017 mol (1.15 g) of $NaNO_2$ in 15 ml water were slowly added to the suspension by maintaining the temperature between 0 and 5° C. The reaction mixture was slowly warmed up to 10° C. and stirred for 1 hour at that temperature. The excess of nitrite was removed with the addition of sulfamic acid. Then, 0.008 mol (3 g, 90 wt. %) of 1-amino-8-naphthol-4,6-disulphonic monosodium salt were added to the reaction mixture and the pH was adjusted to a value of 1.0 by adding 13 g of a saturated solution of sodium acetate. The reaction mixture was further stirred for 1 hour at 0-5° C. Then the pH was adjusted to a value of 2.0 by adding 4.8 g of a saturated solution of sodium acetate. After one further hour, the pH was adjusted to a value of 4.0 by adding 25.5 g of a saturated solution of sodium acetate. After another hour, 35.5 g of a 30 wt.-% solution of NaOH were added in order to adjust the pH to a value of 5.0. Then, the reaction mixture was allowed to warm up to room temperature.

After 1 hour at room temperature, 33 g of a 30 wt.-% solution of NaOH were slowly added and the mixture was stirred at 60° C. for 30 minutes. The mixture was then cooled down to room temperature and the pH was adjusted to 4.5 by adding a 37 wt.-% solution of hydrochloric acid. Ethanol was then slowly added to precipitate the product. The precipitated product was worked up by reverse osmosis using a Thomapor® membrane (art. 50436, Reichelt Chemietechnik Heidelberg).

Dye 28 was obtained in a 75% overall yield.

Example 29

Preparation of Dye 29

Example 30

Preparation of a Recording Liquid

Recording liquids were prepared using the dyes (2) to (29). Recording liquids of known dyes were prepared for comparison.

For each dye, the quantity of the dye in the recording liquid was adjusted so that the absorption spectrum of the recording liquid in the range of the visible light equalled an optical density of 1.0. As a starting point for adjusting dye concentration, 100 ml of an aqueous solution of 2-5 mg of the dye, buffer to adjust the solution to pH=7.0, and optionally 15 ml of N-methyl-2-pyrrolidone was prepared. Optionally, 15 ml of N-methyl-2-pyrrolidone were added. The amount of water was adjusted so that the total volume of aforementioned solution was 100 ml. If the dye does not dissolve completely, N-methyl-2-pyrrolidone is added. Then, a spectrum is recorded. If the optical density of the solution exceeds a value of 1.0, the amount of dye is reduced and the absorption spectra is recorded again. If, however, the optical density of the solution is less than 1.0, the amount of dye is increased and the absorption spectra is recorded again.

The quantity obtained by this measurement is converted in mg/l (e.g. if 4 mg were diluted in 100 ml water that yields a 40 mg/l concentration to achieve an OD=1) and is multiplied by 1.8 resulting in the amount of dye in g required per kg ink to prepare the ink. Standardizing recording liquids to an optical density of 1.0 allows comparing different dyes.

For each dye, 10 g of recording liquid were prepared by heating the $\frac{1}{100}^{th}$ of the amount of dye determined above (0.5 g to 1.0 g), 0.6 g ethylene glycol, 0.3 g propylene-1,2-glycol, 0.3 g 1-methyl-2-pyrrolidone, 0.03 g of an aqueous solution (50 wt.-%) of Olin® 10G (available from Arch Chemicals Inc., Norwalk, USA), 0.03 g Surfinol® 465 (available from Air Products and Chemicals Inc., Allentown, USA) and 0.01 g of a solution of Mergal® K 10N (a biocide, available from Riedel-de-Haën, Seelze, Germany) together with distilled water at a temperature of 50° C. under stirring

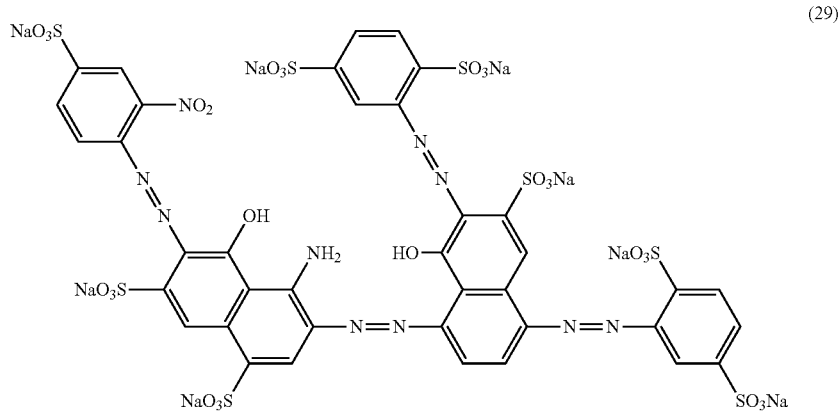

(29)

Aniline 2,5-disulfonic acid was diazotized in the same manner as in example 1 and coupled to dye 26 at a pH value of 8.5 to 9.5 and T=0-5° C. The dye 26 was precipitated with EtOH, filtered off and dried.

Dye 29 was obtained with a 70% yield, based on the number of moles of 2,5-diamino aniline.

Comparison with the commercial available ink HP364XL photo black for approximately 1 hour. The resulting solution was cooled down to a temperature of 20° C., its value of pH was adjusted from 8.5 to 10 with an aqueous solution of sodium hydroxide (30 wt.-%) and the solution was passed through a Millipore® filter of 0.5 μm pore diameter.

For dyes, which do not completely dissolve according to the aforementioned formulation, the following formulation was used:

10 g of recording liquid were prepared by heating the necessary amount of dye (0.5 g to 1.0 g), 25 wt.-% 2-Pyrrolidone, 0.3 wt.-% of an aqueous solution (50 wt.-%) Olin® 10G (available from Arch Chemicals Inc., Norwalk, USA), 0.45 wt.-% Surfinol® 465 (available from Air Products and Chemicals Inc., Allentown, USA). 74.25 wt.-% distilled water under stirring for approximately 1 hour. The resulting solution was cooled down to a temperature of 20° C., its value of pH was adjusted from 9.5 to 10 with an aqueous solution of lithium hydroxide (5 wt.-%) or sodium hydroxide (30 wt.-%) and the solution was passed through a Millipore® filter of 0.5 µm pore diameter.

Example 31

Preparation of Dye 31

The intermediate monoazo compound of formula (31)

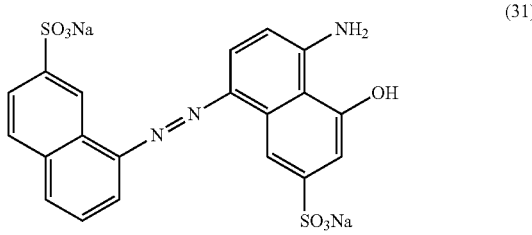

(31)

was prepared as in example 1 but by using 1-aminonaphthalene-7-sulfonic acid in place of aniline-2,5-disulphonic acid of example 1.

Example 32

Preparation of Dye 32

The intermediate monoazo compound of formula (32)

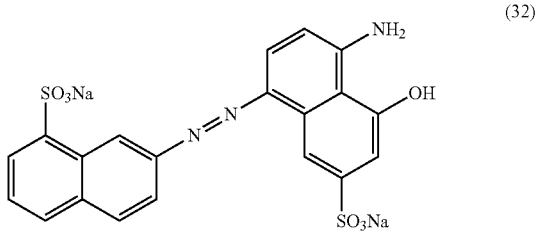

(32)

was prepared as in example 1 but by using 2-aminonaphthalene-8-sulfonic acid in place of aniline-2,5-disulphonic acid of example 1.

Example 33

Preparation of Dye 33

The intermediate monoazo compound of formula (33)

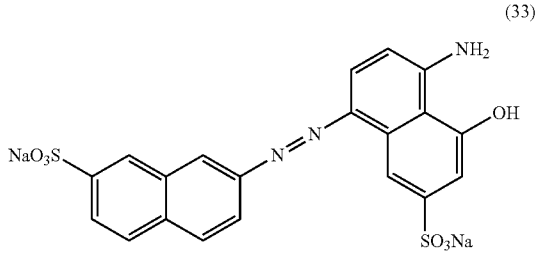

(33)

was prepared as in example 1 but by using 2-aminonaphthalene-7-sulfonic acid in place of aniline-2,5-disulphonic acid of example 1.

Example 34

Preparation of Dye 34

The intermediate monoazo compound of formula (34)

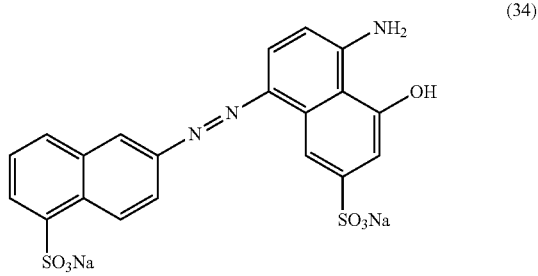

(34)

was prepared as in example 1 but by using 2-aminonaphthalene-5-sulfonic acid in place of aniline-2,5-disulphonic acid of example 1.

Example 35

Preparation of Dye 35

The intermediate monoazo compound of formula (35)

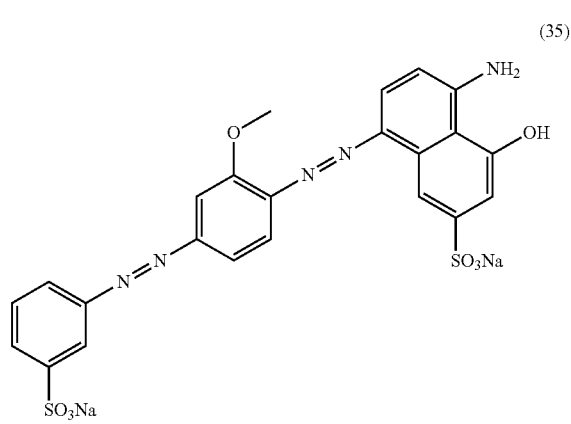

(35)

was prepared as in example 1 but by using 3-[2-(4-amino-3-methoxyphenyl)diazen-1-yl]benzene-1-sulfonic acid (acid yellow MAA available from Ciba-Geigy AG, Basel) in place of aniline-2,5-disulphonic acid of example 1.

Example 36

Preparation of Dye 36

The intermediate monoazo compound of formula (36)

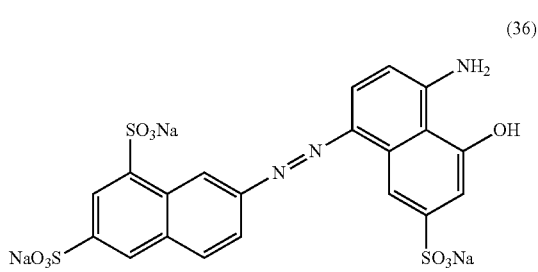

(36)

was prepared as in example 1 but by using 2-aminonaphthalene-6,8-disulfonic acid in place of aniline-2,5-disulphonic acid of example 1.

Example 37

Preparation of Dye 37

The intermediate monoazo compound of formula (37)

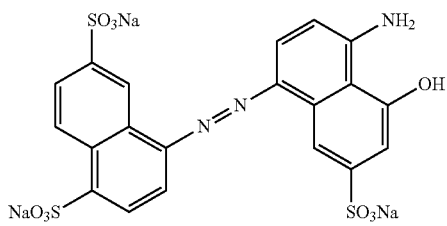

(37)

was prepared as in example 1 but by using 1-aminonaphthalene-4,7-disulfonic acid in place of aniline-2,5-disulphonic acid of example 1.

Example 38

Preparation of Dye 38

The intermediate monoazo compound of formula (38)

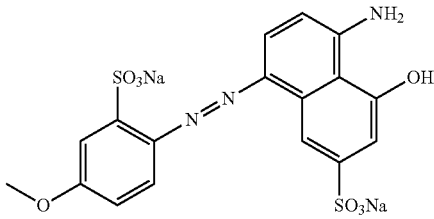

(38)

was prepared as in example 1 but by using p-methoxyaniline-2-sulfonic acid in place of aniline-2,5-disulphonic acid of example 1.

Example 39

Preparation of Dye (39)

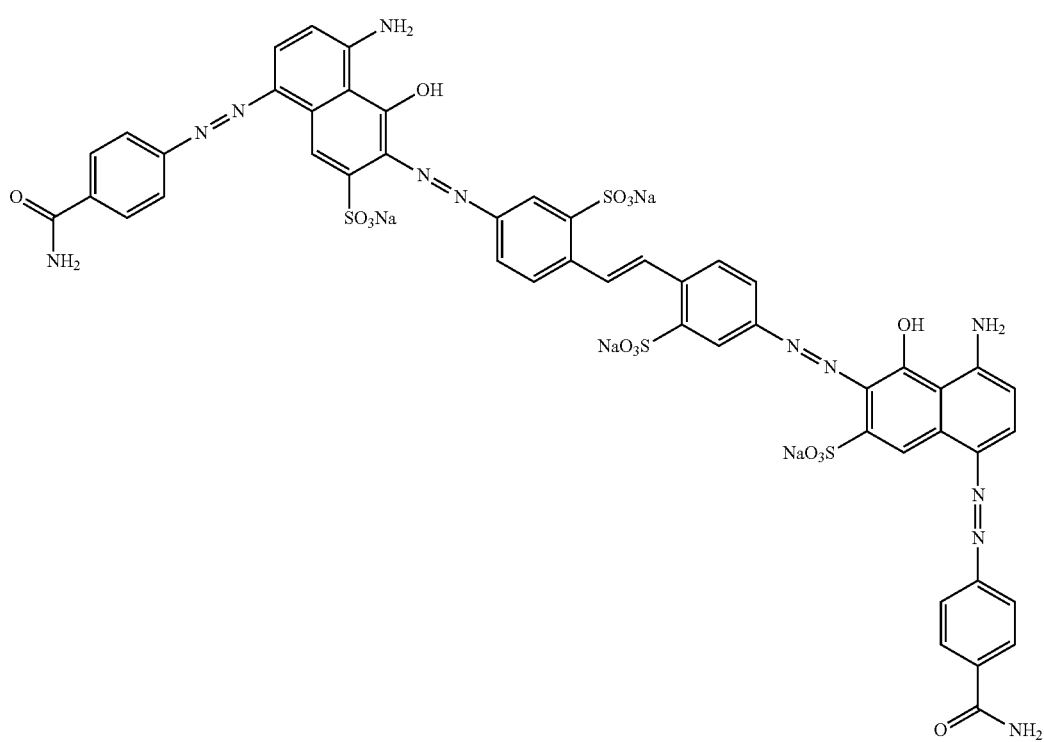

(39)

This example was prepared as example 23b. However, flavonic acid was used in place of 5-Amino-2-[(4-aminophenyl)amino]benzenesulfonic acid.

Example 40
Preparation of Dye (40)
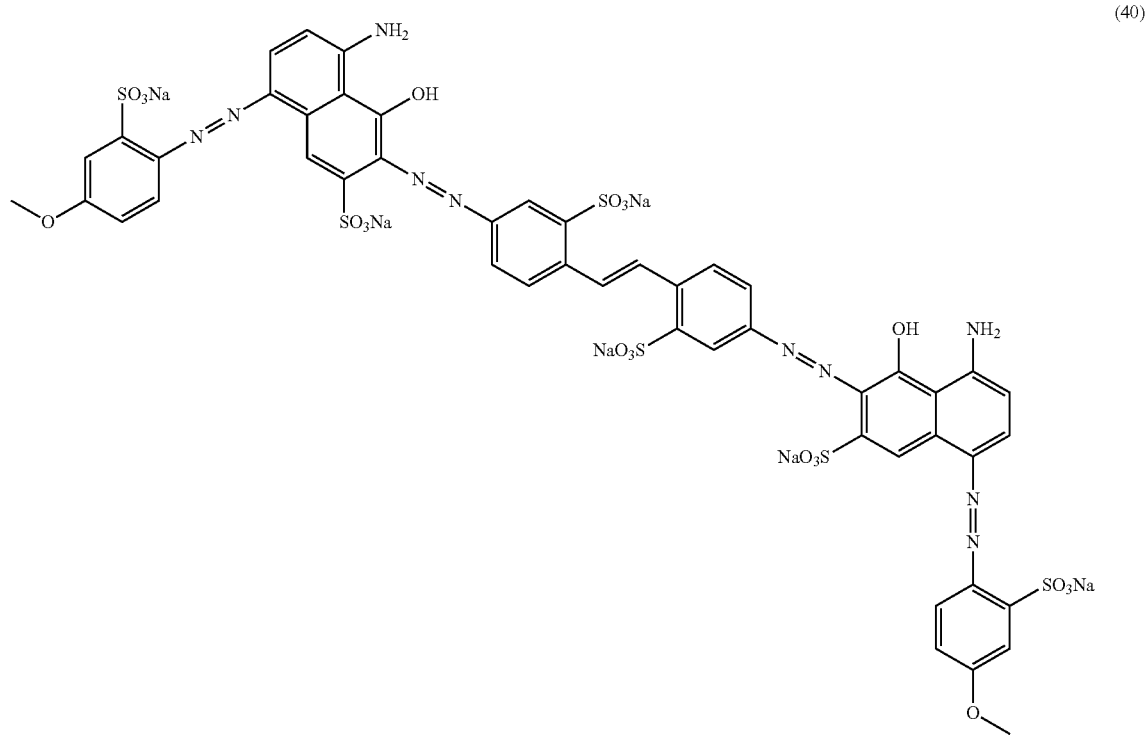
(40)
This example was prepared as example 39. However, intermediate 38 was used in place of intermediate 2g of example 39.
Example 41
Preparation of Dye (41)
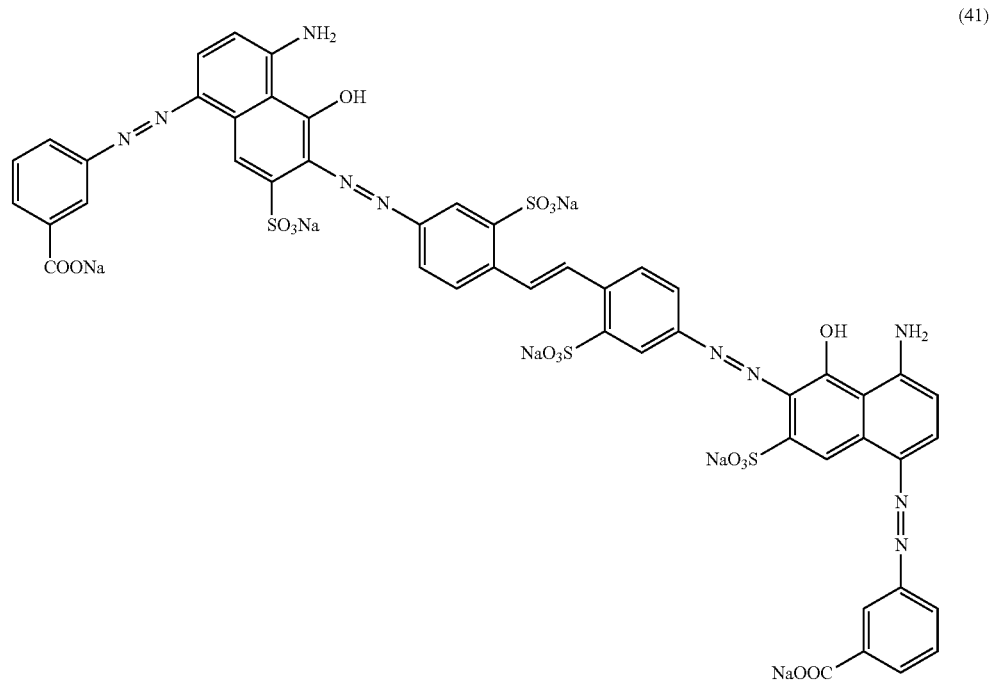
(41)

This example was prepared as example 39. However, intermediate 2h was used in place of intermediate 2g of example 39.

Example 42

Preparation of Dye (42)

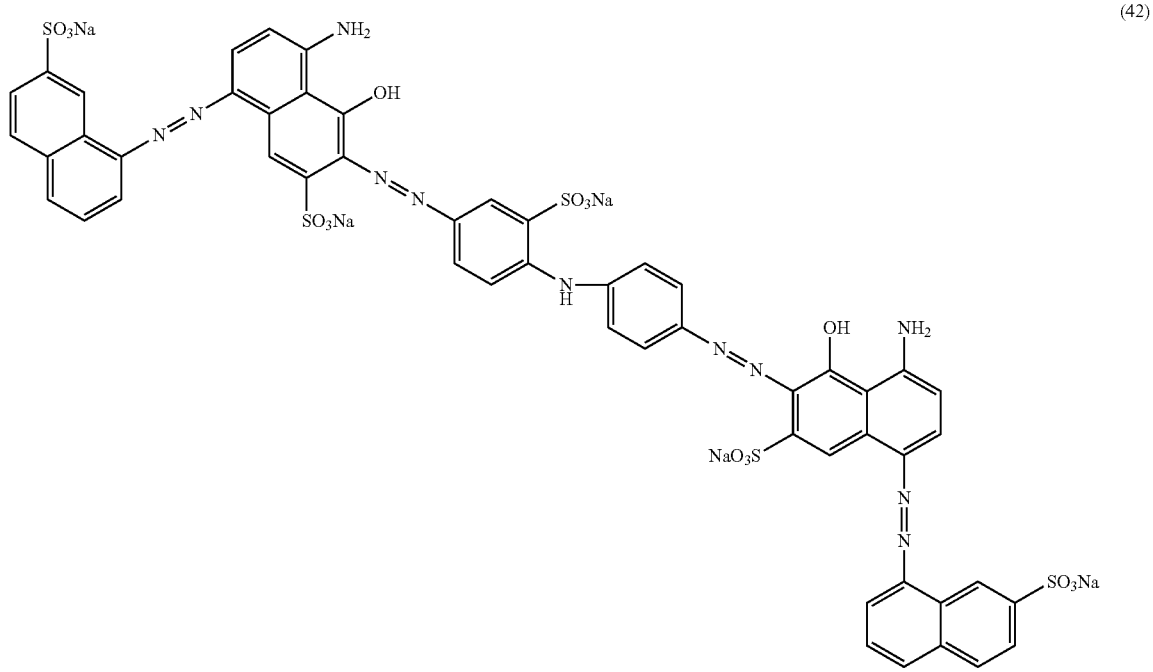

This example was prepared as example 23a. However, intermediate 3l was used in place of intermediate 2b of example 23a.

Example 43

Preparation of Dye (43)

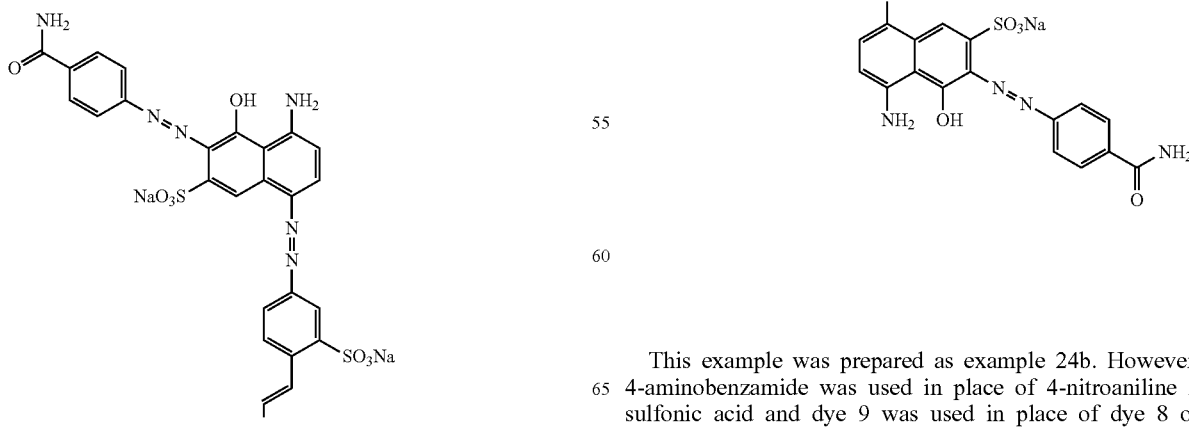

This example was prepared as example 24b. However, 4-aminobenzamide was used in place of 4-nitroaniline 2 sulfonic acid and dye 9 was used in place of dye 8 of example 24b.

Example 44
Preparation of Dye (44)
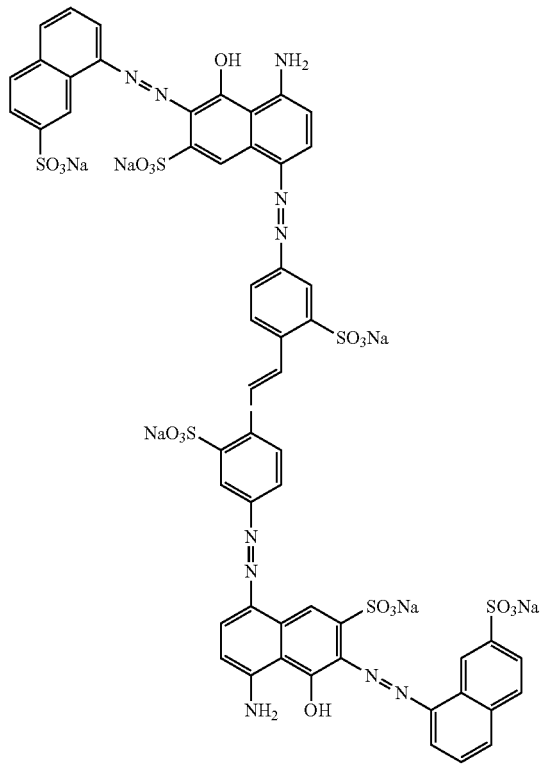
(44)
This example was prepared as example 43. However, 1-aminonaphthalene-7-sulfonic acid was used in place of 4-aminobenzamide of example 43.
Example 45
Preparation of Dye (45)
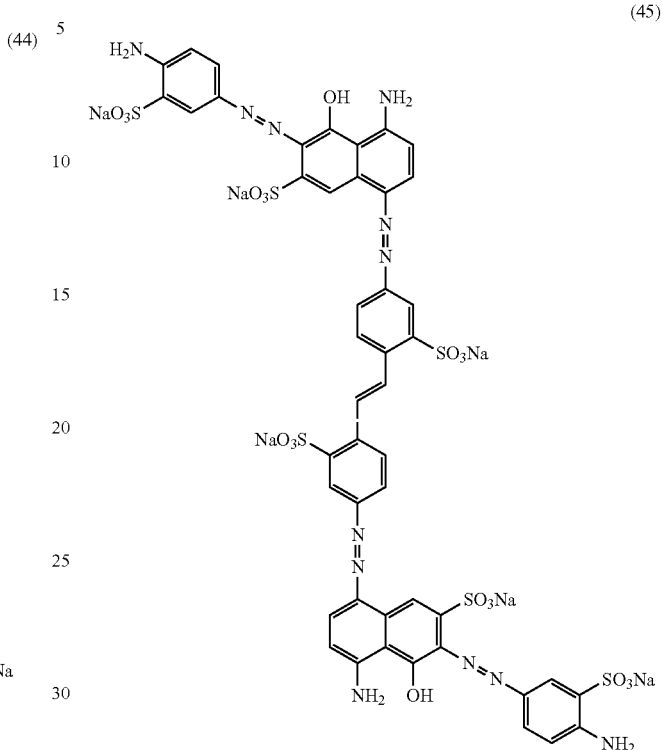
(45)
This example was prepared as example 43. However, p-phenylenediamine-monosulfonic acid was used in place of 4-aminobenzamide of example 43.
Example 46
Preparation of Dye (46)
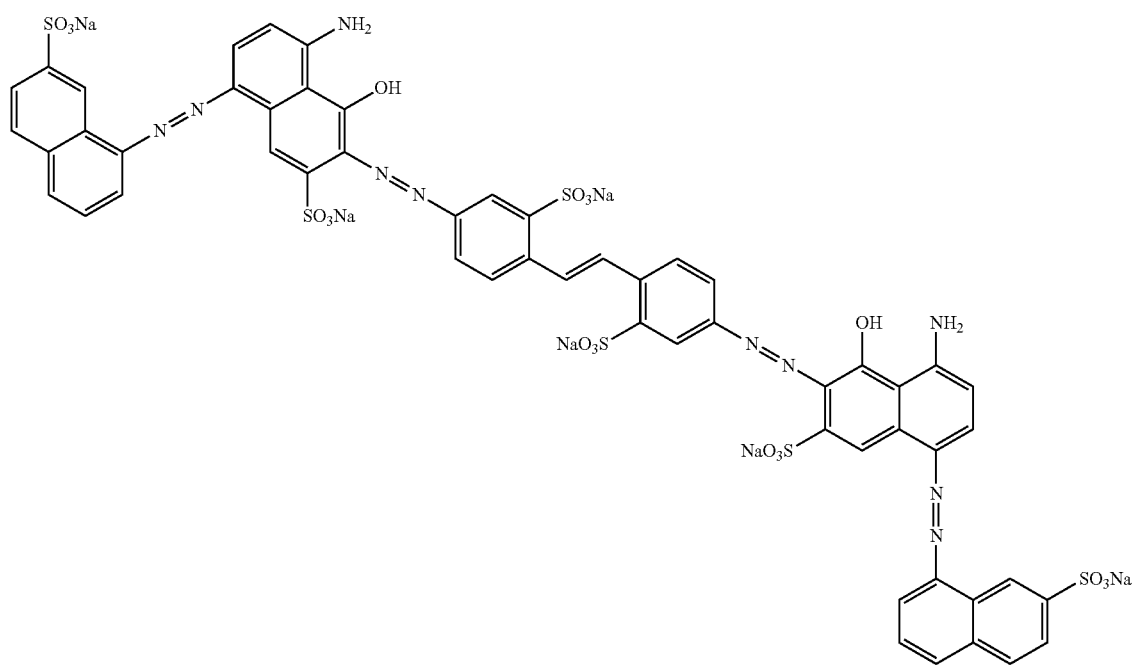
(46)

This example was prepared as example 39. However, intermediate 31 was used in place of 2 g of example 39.
Example 47
Preparation of Dye (47)
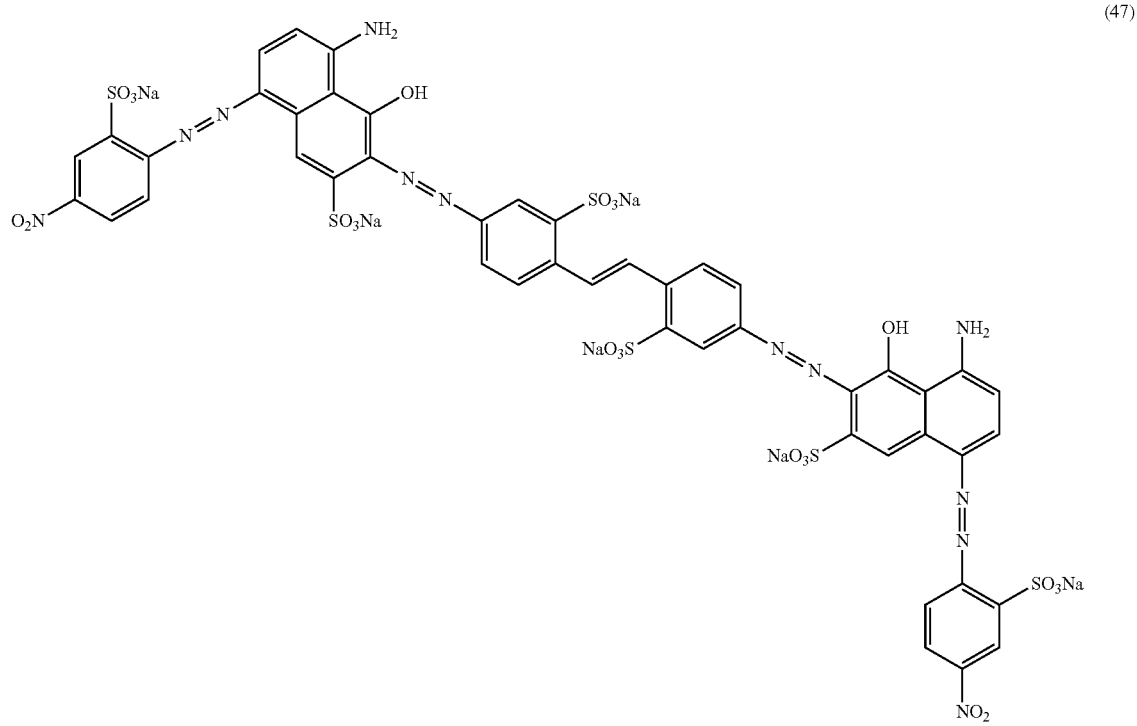
(47)
This example was prepared as example 39. However, intermediate 2a was used in place of 2 g of example 39.
Example 48
Preparation of Dye (48)
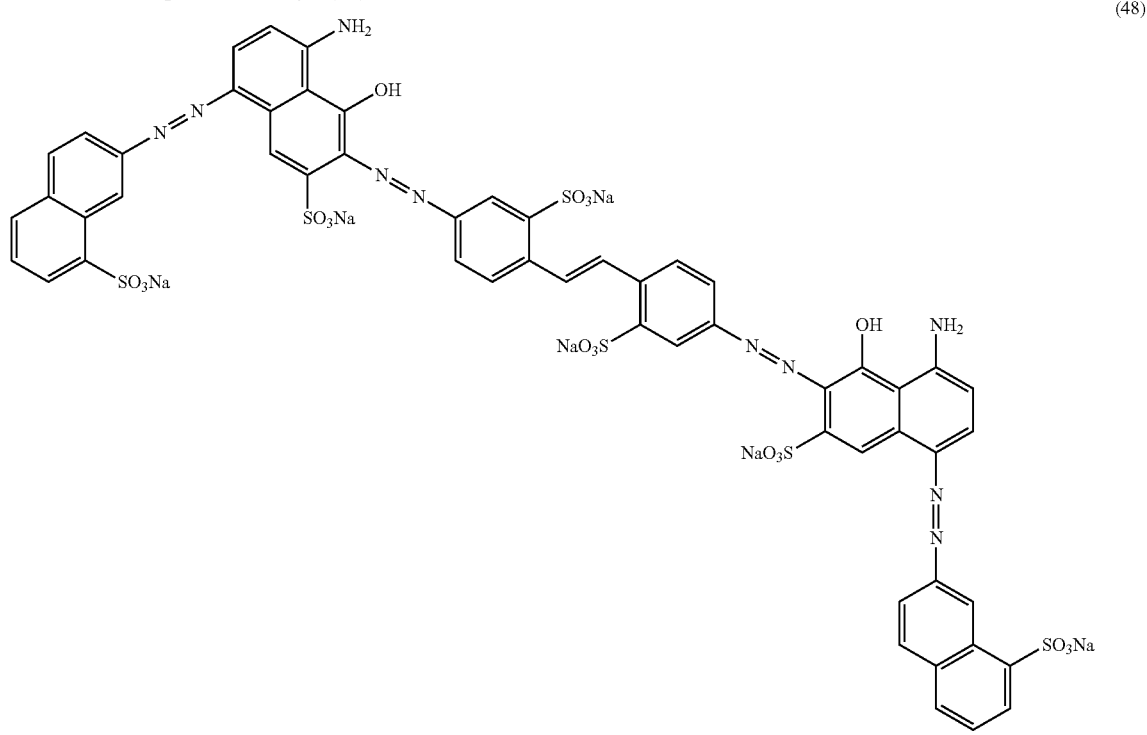
(48)

This example was prepared as example 39. However, intermediate 32 was used in place of 2 g of example 39.

Example 49

Preparation of Dye (49)

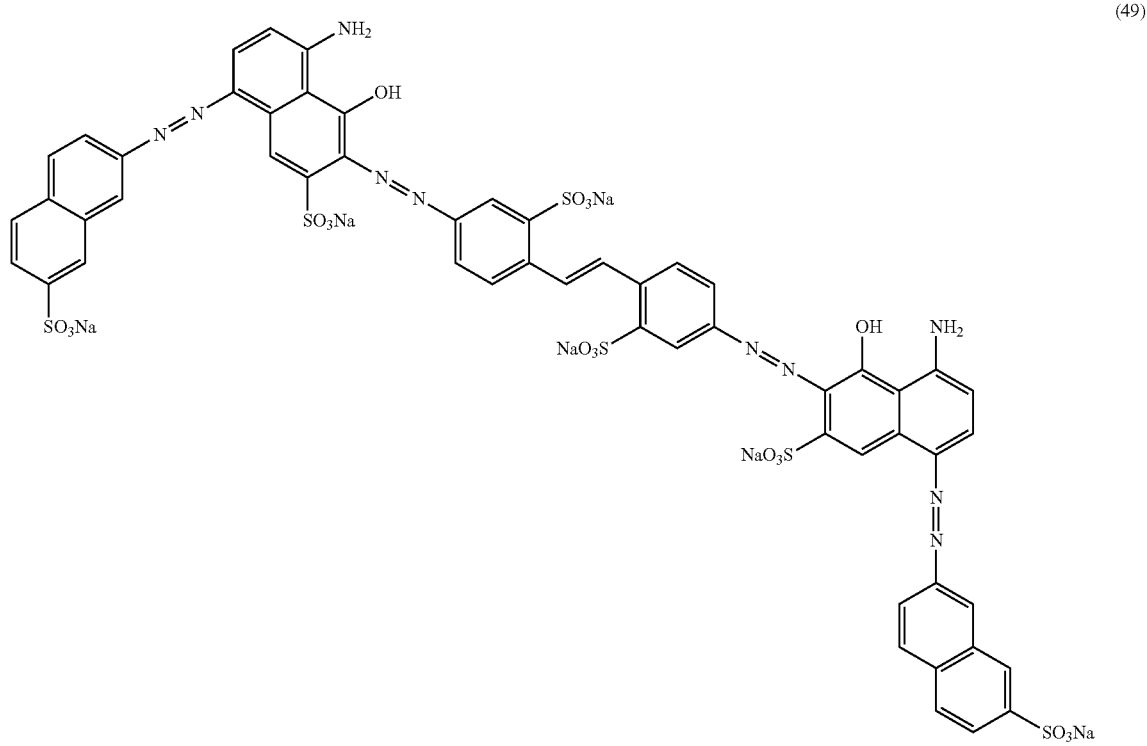

(49)

This example was prepared as example 39. However, intermediate 33 was used in place of 2 g of example 39.

Example 50

Preparation of Dye (50)

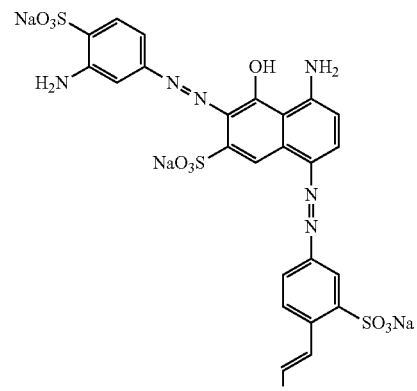

(50)

-continued

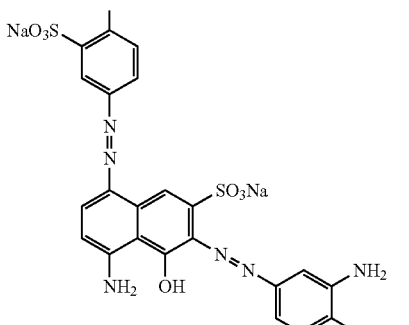

This example was prepared as example 45. However, m-phenylenediamine-monosulfonic acid was used in place of p-phenylenediaminemonosulfonic acid of example 45.

Example 51
Preparation of Dye (51)
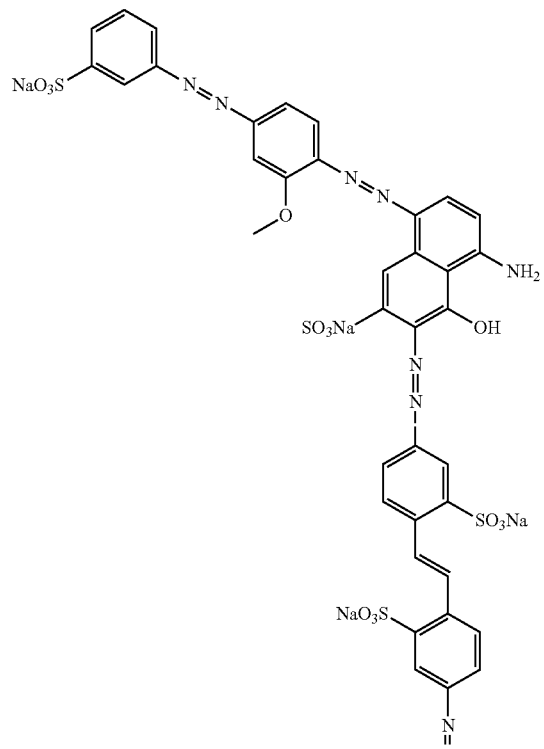
(51)
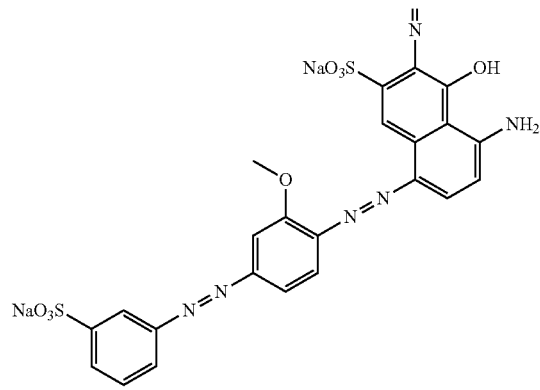
This example was prepared as example 39. However, intermediate 35 was used in place of 2 g of example 39.
Example 52
Preparation of Dye (52)
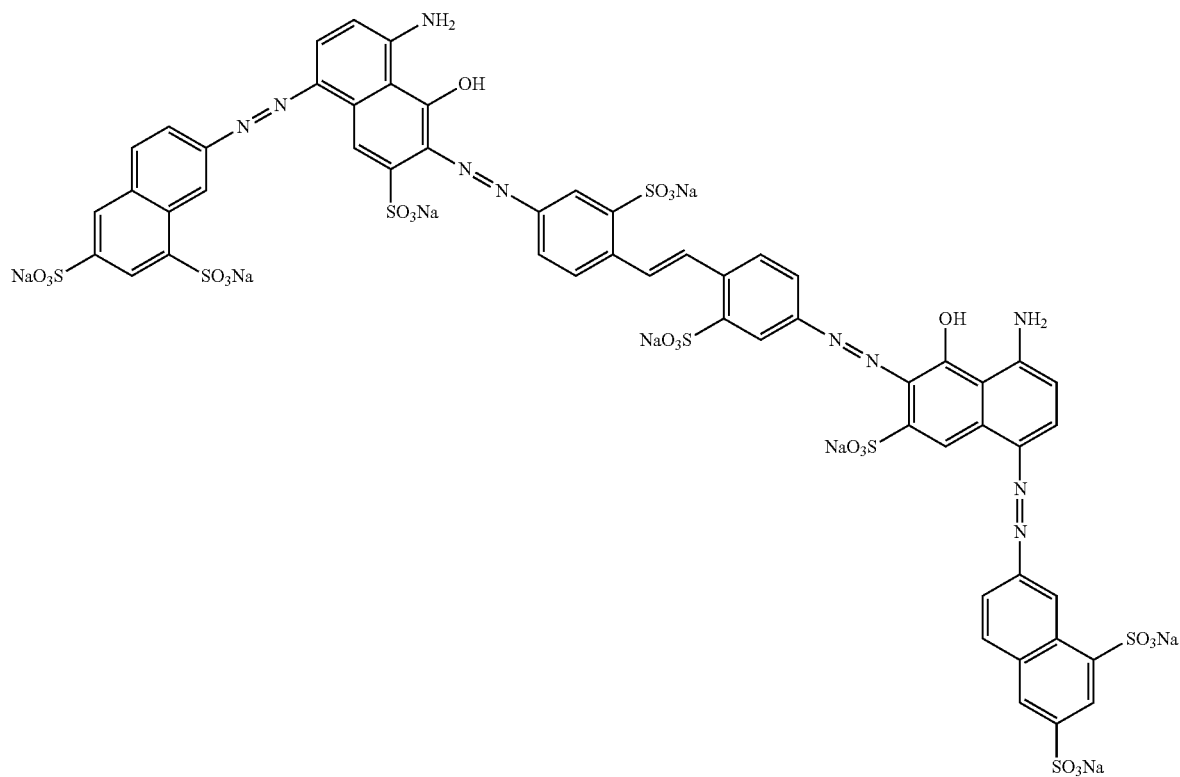
(52)

This example was prepared as example 39. However, intermediate 36 was used in place of 2 g of example 39.

Example 53

Preparation of Dye (53)

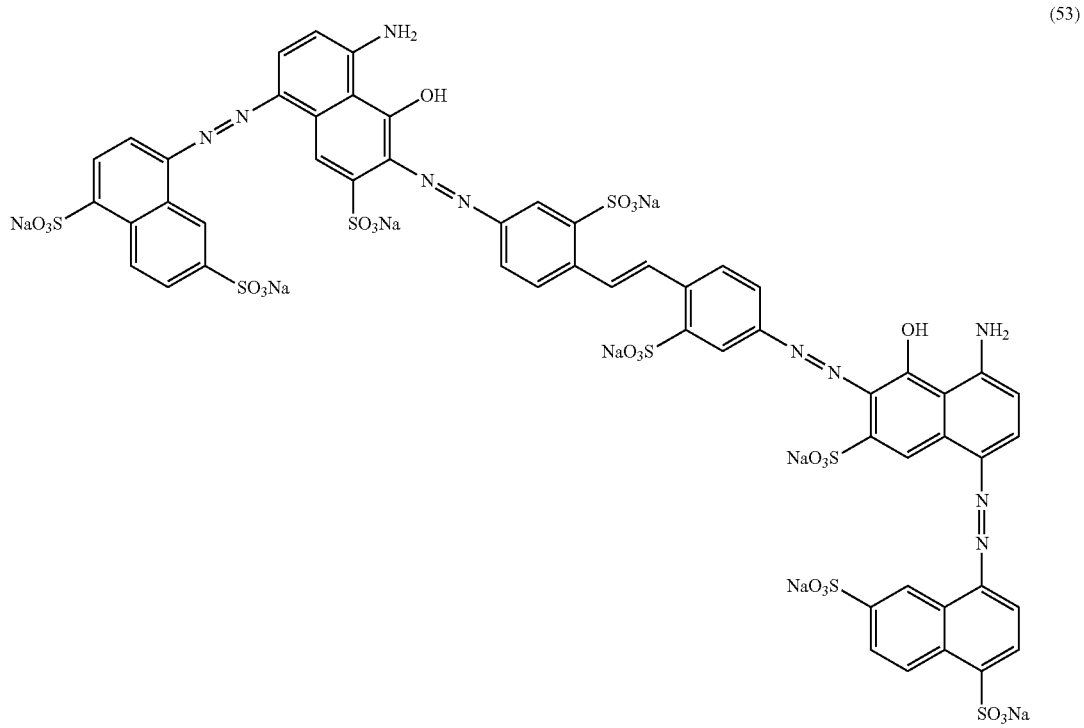

(53)

This example was prepared as example 39. However, intermediate 37 was used in place of 2 g of example 39.

Example 54

Preparation of Dye (54)

(54)

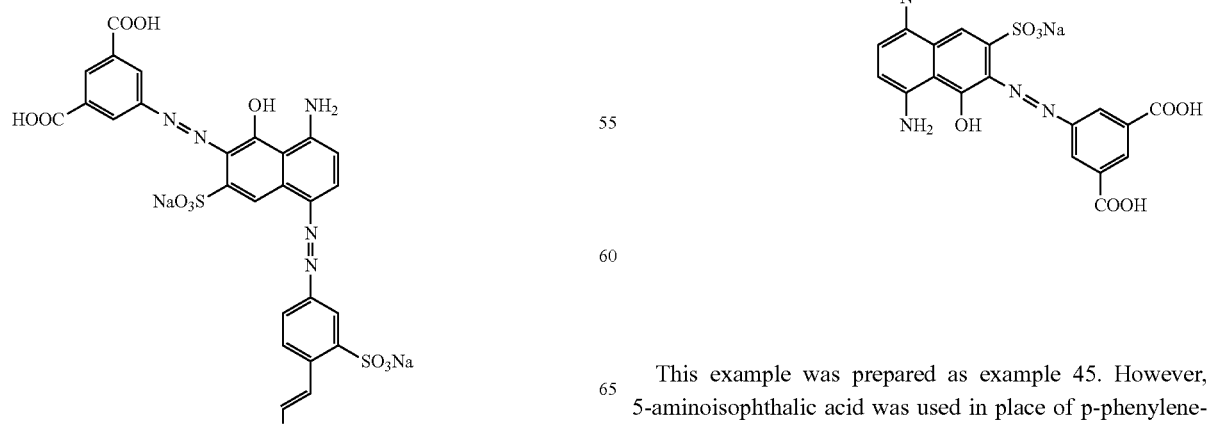

-continued

This example was prepared as example 45. However, 5-aminoisophthalic acid was used in place of p-phenylene-diaminemonosulfonic acid of example 45.

Example 55

Preparation of Dye (55)

The intermediate monoazo compound of formula (55)

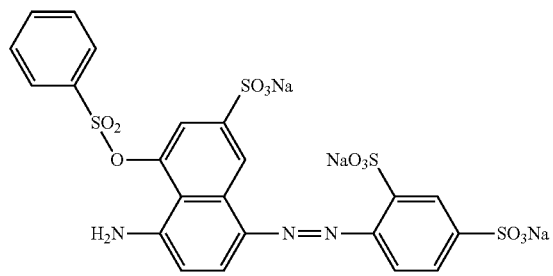

(55)

was prepared as example 1a. However, aniline-2,4-disulfonic acid was used in place of aniline-2,5-disulfonic acid of example 1a.

Example 56

Preparation of Dye (56)

The intermediate monoazo compound of formula (56)

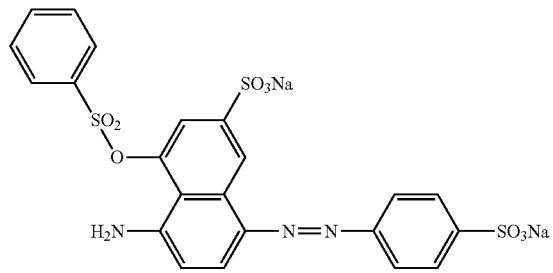

(56)

was prepared as example 1a. However, aniline-4-sulfonic acid was used in place of aniline-2,5-disulfonic acid of example 1a.

Example 57

Preparation of Dye (57)

The intermediate monoazo compound of formula (57)

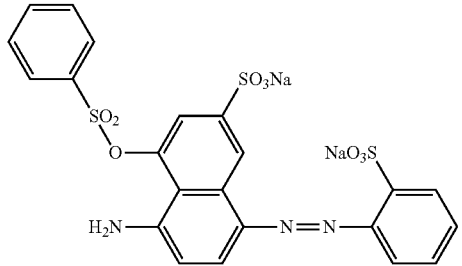

(57)

was prepared as example 1a. However, aniline-2-sulfonic acid was used in place of aniline-2,5-disulfonic acid of example 1a.

Example 58

Preparation of Dye (58)

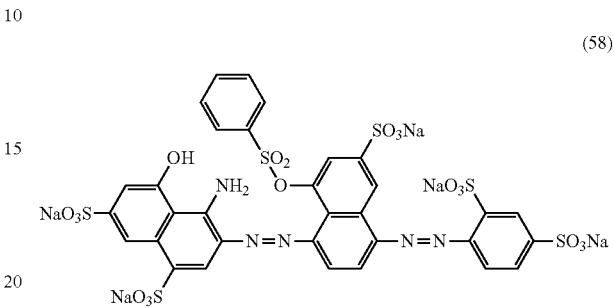

(58)

This example was prepared as example 125 (as shown in example 25). However, intermediate 55 was used in place of intermediate 1a of example 25.

Example 59

Preparation of Dye (59)

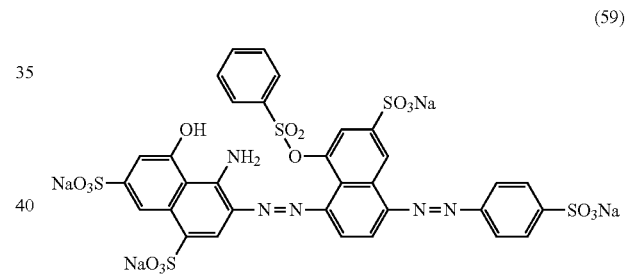

(59)

This example was prepared as example 25. However, intermediate 56 was used in place of intermediate 1a of example 25.

Example 60

Preparation of Dye (60)

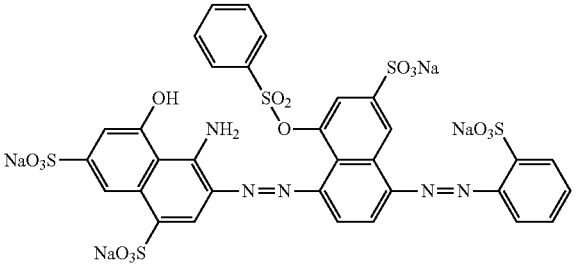

(60)

This example was prepared as example 25. However, intermediate 57 was used in place of intermediate 1a of example 25.

Example 61

Preparation of Dye (61)

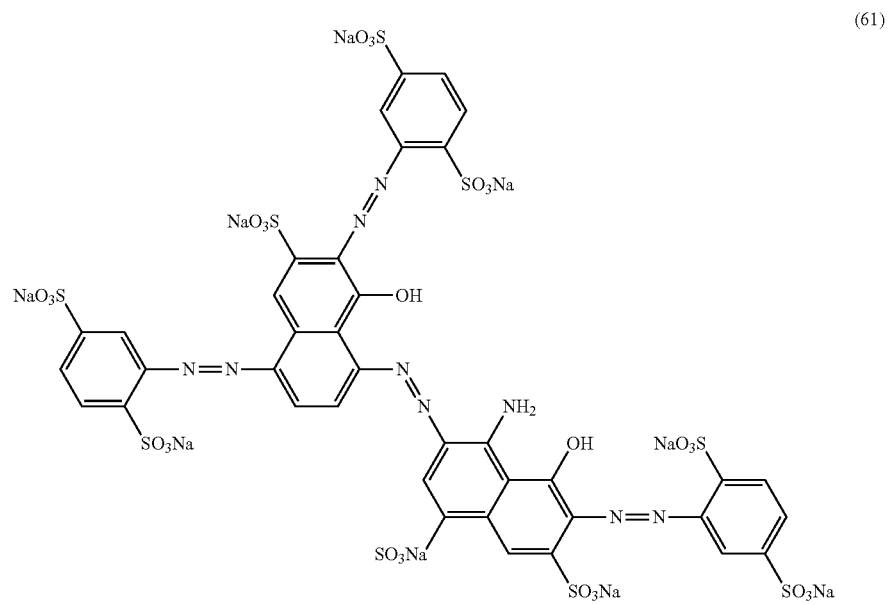

(61)

This example was prepared as example 29. However, aniline-2,5-disulfonic acid was used in place of o-nitroaniline-4-sulfonic acid of example 29.

Example 62

Preparation of Dye (62)

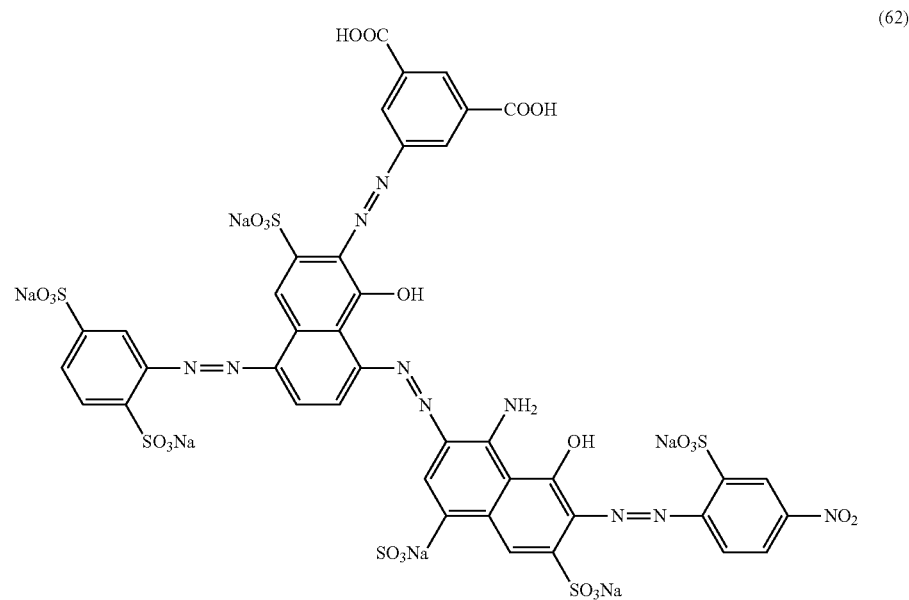

(62)

This example was prepared as example 29. However, intermediate 125 (as shown in example 25) was used in place of intermediate 26 and 5-aminoisophthalic acid was used in place of aniline 2,5-disulfonic acid of example 29.

Example 63

Preparation of Dye (63)

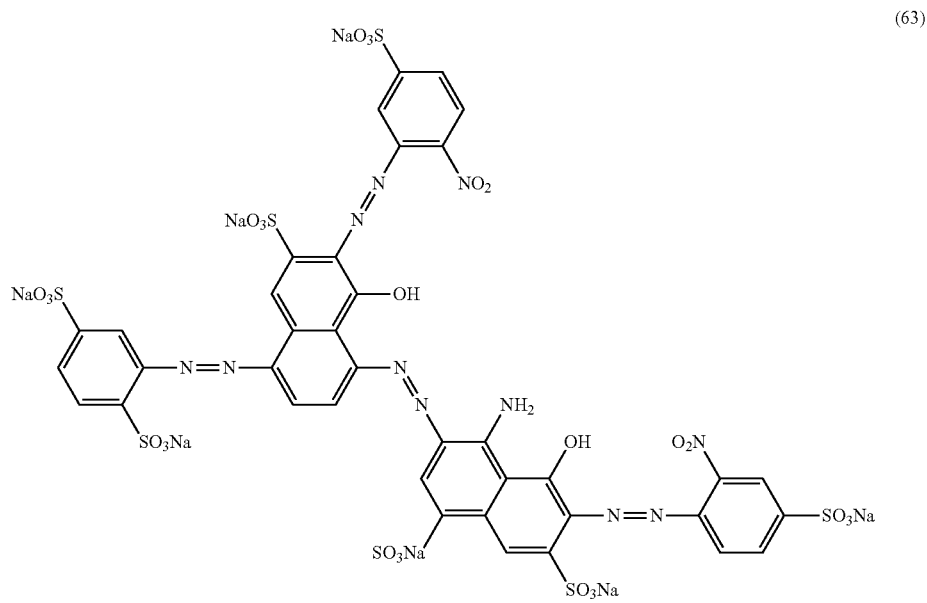

(63)

This example was prepared as example 29. However, Aniline 2-nitro-4-sulfonic acid was used in place of aniline 2,5-disulfonic acid of example 29.

Example 64

Preparation of Dye (64)

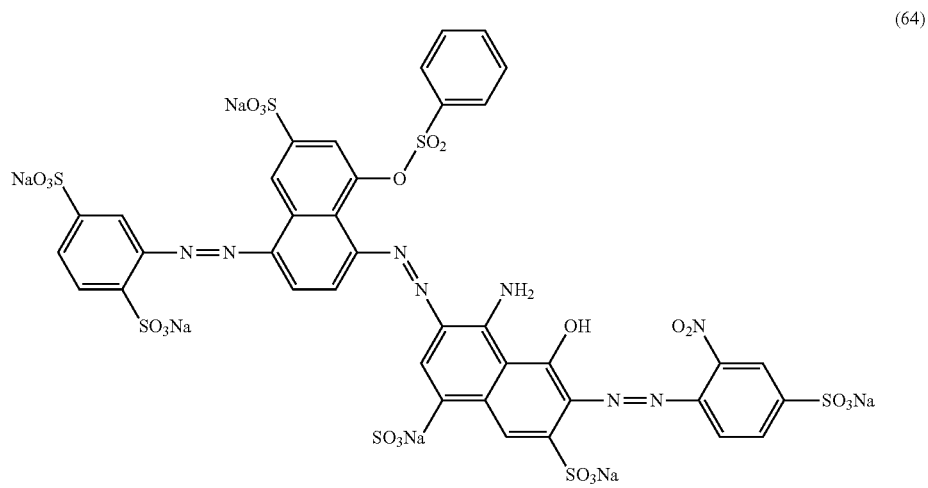

(64)

Aniline-2-nitro-4-sulfonic acid was diazotized in the same manner as in example 1 and coupled to intermediate 125 (as shown in example 25) at a pH value of 8.5 to 9.5 and a temperature between 0 and 5° C. The dye 64 was precipitated with EtOH, filtered off and dried. Dye 64 was obtained with a 71% yield, based on the number of moles of Aniline-2-nitro-4-sulfonic acid.

Example 65
Preparation of Dye (65)
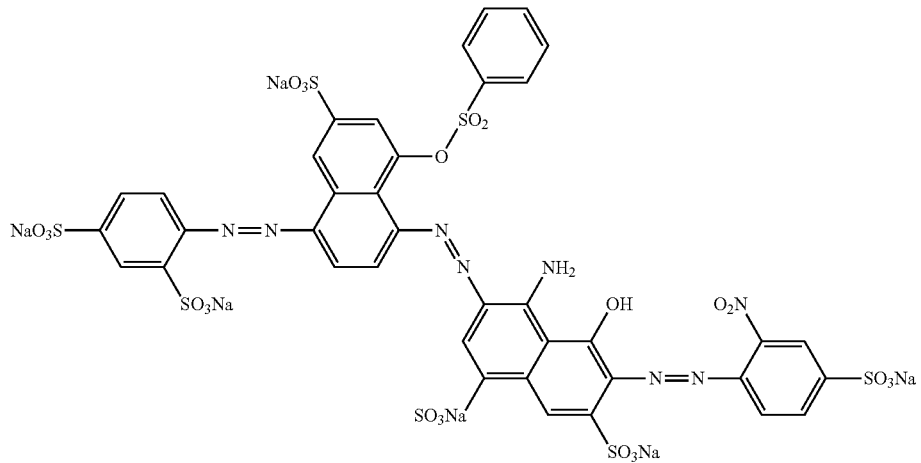
(65)
This example was prepared as example 64. However, intermediate 55 was used in place of intermediate 1a of example 25.
Example 66
Preparation of Dye (66)
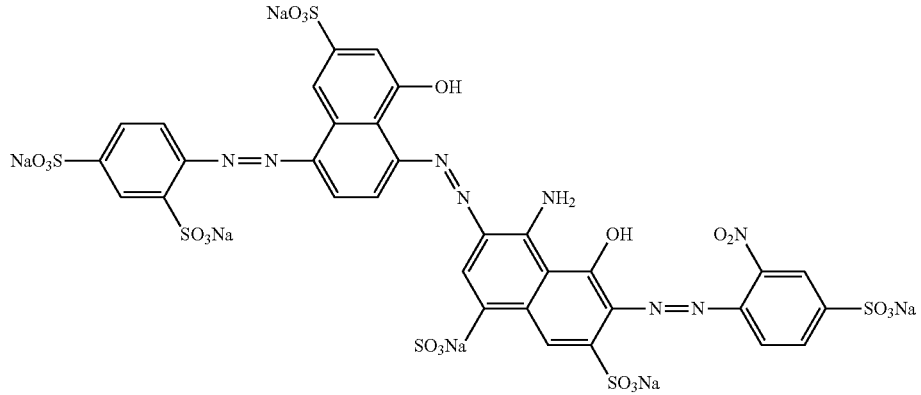
(66)
This example was prepared as example 26. However, intermediate 55 was used in place of intermediate 1a of example 26.

Example 67
Preparation of Dye (67)
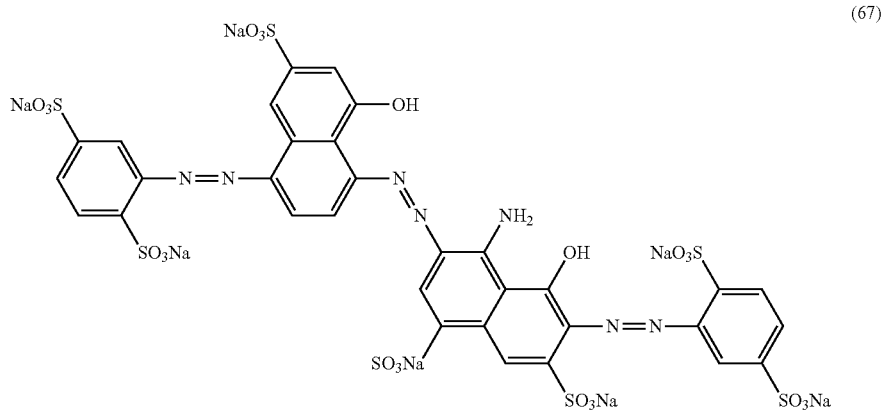
(67)
This example was prepared as example 25. However, aniline-2,5-disulfonic acid was used in place of aniline-4-nitro-2-sulfonic acid of example 25.
Example 68
Preparation of Dye (68)
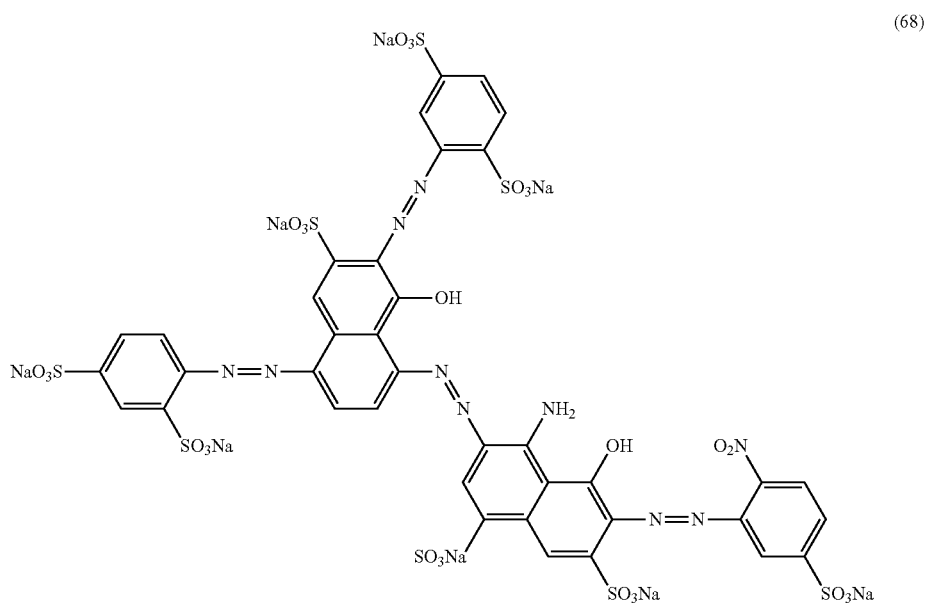
(68)
This example was prepared as example 29. However, intermediate 55 was used in place of intermediate 1a of example 29.

Example 69
Preparation of Dye (69)
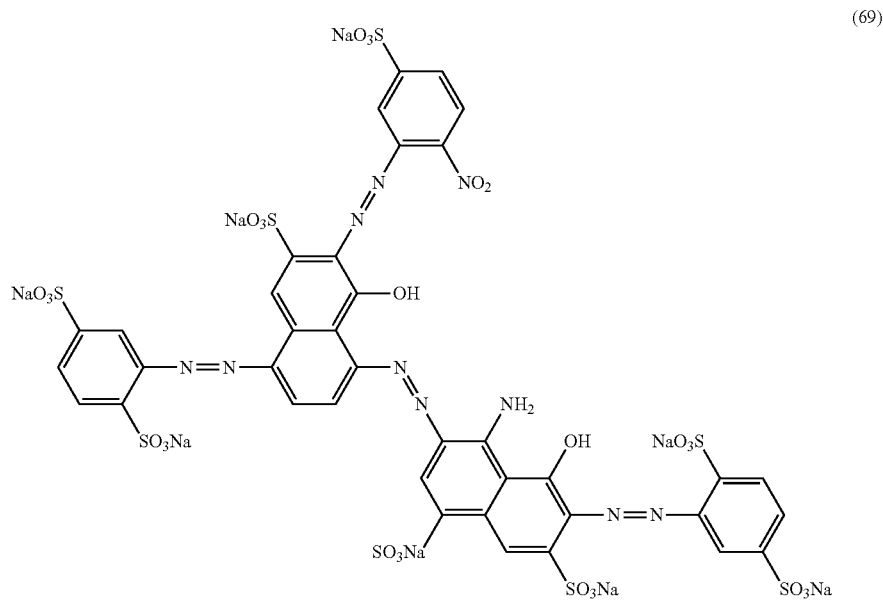
(69)
This example was prepared as example 63. However, dye 67 was used in place of dye 26 of example 63.
Example 70
Preparation of Dye (70)
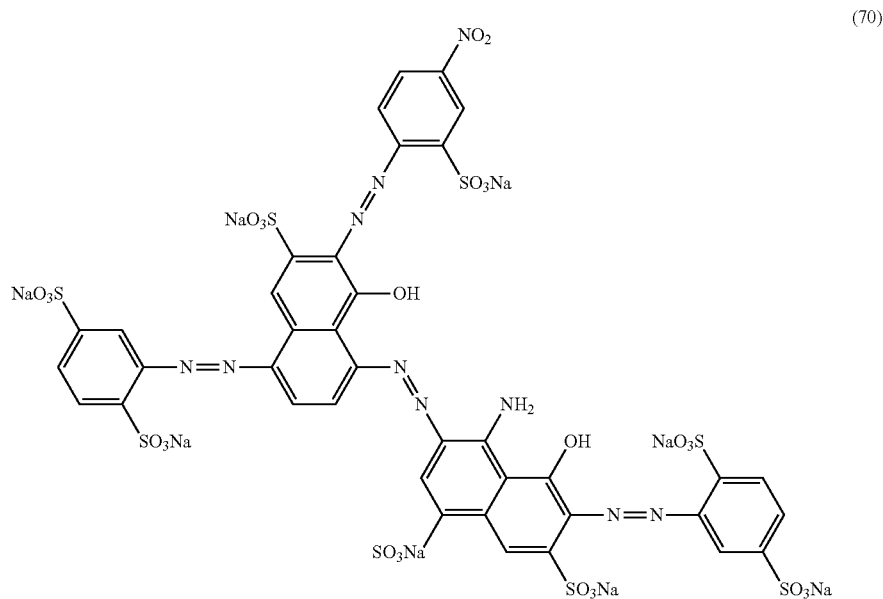
(70)
This example was prepared as example 69. However, aniline-4-nitro-2-sulfonic acid was used in place of 2-nitro-4-sulfonic acid of example 69.

Example 71
Preparation of Dye (71)
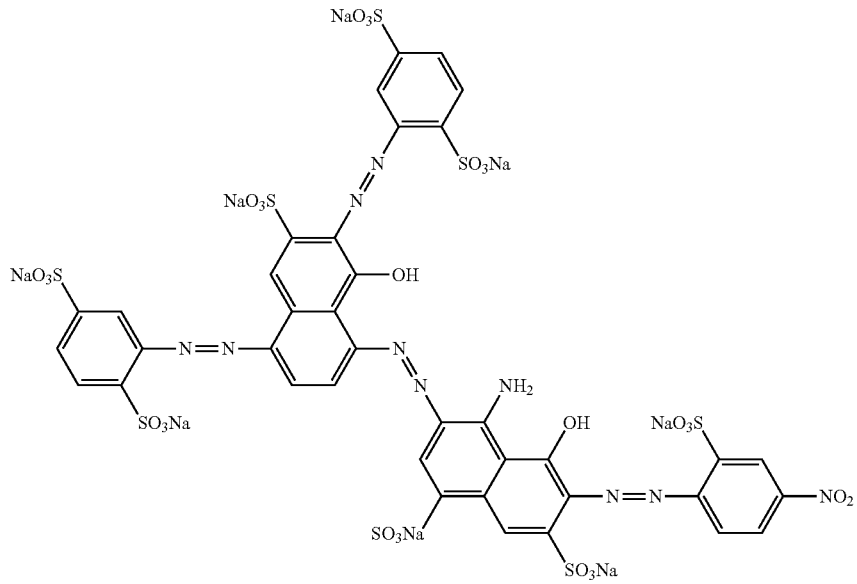
This example was prepared as example 29. However, intermediate 125 (as shown in example 25) was used in place of intermediate 26 of example 29.
Example 72
Preparation of Dye (72)
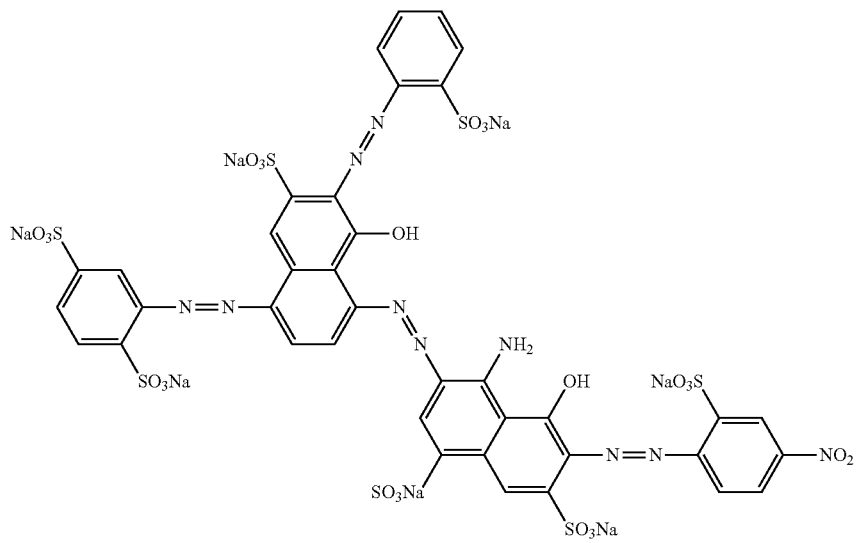
This example was prepared as example 71. However, aniline-2-sulfonic acid was used in place of aniline-2,5-disulfonic acid of example 71.

Example 73
Preparation of Dye (73)
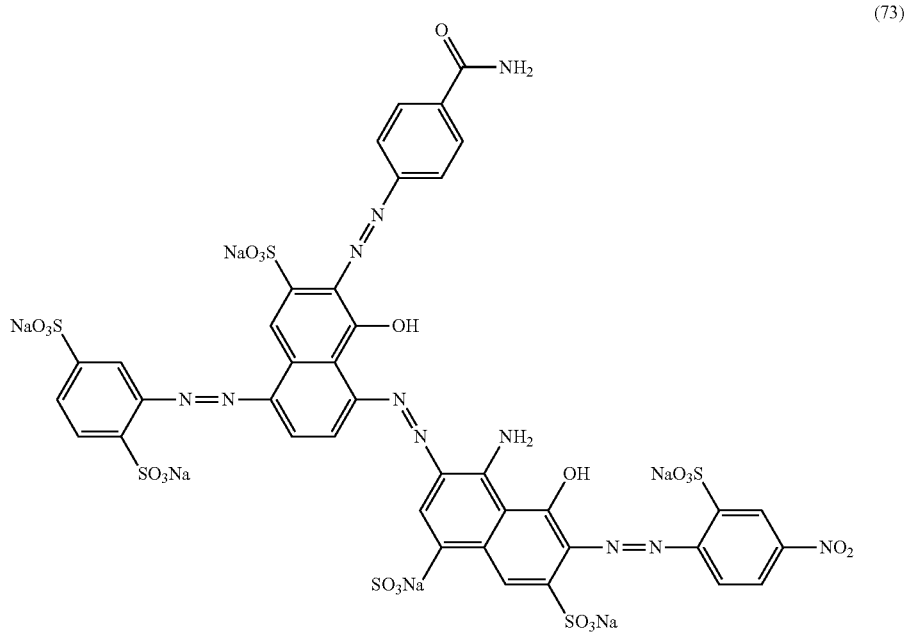
(73)
This example was prepared as example 71. However, 4-aminobenzamide was used in place of aniline-2,5-disulfonic acid of example 71
Example 74
Preparation of Dye (74)
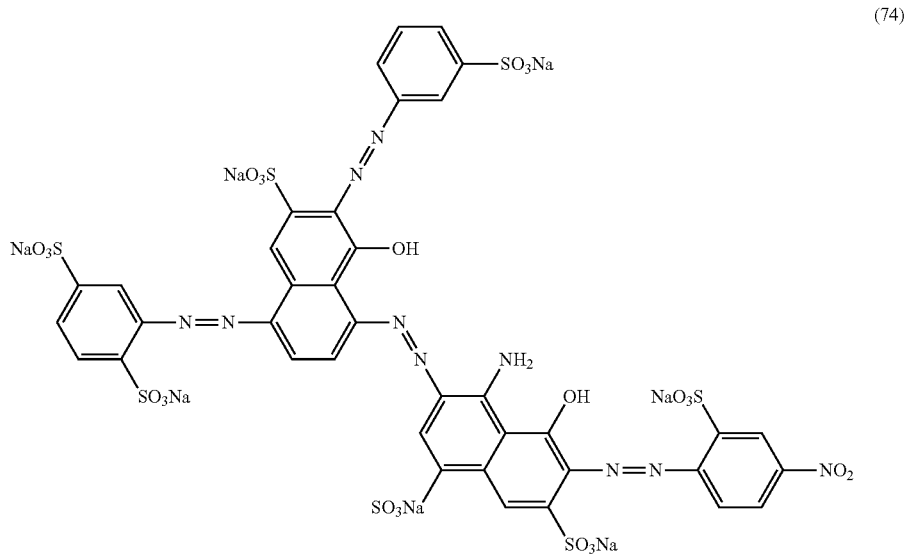
(74)

This example was prepared as example 71. However, aniline-3-sulfonic acid was used in place of aniline-2,5-disulfonic acid of example 71

Example 75

Preparation of Dye (75)

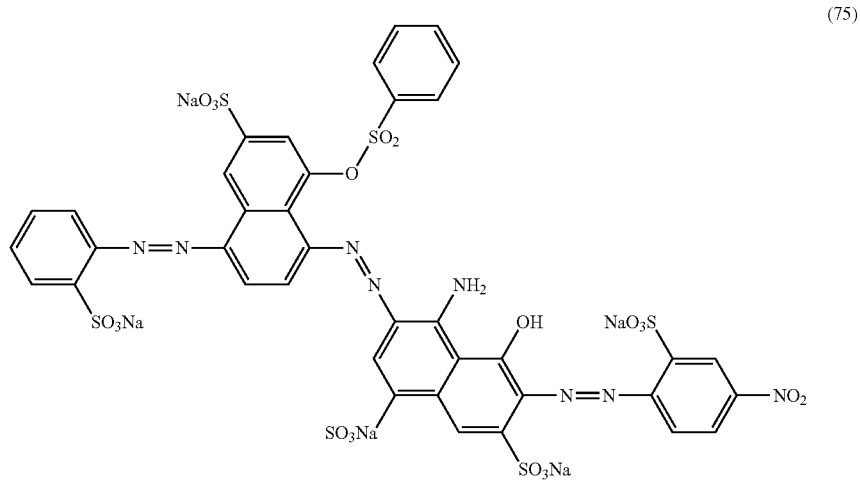

(75)

This example was prepared as example 64. However, intermediate 57 was used in place of intermediate 1a of example 64

Reference Dye I—C.I. Direct Black 168 of Formula (I)
C.I. Direct Black 168 of formula (I)

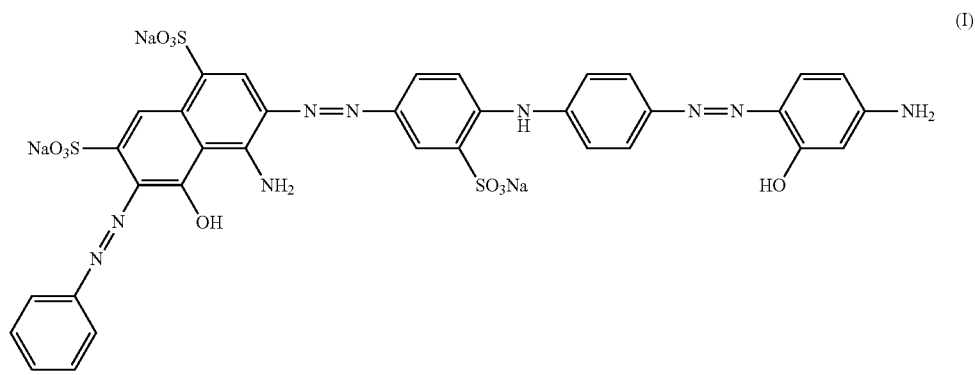

(I)

is a widely used, commercially available black dye. Recording fluids for ink jet printing containing C.I. Direct Black 168 are described in patent applications WO93/24330, EP 0885940 and US 2002/0121219. However, if used for dyeing paper or in recording fluids for ink jet printing, it is not soluble enough and it gives recorded images having insufficient water-durability, showing bronzing and a non-neutral hue on nanoporous media. It causes clogging of nozzles of the printing head due to deposition of dye. Direct Black 168 has to be used in a mixture with pacified C.I. Reactive Black 31 in order to provide blacks with a neutral hue.

Reference Ink II—C.I. Reactive Black 5 of Formula (II)
C.I. Reactive Black 5 of formula (II)

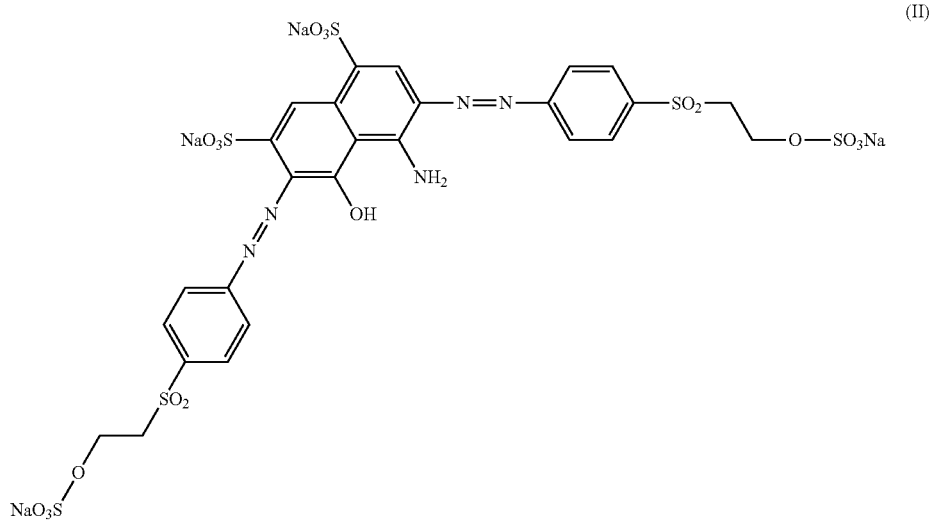

(II)

is also a widely used, commercially available black dye. Recording fluids for ink jet printing containing C.I. Reactive Black 5 are described in U.S. Pat. Nos. 4,257,770, 5,358,558, 5,935,309 and in patent application US 2006/0,174,800. The tint of blacks in recorded images, however, is more bluish than black.

Reference ink III—C.I. Acid Black 1 of formula (III)
C.I. Acid Black of formula (III)

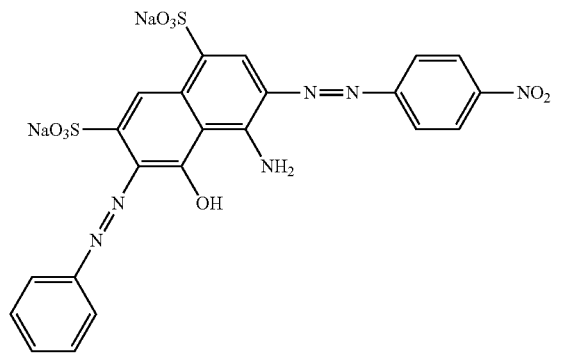

(III)

is also a widely used, commercially available black dye. Recording fluids for ink jet printing containing C.I. Acid Black 1 are described in U.S. Pat. Nos. 4,365,998 and 4,371,582. The light fastness of this dye, however, is very poor on plain paper and on polymer based recording sheets for ink jet printing. The light stability on porous media is somewhat better, however, it is still far away from the request of today's market.

Reference Dye IV—Preparation of Dye IV

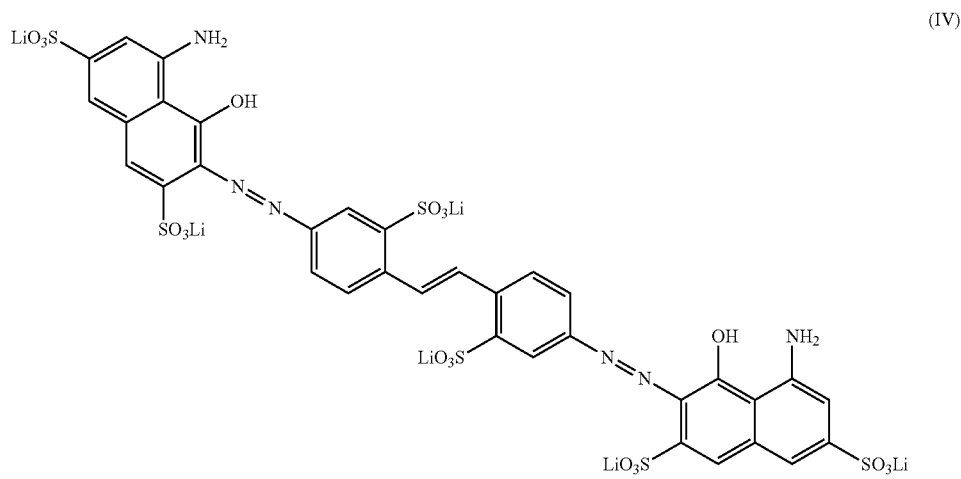

(IV)

This example was prepared as example 14. However, K-acid was used in place of desulfo K acid and lithium hydroxide was used in place of sodium hydroxide during the whole synthesis of example 14.

Example 75

Preparation of a Recording Liquid

Recording liquids were prepared as in example 30 but using the dyes (31) to (74). Recording liquids of reference dyes I-IV were prepared for comparison.

Example of Application of Recording Liquids

Coloured square patches having a density of 1.2±0.3 were printed with an ink jet printer, Model Canon PIXMA iP4000, onto the following recording sheets for ink jet printing:
a: HP Printing Paper HP 1122 (uncoated paper),
b: Sterling Papers Standard Glossy Coated stock for Litho Web (coated paper), and
c: ILFORD Premium Plus Glossy Paper 270 g/m² (ink jet recording sheet)

For printing the black square patches, the ink was filled in an empty cartridge and placed in the yellow channel of the printer settings so that only the pure ink was printed. In terms of software, Photoshop 4 (Adobe Systems, Inc.) was used. There, the printer settings were set to "photo paper pro", quality was set to "high", color setting parameters to "manual" option. Regarding the picture type, the option "none" was chosen. A yellow patch was designed in Photoshop and printed with the black ink in the yellow cartridge. The obtained coloured patches were used for the determination of water fastness, light stability, dye saturation and resistance against degradation by ozone.

Tests

1. Colour Saturation

The colour coordinates L*a*b* of the coloured square patches were measured with a spectrophotometer Spectrolino® (available from Gretag Macbeth, Regensdorf, Switzerland) in reflection mode (using CIE standard illuminant D65).

2. Light Stability

The optical density $D_0$ of the dye in the coloured patches on the printed sample was measured after printing aforementioned patches. Then, the printed samples with the patches were irradiated using a Weather-Ometer® Ci35A (available from Atlas Material Testing Technology, Chicago, USA) with a 6500 W xenon lamp at a temperature of 20° C. and relative humidity of 50% until an illumination of 10 and 20 Megalux hours was reached. Then, the density $D_I$ of the dye in the coloured, irradiated patches was measured with a densitometer Spectrolino®. The percent of density loss of the dye in the coloured patches due to illumination with light is calculated according to the formula:

$$DL_{Light}=100\%*(D_0-D_I)/D_0$$

High values of $DL_{Light}$ indicate good light stability of a dye.

Light stability of a dye (indicated as $DL_{Light}$) was graded in the following way:
A: less than 20% dye density loss
B: 20% to 30% dye density loss
C: 30% to 40% dye density loss
D: more than 40% dye density loss 3. Stability Against Degradation by Ozone After measuring the optical density of the coloured square patches (see above), the printed samples were stored for 48, 96 and 192 hours in an ozone chamber, model 903 (available from Satra/Hampden, Great Britain) at a temperature of 30° C., a relative humidity of the air of 50% and an ozone concentration of 1 ppm at a velocity of the circulating, ozone containing air of 13 mm/s. After storage, the color density of the coloured square patches of the samples were re-measured providing $D_{II}$. The percent of density loss of the dye in the coloured patches due to the ozone treatment is calculated according to the formula:

$$DL_{Ozone}=100\%*(D_I-D_{II})/D_I$$

High values of $DL_{ozone}$ indicate good ozone stability of a dye.

Stability of a dye against degradation by ozone (indicated as $DL_{Ozone}$) was graded in the following way:
A: less than 20% dye density loss
B: 20% to 30% dye density loss
C: 30% to 40% dye density loss
D: more than 40% dye density loss 4. Waterfastness Patterns were printed on recording media a and b as described in ISO test 18935:2005(E), Method 3—Water soak, with the following differences:
a. the time of immersion in the present tests was set than 1 minute compared ISO 18935:2005(E), in which the time of immersion is set to 1 hour;
b. only black pattern are prepared according to the procedure described above.

First, the optical density (UnsoakedPattern OD) of the coloured patterns on the samples was measured with a Spectrolino® densitometer 1 day after it has been printed (=Optical Density vis. at 100% print density). Then the samples with the patterns were immersed into de-ionized water at ambient temperature for 1 minute. Then, the samples with the patterns were removed and hung vertically to dry for 1 hour. Separate containers were used for each sample to avoid cross contamination. The optical density (SoakedPattern OD) of the coloured, water-treated patterns was measured with a Spectrolino® densitometer. The calculated percent waterfastness is given according the following formula:

$$\text{Optical Density Loss} = \left(1 - \frac{(SoakedPatternOD)}{(UnsoakedPatternOD)}\right)*100\%$$

Low values of Optical Density Loss indicate good water fastness of a dye.

Waterfastness of a dye (indicated as WF) was graded in the following way:
A: less than 10% optical density loss
B: 10% to 20% optical density loss
C: 20% to 30% optical density loss
D: 30% to 40% optical density loss
E: >40% optical density loss Results The absorption maxima λmax in aqueous solution, the colour coordinates on the recording sheet c and the stability against degradation by ozone ($DL_{Ozone}$) as described above, each on recording sheet c, are listed in Table 1.

TABLE 1

| Dye | $\lambda_{max}$ (nm) | L*a*b* | Stability against degradation by ozone/Recording sheet c 48 h | 96 h | 192 h |
|---|---|---|---|---|---|
| 25 | 661.5 | 14.1/6.6/−16.9 | A | B | C |
| 26 | 662 | 17.1/−1.2/−16.4 | A | A | C |
| 28 | 719 | 17.6/−7.1/−12.6 | A | B | C |
| 29 | 490.5/631.50 | 6.8/2.3/−0.1 | A | A | B |
| 61 | 500.5/605.50 | 5.4/1.3/−3.2 | A | A | C |
| 62 | 503.5/603.5 | 8.9/5.4/−2.0 | A | B | C |
| 63 | 510.5 | 9.2/12.8/1.3 | A | B | B |
| 64 | 609.5 | 6.3/−2.1/−8.5 | A | B | B |
| 65 | 606.5 | 7.7/−5.2/−10.1 | A | A | B |
| 66 | 662.50 | 9.4/3.7/−16.8 | A | B | No data |
| 67 | 661 | 14.6/−0.1/−17.9 | A | B | No data |
| 68 | 495.5/631.5 | 8.1/5.1/0.1 | A | B | C |
| 69 | 516/610 | 5.6/5.8/−4.9 | A | A | B |
| 70 | 508.5/610.5 | 6.5/4.2/−2.8 | A | A | B |
| 71 | 481/611 | 6.77/1.27/−1.45 | A | A | A |
| 72 | 485/609 | 6.0/3.3/−2.9 | A | A | B |
| 73 | 505/625 | 7.5/9.3/−0.5 | A | A | A |
| 74 | 487.5/609.5 | 6.7/4.7/−2.4 | A | A | B |
| 75 | 582 | 5.0/1.4/−11.2 | A | B | C |
| HP364XL | 566.5 | 7.3/12.3/−5.3 | B | C | D |
| I | 489/634.5 | 8.6/−0.8/−5.8 | A | C | D |
| II | 594 | 21.5/5.4/29.5 | A | C | D |
| II | 614.5 | 25.2/−0.5/34.3 | A | C | D |

The results in Table 1 immediately show that all dyes according to the invention have a considerably better stability against degradation by ozone than comparative commercial samples of black dye (HP364XL), C.I. Direct Black 168 (I), C.I. Reactive Black 5 (II) and C.I. Acid Black 1 (III).

The stability against degradation by light on the recording sheets a and c are listed in Table 2.

TABLE 2

Stability against degradation by light

| | Recording sheet a | | | Recording sheet c | | |
|---|---|---|---|---|---|---|
| Dye | 20 Mluxh | 50 Mluxh | 100 Mluxh* | 20 Mluxh | 30 Mluxh | 50 Mluxh* |
| 25 | A | A | B | A | B | B |
| 26 | A | A | A | A | A | B |
| 28 | A | A | B | A | A | B |
| 29 | A | A | C | A | A | A |
| 61 | A | B | C | A | B | No data |
| 62 | A | B | C | A | B | No data |
| 63 | A | A | B | A | B | B |
| 64 | A | B | No data | A | B | No data |
| 65 | A | B | No data | A | B | No data |
| 66 | A | A | A | A | B | No data |
| 67 | A | A | A | A | B | No data |
| 68 | A | A | No data | A | B | No data |
| 69 | A | A | No data | A | B | No data |
| 70 | A | A | No data | A | B | No data |
| 71 | A | A | No data | A | A | No data |
| 72 | A | A | No data | A | B | No data |
| 73 | A | A | No data | A | A | No data |
| 74 | A | A | No data | A | B | No data |
| 75 | A | B | No data | A | C | No data |
| HP364XL | A | C | D | B | D | D |
| I | B | D | D | D | D | D |
| II | D | D | D | C | D | D |
| III | D | D | D | C | D | D |

* "no data" entries: if measurements at 20 Mluxh or 50 Mluxh revealed significant better results than the reference dyes, then no measurements were performed with 100 Mluxh. It is predictable that these samples will outperform the reference dyes at 100 Mluxh as well.

The results in Table 2 immediately show that all dyes according to the invention have a considerably better stability against degradation by light than comparative commercial sample of black dye (HP364XL), C.I. Direct Black 168 (I), C.I. Reactive Black 5 (II) and C.I. Acid Black 1 (III).

With regard to the stability against degradation by both, ozone and light, all dyes according to the invention have a considerably better stability than black dye (HP364XL), C.I. Direct Black 168 (I), C.I. Reactive Black 5 (II) and C.I. Acid Black 1 (III).

The waterfastness (WF) on the recording sheets a and b are listed in Table 3.

TABLE 3

Water-fastness (WF)

| | Recording sheet a | | Recording sheet b | |
|---|---|---|---|---|
| Dye | Optical Density vis. at 100% print density | WF [%] | Optical Density vis. at 100% print density | WF [%] |
| 4 | 1.15 | D | 0.8 | A |
| 5a | 1.14 | A | 1.31 | A |
| 5b | 0.98 | B | 1.31 | A |
| 6 | 0.98 | A | 1.30 | A |
| 7 | 1.25 | B | 1.24 | A |
| 8 | 1.02 | A | 1.19 | A |
| 9 | 1.19 | C | 1.17 | A |
| 10 | 1.13 | A | 1.43 | A |
| 12 | 1.15 | B | 1.23 | A |
| 13 | 1.05 | A | 1.28 | A |
| 14 | 1.20 | B | 1.14 | A |
| 15 | 1.10 | C | 1.14 | E |
| 16 | 1.14 | C | 1.16 | E |
| 17a | 1.04 | C | 1.41 | A |
| 17b | 1.03 | B | 1.43 | A |
| 18a | 1.19 | C | 1.25 | A |
| 18b | 1.05 | B | 1.22 | A |
| 19a | 1.01 | A | 1.34 | A |
| 19b | 0.96 | B | 1.50 | A |
| 20a | 1.03 | B | 1.44 | A |
| 20b | 1.03 | C | 1.41 | A |
| 20c | 1.02 | C | 1.46 | A |
| 21 | 1.03 | B | 1.45 | A |
| 22a | 1.01 | C | 1.20 | A |
| 22b | 1.08 | A | 1.29 | A |
| 22c | 0.96 | B | 1.45 | A |
| 22d | 1.01 | B | 1.04 | A |
| 23a | 1.10 | A | 1.30 | A |
| 23b | 1.12 | A | 1.31 | A |
| 24a | 1.03 | B | 1.28 | A |
| 24b | 1.03 | C | 1.38 | B |
| 27 | 1.09 | C | 1.11 | C |
| 39 | 1.10 | A | 1.37 | A |
| 40 | 1.06 | C | 1.22 | A |
| 41 | 1.15 | B | 1.46 | A |
| 42 | 1.20 | A | 1.14 | A |
| 43 | 1.12 | A | 1.23 | A |
| 44 | 1.14 | A | 1.28 | A |
| 45 | 1.18 | A | 1.20 | A |
| 46 | 1.14 | A | 1.39 | A |
| 47 | 1.11 | B | 1.32 | B |
| 48 | 1.10 | A | 1.54 | A |
| 49 | 1.10 | A | 1.39 | A |
| 50 | 1.12 | A | 1.31 | A |
| 51 | 1.29 | B | 1.5 | A |
| 52 | 1.21 | B | 1.4 | A |
| 53 | 1.22 | B | 1.4 | A |
| 54 | 1.15 | A | 1.5 | A |
| HP364XL | 1.09 | C | 1.21 | C |
| IV | 1.16 | C | 0.86 | E |

With regard to the water-fastness, the dyes (5b), (7), (12), (14), (17b), (18b), (19b), (20a), (21), (22c), (22d), (23a), (24a) and particularly the dyes (5a), (6), (8), (10), (13), (19a), (22b), (23b) and (39), (42)-(54) have a considerably better water-fastness than commercial, black dye HP364XL and reference dye N.

REFERENCE NUMBERS (1) Substrate
(2) Dye

The invention claimed is:
1. A dye D1 of formula I,

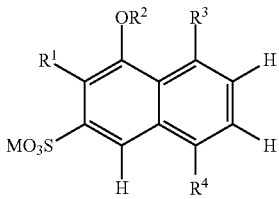

wherein
M is selected from the group consisting of H, Li, Na, K, and $N(H_kR^6{}_m)$,
  wherein
    each $R^6$ is selected from the group consisting of —H, and a substituted or unsubstituted, saturated or unsaturated aliphatic group having 1 to 10 carbon atoms, and
    k is an integer selected from the group consisting of 0, 1, 2, 3, and 4, and
    m=4−k;
$R^1$ is —H or —N=N—$Ar^2$,
  wherein $Ar^2$ is a substituted or unsubstituted monocyclic, polycyclic or condensed, at least one aromatic group containing fragment, which at least one aromatic group comprises at least one five- or one six-membered homo- or heterocyclic structure,
  wherein the heterocyclic structure comprises at least one hetero-atom,
  which heteroatom is N, O or S;
$R^2$ is selected from the group consisting of —H, —C(=O)$R^6$, —C(=O)—$(CH_2)_v$—$Ar^2$, —$R^6$, —$(CH_2)_q$—X, —$SO_2R^6$, and —$SO_2Ar^2$;
  wherein
    X is selected from the group consisting of —$SO_3M$, —$SO_2NH_2$, —$SO_2NHR^6$, —$NHSO_2R^6$, —$NO_2$, —COOM, —COO$R^6$, —$CH_3$, —$R^6$, —$NH_2$, —NH$R^6$, —OR$^6$, —OM, —Cl, —Br, —I, —F, —CN, —$CO_2NHR^6$, —$Ar^2$, —N=N—$Ar^2$, —$SO_2R^6$ and —NHC(=O)—$R^6$,
    M, $R^6$ and $Ar^2$ are defined as above,
    q is an integer in the range of from 1 to 10, and
    v is an integer in the range of from 0 to 10;
$R^3$ is —NH$R^2$ or —N=N—$Ar^2$, wherein
  $R^2$ has the meaning as defined above, and
  $Ar^2$ has the meaning as defined above; and
$R^4$ is —H or —N=N—$Ar^2$, wherein $Ar^2$ has the meaning defined above, and
wherein two of the groups selected from the group consisting of $R^1$, $R^3$, and $R^4$ are —N=N—$Ar^2$, wherein each $Ar^2$ is selected independently from any other $Ar^2$.

2. The dye D1 according to claim 1, wherein each $Ar^2$ is selected independently from the group consisting of:

a) formula III:

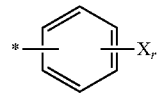

wherein
  r represents the number of X substituents in formula III and is an integer in the range of from 1 to 5, and X has the meaning as defined in claim 1,
  M is as defined in claim 1; and
b) formula IV:

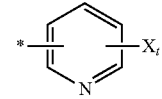

wherein X has the meaning as defined in claim 1 and t represents the number of X substituents in formula IV and is an integer in the range of from 1 to 4; and
c) formula V:

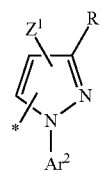

wherein
  $R^7$ is selected from the group consisting of —$R^6$, —$SR^6$, —$Ar^2$, and —NH$R^6$
  $Z^1$ is —OH, —CN, —$CO_2M$, —$CO_2R^6$ or —NH$R^6$,
  $Ar^2$, $R^6$ and M have the meaning as defined in claim 1; and
d) formula VI:

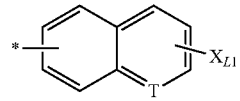

wherein
  each X has the meaning as defined in claim 1,
  T is selected from the group consisting of C, N, and P,
  u represents the number of X substituents in formula VI and is an integer between 0 and 6; and
e) formula VII:

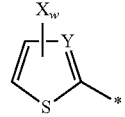

wherein
X has the meaning as defined in claim 1 and
w represents the number of X substituents in formula VII and w is 1 or 2,
Y is C or N; and
f) formula VIII:

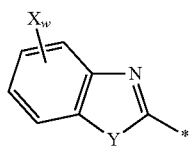

wherein
X has the meaning as defined above,
w represents the number of X substituents in formula VIII and w is an integer in the range of from 1 to 4, and
Y is C, N, O or S.

3. The dye D1 according to claim 1, wherein $R^1$ and $R^4$ are $-N=N-Ar^2$, wherein each $Ar^2$ is selected independently from any other $Ar^2$.

4. A dye D2 comprising two fragments of formula I,

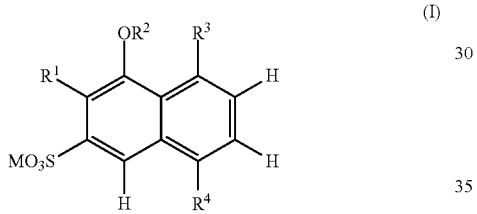

and one fragment $R^5$ of formula II,

wherein
M is selected from the group consisting of H, Li, Na, K, and $N(H_k R^6_m)$,
wherein
each $R^6$ is selected from the group consisting of —H and a substituted or unsubstituted, saturated or unsaturated aliphatic group having 1 to 10 carbonatoms, and
k is an integer selected from the group consisting of 0, 1, 2, 3, and 4, and
m=4−k;
$R^2$ is selected from the group consisting of —H, —C(=O)$R^6$, —C(=O)—(CH$_2$)$_y$—Ar$^2$, —R$^6$, —(CH$_2$)$_q$—X, —SO$_2$R$^6$, and —SO$_2$Ar$^2$;
wherein $Ar^2$ is a substituted or unsubstituted monocyclic, polycyclic or condensed, at least one aromatic group containing fragment, which at least one aromatic group comprises at least one five- or one six-membered homo- or heterocyclic structure,
wherein the heterocyclic structure comprises at least one hetero-atom,
which heteroatom is N, O or S; and
wherein
X is selected from the groups consisting of —SO$_3$M, —SO$_2$NH$_2$, —SO$_2$NHR$^6$, —NHSO$_2$R$^6$, —NO$_2$, —COOM, —COOR$^6$, —CH$_3$, —R$^6$, —NH$_2$, —NHR$^6$, —OR$^6$, —OM, —Cl, —Br, —I, —F, —CN, —CO$_2$NHR$^6$, —Ar$^2$, —N=N—Ar$^2$, —SO$_2$R$^6$ and —NHC(=O)—R$^6$,
M, $R^6$ and $Ar^2$ are defined as above,
q is an integer in the range of from 1 to 10, and
v is an integer in the range of from 0 to 10;
$R^3$ is —NHR$^2$ or —N=N—Ar$^2$, wherein
$R^2$ has the meaning as defined above, and
$Ar^2$ has the meaning as defined above;
wherein $Ar^1$ is a substituted or unsubstituted, monocyclic, polycyclic or condensed, at least one aromatic group containing linker, which at least one aromatic group comprises at least one five- or one six-membered homo- or heterocyclic structure,
wherein the heterocyclic structure comprises at least one hetero-atom,
which heteroatom is N, O or S;
wherein, independently for each fragment of formula I, $R^2$, $R^3$ and M have the meaning as defined above,
wherein $R^1$ and $R^4$ of each fragment of formula I are selected from the group consisting of
a. —H,
b. —N=N—Ar$^2$,
c. —R$^5$,
d. formula III:

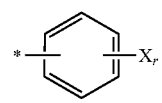

wherein
r represents the number of X substituents in formula III and is an integer in the range of from 1 to 5, and X has the meaning as defined above,
M is as defined above, and
e. formula VI:

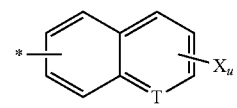

wherein
each X has the meaning as defined above,
T is selected from the group consisting of C, N and P,
u represents the number of X substituents in formula VI and is an integer between 0 and 6;
wherein, in each of the two fragments of formula I, at least one of the groups $R^1$ and $R^4$ equals $R^5$ as defined for formula II, and wherein $R^5$ is linked at the positions marked with * to the two fragments of formula I, and
wherein in each fragment of formula I, if $R^1$ equals $R^5$, then $R^4$ is selected from the group consisting of formula III and formula VI.

5. The dye D2 according to claim 4, wherein $R^5$ is selected from the group consisting of formula IIa and formula IIb:

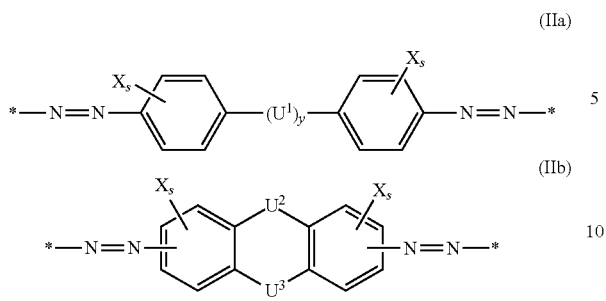

wherein each X independently has the meaning as defined in claim 4, s independently for each aromatic ring represents the number of X substituents and is an integer selected from 0, 1, 2 and 3, $U^1$ is selected from the group consisting of —$CZ_2$—, —$CZ_2$—$CZ_2$—, —($SO_2$), —O—, —(C=O)—, —CH=CH—, —NH(C=O)—, —$NR^6$—,

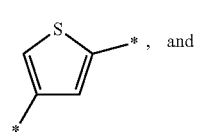, 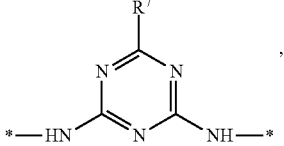, wherein each Z is selected independently from the group consisting of —H, —OH and —$CH_3$, y is 0 or 1

$U^2$, $U^3$ are, each individually, selected from the group consisting of —(C=O)— and —($SO_2$)—, $R^7$ is selected from the group consisting of —$R^6$, —Cl, —Br, —I, —F, and —OH, and $R^6$ has the meaning as defined in claim 4.

6. The dye D2 according to claim 4, wherein $R^5$ is selected from the group consisting of formula IX:

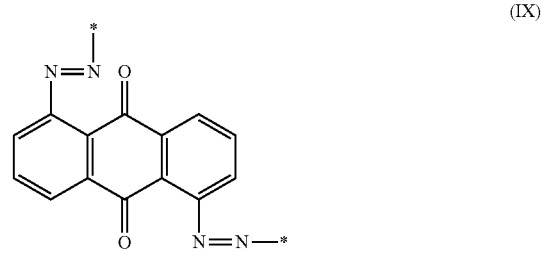 [SMILES: *N=Nc1cccc2c1C(=O)c1cccc(/N=N/*)c1C2=O]

and formula X:

7. The dye D2 according to claim 4, wherein M, $R^1$, $R^2$, and $R^3$ are identical for both fragments of formula I, which both fragments of formula I are linked to each other in $R^4$ via one fragment $R^5$ of formula II.

8. The dye D2 according to claim 4, wherein M, $R^2$, $R^3$, and $R^4$ are identical for both fragments of formula I, which both fragments of formula I are linked to each other in $R^1$ via one fragment $R^5$ of formula II.

9. The dye D2 according to claim 4, wherein dye D2 is represented by formula XI:

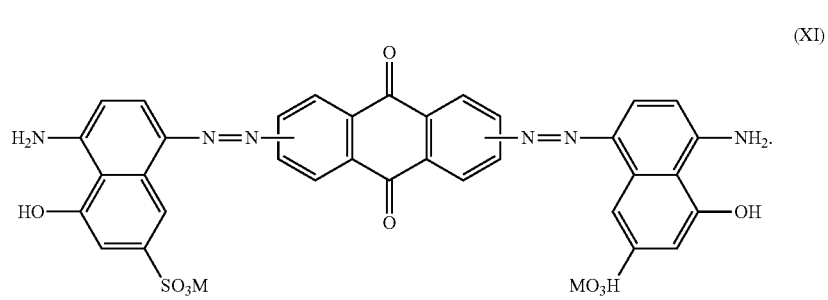

10. The dye D2 according to claim 4, wherein the dye D2 is represented by formula XII:

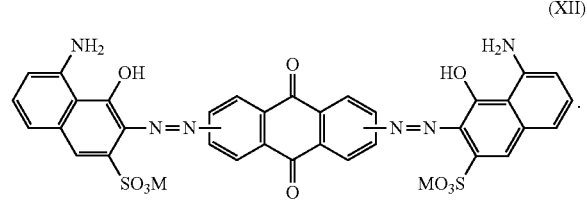

11. The dye D2 according to claim 4, wherein the dye D2 is represented by formula XIIIa:

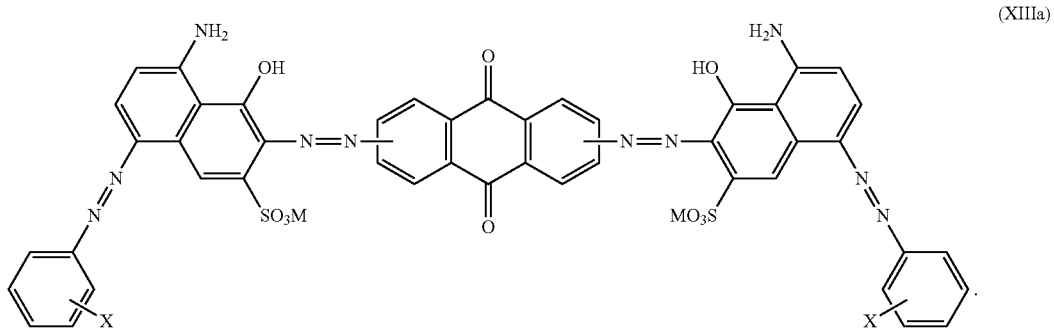

(XIIIa)

12. The dye D2 according to claim 4, wherein the dye D2 is represented by formula XIIIb:

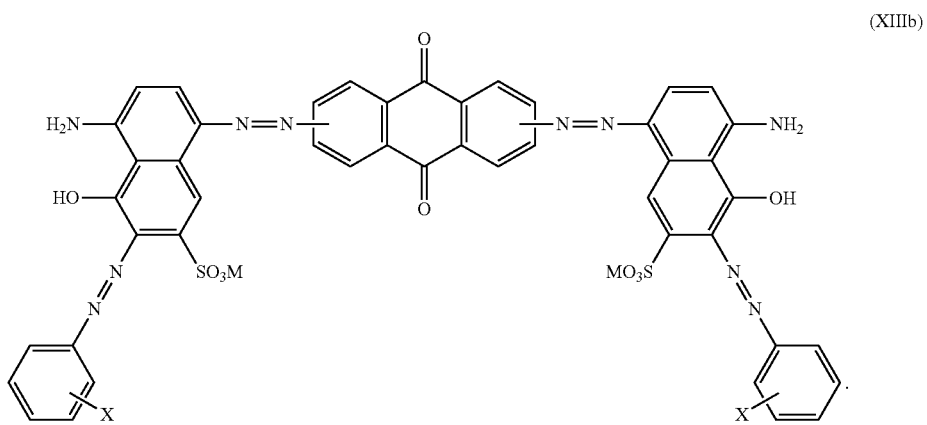

(XIIIb)

13. A method for the preparation of a dye D1 according to claim 1, comprising at least the following steps:
1. providing an at least one aromatic group containing compound of formula XIV,

 (XIV)

wherein Ar² has the meaning as defined in claim 1;
2. diazotising the at least one aromatic group containing compound of formula XIV;
3. coupling the diazotized at least one aromatic group containing compound to a coupling component of formula XV,

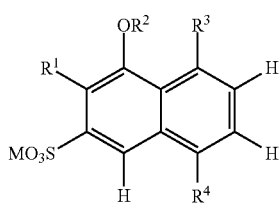

(XV)

wherein M, $R^1$, $R^2$, $R^3$, are defined as in claim 1,
wherein $R^4$ is —H or —N═N—Ar², wherein Ar² is as defined in claim 1,
wherein a raw product is obtained,
4. purifying the raw product to obtain the dye D1.

14. The method according to claim 13, wherein $R^1$ is —H.

15. A method for the preparation of a dye D2 according to claim 4, comprising at least the following steps:
1. providing an at least one aromatic group containing linker of formula XVI,

 (XVI)

wherein Ar¹ has the meaning as defined in claim 4;
2. diazotising the at least one aromatic group containing linker of formula XVI;
3. coupling the diazotized at least one aromatic group containing linker to at least one coupling component of formula XVII,

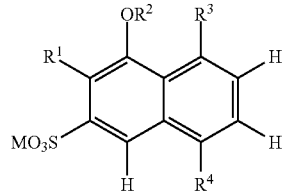

(XVII)

wherein M, $R^1$, $R^2$, $R^3$, $R^4$ are defined in claim 4,
wherein at least one of $R^1$ and $R^4$ is —H,
wherein a raw product is obtained,
4. purifying the raw product to obtain the dye D2.

16. The method according to claim 13, wherein the process is performed in a one-pot synthesis.

17. A dye obtained by the method according to claim 13.

18. A liquid phase comprising
1) at least a dye D1 according to claim 1, and
2) water.

19. The liquid phase according to claim 18, wherein the liquid phase comprises one or more dyes according to claim 1, wherein the amount of said dyes in the liquid phase is in the range of from 0.5 to 20 wt.- %, based on the total weight of the liquid phase.

20. The liquid phase according to claim 18, wherein the liquid phase further comprises N-methyl-2-pyrrolidone or 2-pyrrolidone in a range of from 1 to 30 wt- %, based on the total weight of the liquid phase.

21. The liquid phase according to claim 18, wherein the liquid phase is an ink.

22. The dye D1 according to claim 2, wherein X in formula VI is —H,—OH, —NHR$^6$ or —SO$_3$M.

23. The dye D1 according to claim 2, wherein X in formula VIII is selected from the group consisting of —H, —NO$_2$, —CH$_3$, —Cl, —F, —Br, —SO$_3$M, —SO$_2$R$^6$, —SO$_2$NHR$^6$, —OH, —OR$^6$, —NHR$^6$, —COOM and —COOR$^6$.

24. The dye D2 according to claim 4, wherein X in formula VI is —H,—OH, —NHR$^6$ or —SO$_3$M, wherein M has the meaning as defined in claim 4.

* * * * *